United States Patent
Kim et al.

(10) Patent No.: US 12,212,530 B2
(45) Date of Patent: *Jan. 28, 2025

(54) METHOD AND APPARATUS FOR MANAGING DORMANT BANDWIDTH PART IN NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,426

(22) Filed: Sep. 28, 2023

(65) Prior Publication Data

US 2024/0039681 A1    Feb. 1, 2024

Related U.S. Application Data

(63) Continuation of application No. 17/248,827, filed on Feb. 9, 2021, now Pat. No. 11,777,695.

(30) Foreign Application Priority Data

Feb. 11, 2020 (KR) ........................ 10-2020-0016644

(51) Int. Cl.
| | | |
|---|---|---|
| *H04L 5/00* | (2006.01) | |
| *H04B 7/06* | (2006.01) | |
| *H04L 1/1607* | (2023.01) | |
| *H04W 72/0453* | (2023.01) | |
| *H04W 72/23* | (2023.01) | |
| *H04W 72/53* | (2023.01) | |
| *H04W 76/27* | (2018.01) | |

(52) U.S. Cl.
CPC ......... *H04L 5/0098* (2013.01); *H04B 7/0626* (2013.01); *H04L 1/1614* (2013.01);
(Continued)

(58) Field of Classification Search
CPC ... H04L 5/0098; H04L 1/1614; H04L 1/0027; H04L 5/0053; H04L 5/0096;
(Continued)

(56) References Cited

U.S. PATENT DOCUMENTS

2018/0242319 A1    8/2018  Akkarakaran et al.
2019/0103954 A1*   4/2019  Lee ...................... H04L 5/0098
(Continued)

FOREIGN PATENT DOCUMENTS

| EP | 3598806 A1 * | 1/2020 | .......... H04W 72/042 |
| KR | 10-2020-0094046 A | 8/2020 | |
| WO | 2018085145 A1 | 5/2018 | |

OTHER PUBLICATIONS

Qualcomm Incorporated, Fast SCG and SCell Activation, 3GPP TSG-RAN WG1 #97, Reno, USA, May 13-17, 2019, R1-1907306. (Year: 2019).*

(Continued)

*Primary Examiner* — Shailendra Kumar

(57) ABSTRACT

Disclosed are a communication scheme and a system thereof for converging IoT technology and a 5G communication system for supporting a high data transmission rate beyond that of a 4G system. The disclosure can be applied to intelligent services (for example, services related to a smart home, smart building, smart city, smart car, connected car, health care, digital education, retail business, security, and safety) based on the 5G communication technology and the IoT-related technology. The disclosure discloses a method and an apparatus for efficiently operating a dormant BWP.

20 Claims, 20 Drawing Sheets

(52) U.S. Cl.
CPC ....... *H04W 72/0453* (2013.01); *H04W 72/23* (2023.01); *H04W 72/53* (2023.01); *H04W 76/27* (2018.02)

(58) Field of Classification Search
CPC ..... H04L 1/0026; H04L 12/403; H04L 5/001; H04B 7/0626; H04W 72/0453; H04W 72/23; H04W 72/53; H04W 76/27; H04W 52/0229; H04W 76/15; Y02D 30/70
See application file for complete search history.

(56) References Cited

U.S. PATENT DOCUMENTS

| | | | |
|---|---|---|---|
| 2019/0254110 A1* | 8/2019 | He | H04L 41/0896 |
| 2020/0244410 A1 | 7/2020 | Kim et al. | |
| 2021/0176030 A1* | 6/2021 | Tsai | H04W 72/23 |
| 2021/0392651 A1* | 12/2021 | Futaki | H04L 5/0098 |
| 2022/0174776 A1 | 6/2022 | Wang et al. | |

OTHER PUBLICATIONS

Ericsson, Reduced latency Scell management for NR-NR CA, 3GPP TSG-RAN WG1 #97, Reno, USA, May 13-17, 2019; R1-1907333 (Year: 2019).*

3GPP TS 38.213 V16.0.0 (Sep. 2019), Technical Specification, 3rd Generation Partnership Project; Technical Specification Group Radio Access Network; NR; Physical layer procedures for control (Release 16), Dec. 2019, 146 pages.

International Search Report dated Apr. 30, 2021 in connection with International Application No. PCT/KR2021/001703, 3 pages.

Ericsson, "Configuration of dormancy behaviour in SCell," R2-1915688, 3GPP TSG-RAN WG2 #108, Reno, USA, Nov. 18-22, 2019, 4 pages.

Huawei, et al., "MAC impact to support the efficient and low latency SCell configuration and activation," R2-1914679, 3GPP TSG-RAN WG2 Meeting #108, Reno, USA, Nov. 18-22, 2019, 8 pages.

OPPO, "Introduction of dormancy behavior in NR," R2-1914552, 3GPP TSG-RAN WG2 Meeting #108, Reno, USA, Nov. 18-22, 2019, 10 pages.

European Patent Office, "Supplementary European Search Report," dated Oct. 10, 2022, in connection with European Patent Application No. 21752940.3, 11 pages.

Huawei et al., "Discussion on low latency SCell activation and efficient SCell management," R1-1911875, 3GPP TSG RAN WG1 #99, Nov. 18-22, 2019, 13 pages.

Qualcomm Incorporated, "Fast SCG and SCell Activation," R1-1907306, 3GPP TSG-RAN WG1 #97, Reno, USA, May 13-17, 2019, 11 pages.

Ericsson, "Reduced latency Scell management for NR-NR CA," R1-1907333, 3GPP TSG-RAN WG1 #97, Reno, USA, May 13-17, 2019, 5 pages.

* cited by examiner

FIG. 15

RRCReconfiguration message
(1510)-1> radioBearConfig
(1511)-1> CellGroupConfig
   (1521)-2> mac-CellGroupConfig
   (1522)-2> SpCellConfig
   (1523)-2> sCellToAddModList
     (1530)-3> SCellConfig
       (1540)-4> sCellIndex
       (1541)-4> sCellConfigCommon
       (1542)-4> sCellConfigDedicated
   (1524)-2> sCellToReleaseList
   (1525)-2> PhysicalCellGroupConfig

METHOD AND APPARATUS FOR MANAGING DORMANT BANDWIDTH PART IN NEXT-GENERATION MOBILE COMMUNICATION SYSTEM

CROSS-REFERENCE TO RELATED APPLICATION

This application is a continuation of application Ser. No. 17/248,827, filed Feb. 9, 2021, now U.S. Pat. No. 11,777,695, which is based on and claims priority under 35 U.S.C. 119 to Korean Patent Application No. 10-2020-0016644, filed on Feb. 11, 2020, in the Korean Intellectual Property Office, the disclosures of which are herein incorporated by reference in their entirety.

BACKGROUND

1. Field

The disclosure relates to a method and an apparatus for efficiently managing a dormant bandwidth part in a next-generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

A 5G communication system has been developed to provide various services, and a method of efficiently providing the services is needed according to provision of the various services. As the method, research on a method of efficiently operating a dormant bandwidth part is being actively performed.

The above information is presented as background information only to assist with an understanding of the disclosure. No determination has been made, and no assertion is made, as to whether any of the above might be applicable as prior art with regard to the disclosure.

SUMMARY

In a next-generation mobile communication system, carrier aggregation may be used to provide a service having a high data transmission rate and low transmission latency to a UE. However, a method of preventing processing latency that may be generated when carrier aggregation is configured in a UE having a connection with a network and is activated or when carrier aggregation is deactivated after being used is needed. Particularly, if the UE maintains a plurality of cells in an activated state in order to use the carrier aggregation, the UE is required to monitor a PDCCH (physical downlink control channel) for each cell, so that battery consumption of the UE may increase. On the other hand, if the plurality of cells remain in an deactivated state in order to reduce battery consumption of the UE, data transmission/reception latency may occur due to latency generated when the plurality of cells are activated through the use of carrier aggregation.

In accordance with an aspect of the disclosure, a method performed by a terminal in a wireless communication system is provided. The method comprises receiving, from a base station, a radio resource control (RRC) message configuring a dormant bandwidth part (BWP) for a secondary cell (SCell) of a cell group, the RRC message including first information on a BWP identifier (ID) of the dormant BWP for the SCell, second information on a state of the SCell, and third information on a first active downlink BWP for the SCell; identifying whether the state of the SCell is indicated as an activated state based on the second information; identifying whether the first active downlink BWP for the SCell is indicated as the dormant BWP based on the first information and the third information, in case that the state of the SCell is indicated as the activated state; performing a channel state information (CSI) measurement for the dormant BWP, in case that the first active downlink BWP for the SCell is indicated as the dormant BWP; and transmitting, to the base station, a CSI report based on the CSI measurement for the dormant BWP.

Further, the method comprises stopping a BWP inactivity timer, in case that the first active downlink BWP for the SCell is indicated as the dormant BWP.

In the method, the RRC message further includes a first SCell group ID to which the SCell belongs for a dormancy related PDCCH within active time, a second BWP ID for a downlink BWP to be activated based on the dormancy related PDCCH within active time, second SCell group ID to which the SCell belongs for a dormancy related PDCCH outside active time, and a third BWP ID for a downlink BWP to be activated based on the dormancy related PDCCH outside active time.

In the method, the dormant BWP for the SCell is switched to the downlink BWP of the second BWP ID, in case that the dormancy related PDCCH within active time is received, and the dormant BWP for the SCell is switched to the downlink BWP of the third BWP ID, in case that the dormancy related PDCCH outside active time is received.

Further, the method comprises receiving, from the base station, a PDCCH including fourth information on a resource allocation type and fifth information on a frequency domain resource assignment; and identifying a bitmap included in the PDCCH as indicating a dormancy for the SCell based on the fourth information and the fifth information, wherein the dormant BWP for the SCell is switched to the downlink BWP of the second BWP ID, in case that a bit corresponding to the SCell in the bitmap indicates to leave the dormant BWP.

In accordance with another aspect of the disclosure, a terminal in a wireless communication system is provided. The terminal comprises: a transceiver configured to transmit and receive a signal; and a controller coupled with the transceiver and configured to: receive, from a base station, a radio resource control (RRC) message configuring a dormant bandwidth part (BWP) for a secondary cell (SCell) of a cell group, the RRC message including first information on a BWP identifier (ID) of the dormant BWP for the SCell, second information on a state of the SCell, and third information on a first active downlink BWP for the SCell, identify whether the state of the SCell is indicated as an activated state based on the second information, identify whether the first active downlink BWP for the SCell is indicated as the dormant BWP based on the first information and the third information, in case that the state of the SCell is indicated as the activated state, perform a channel state information (CSI) measurement for the dormant BWP, in case that the first active downlink BWP for the SCell is indicated as the dormant BWP, and transmit, to the base station, a CSI report based on the CSI measurement for the dormant BWP.

In accordance with another aspect of the disclosure, a method performed by a base station in a wireless communication system is provided. The method comprising: transmitting, to a terminal, a radio resource control (RRC) message configuring a dormant bandwidth part (BWP) for a secondary cell (SCell) of a cell group, the RRC message including first information on a BWP identifier (ID) of the dormant BWP for the SCell, second information on a state of the SCell, and third information on a first active downlink BWP for the SCell; and receiving, from the terminal, a channel state information (CSI) report based on a CSI measurement for the dormant BWP, wherein the CSI measurement for the dormant BWP is performed, in case that the state of the SCell is indicated as an activated state based on the second information, and the first active downlink BWP for the SCell is indicated as the dormant BWP based on the first information and the third information.

In accordance with another aspect of the disclosure, a base station in a wireless communication system is provided. The base station comprises: a transceiver configured to transmit and receive a signal; and a controller coupled with the transceiver and configured to: transmit, to a terminal, a radio resource control (RRC) message configuring a dormant bandwidth part (BWP) for a secondary cell (SCell) of a cell group, the RRC message including first information on a BWP identifier (ID) of the dormant BWP for the SCell, second information on a state of the SCell, and third information on a first active downlink BWP for the SCell, and receive, from the terminal, a channel state information (CSI) report based on a CSI measurement for the dormant BWP, wherein the CSI measurement for the dormant BWP is performed, in case that the state of the SCell is indicated as an activated state based on the second information, and the first active downlink BWP for the SCell is indicated as the dormant BWP based on the first information and the third information.

The disclosure proposes a new dormant mode to allow a UE in a radio resource control (RRC)-connected mode having a connection with a network to rapidly activate and deactivate carrier aggregation in a next-generation mobile communication system. The disclosure proposes a method of operating a new dormant (or hibernation) mode in units of bandwidth parts (bandwidth part-levels) to rapidly activate the carrier aggregation and save a battery of the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 15 proposes the structure of an RRC message for configuring configuration information for the application of the first embodiment, the second embodiment, the third embodiment, or the fourth embodiment proposed in the disclosure;

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

Figure 1:
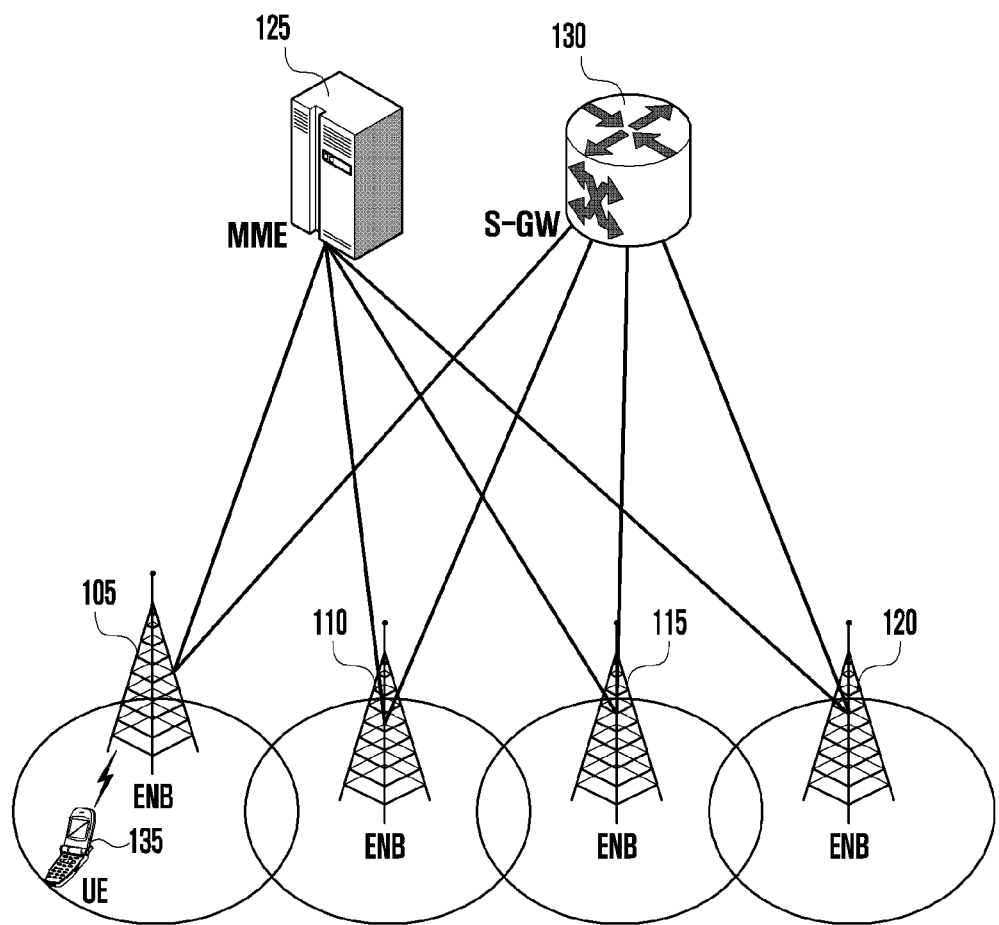
FIG. 1 illustrates the structure of an LTE system to which the disclosure can be applied.

FIG. 1 illustrates the structure of an LTE system to which the disclosure can be applied.

Referring to FIG. 1, a radio access network of the LTE system includes next-generation evolved node Bs (hereinafter, referred to as ENBs, Node Bs, or base stations) 105, 110, 115 and 120, a mobility management entity (MME) 125, and a serving-gateway (S-GW) 130. A user equipment 135 (hereinafter, referred to as a UE or a terminal) may access an external network through the ENBs 105 to 120 and the S-GW 130.

In FIG. 1, the ENBs 105 to 120 correspond to conventional Node Bs of a universal mobile telecommunications system (UTMS). The ENB is connected to the UE 135 through a radio channel, and performs a more complicated role than the conventional node B. In the LTE system, since all user traffic including a real time service such as a voice over IP (VoIP) through an Internet protocol are serviced through a shared channel, an apparatus for collecting and scheduling status information on buffer statuses of UEs, available transmission power status, and channel statuses is required, and the ENBs 105 to 120 serve as this apparatus. In general, one ENB may control a plurality of cells. For example, in order to implement a transmission rate of 100 Mbps, the LTE system may use orthogonal frequency-division multiplexing (OFDM) as a wireless access technology in a bandwidth of 20 MHz. Furthermore, an adaptive modulation and coding (AMC) scheme of determining a modulation scheme and a channel-coding rate is applied depending on the channel status of the UE. The S-GW 130 is a device for providing a data bearer, and generates or removes the data bearer under a control of the MME 125. The MME is a device for performing not only a function of managing the mobility of the UE but also various control functions, and may be connected to a plurality of ENBs.

Figure 2:
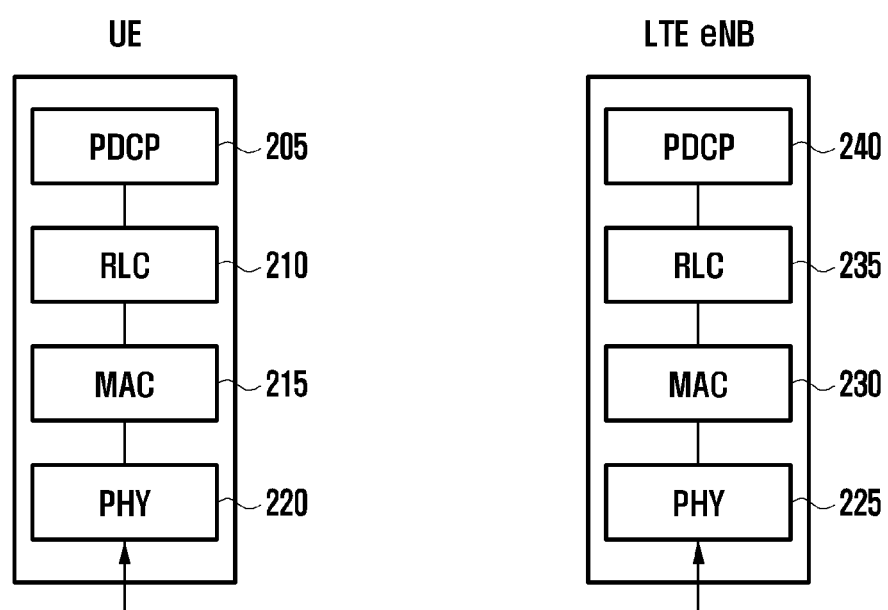
FIG. 2 illustrates the structure of a wireless protocol in an LTE system to which the disclosure can be applied.

FIG. 2 illustrates the structure of a wireless protocol in an LTE system to which the disclosure can be applied.

Referring to FIG. 2, the UE and the ENB includes Packet data convergence protocols (PDCPs) 205 and 240, radio link controls (RLCs) 210 and 235, medium access controls (MACs) 215 and 230, respectively, in the wireless protocol of the LTE system. The packet data convergence protocols (PDCPs) 205 and 240 perform an operation of compressing/reconstructing an IP header. The main functions of the PDCP are described below.

- Header compression and decompression function (Header compression and decompression: ROHC only)
- User data transmission function (transfer of user data)
- Sequential delivery function (in-sequence delivery of upper-layer PDUs at PDCP reestablishment procedure for RLC AM)
- Sequence re-arrangement function (For split bearers in DC (only support for RLC AM): PDCP PDU routing for transmission and PDCP PDU reordering for reception)
- Duplicate detection function (duplicate detection of lower-layer SDUs at PDCP reestablishment procedure for RLC AM)
- Retransmission function (retransmission of PDCP SDUs at handover and, for split bearers in DC, of PDCP PDUs at PDCP data recovery procedure, for RLC AM)
- Ciphering and deciphering function (Ciphering and deciphering)
- Timer-based SDU removal function (timer-based SDU discard in uplink)

Radio Link Control (RLC) 210 or 235 reconfigures the PDCP Packet Data Unit (PDU) to be the proper size and performs an ARQ operation. The main functions of the RLC are summarized below.

- Data transmission function (transfer of upper-layer PDUs)
- ARQ function (Error Correction through ARQ (only for AM data transfer))
- Concatenation, segmentation, and reassembly function (Concatenation, segmentation and reassembly of RLC SDUs (only for UM and AM data transfer))
- Re-segmentation function (re-segmentation of RLC data PDUs (only for AM data transfer))
- Reordering function (reordering of RLC data PDUs (only for UM and AM data transfer))
- Duplication detection function (duplicate detection (only for UM and AM data transfer))
- Error detection function (protocol error detection (only for AM data transfer))
- RLC SDU deletion function (RLC SDU discard (only for UM and AM data transfer))
- RLC reestablishment function (RLC reestablishment)

The MACs 215 and 230 are connected with various RLC layer devices configured in one UE, and perform an operation for multiplexing RLC PDUs to the MAC PDU and de-multiplexing the RLC PDUs from the MAC PDU. The main functions of the MAC are summarized below.

- Mapping function (Mapping between logical channels and transport channels)
- Multiplexing and demultiplexing function (Multiplexing/demultiplexing of MAC SDUs belonging to one or multiple different logical channels into/from transport blocks (TB) delivered to/from the physical layer on transport channels)
- Scheduling information report function (scheduling information reporting)
- HARQ (hybrid automatic repeat request) function (error correction through HARQ)
- Logical channel priority control function (priority handling between logical channels of one UE)
- UE priority control function (priority handling between UEs by means of dynamic scheduling)
- MBMS service identification function (MBMS service identification)
- Transport format selection function (transport format selection)
- Padding function (padding)

The PHY layers 220 and 225 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3:
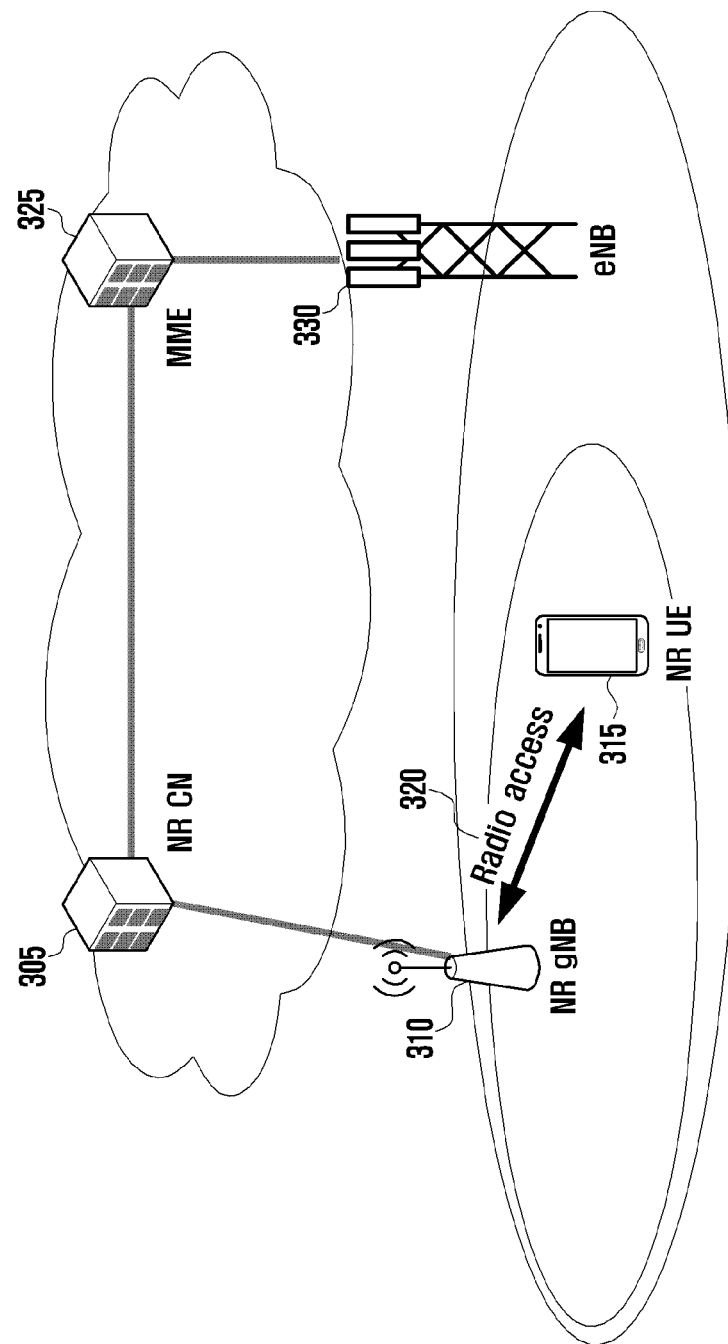
FIG. 3 illustrates the structure of a next-generation mobile communication system to which the disclosure can be applied.

FIG. 3 illustrates the structure of a next-generation mobile communication system to which the disclosure can be applied.

Referring to FIG. 3, a radio access network of the next-generation mobile communication system (hereinafter, referred to as NR or 5G) includes a next-generation base station 310 (new radio node B, hereinafter, referred to as a gNB or an NR NB) and a new radio core network (NR CN) 305 as illustrated in FIG. 3. A user terminal 315 (hereinafter, referred to as a new radio user equipment (NR UE) or a terminal) accesses an external network through the base station 310 and the NR CN 305.

The base station 310 of FIG. 3 corresponds to an evolved Node B (eNB) in a conventional LTE system. The base station may be connected to the NR UE 315 through a radio channel and may provide better service than the conventional node B. Since all user traffic is served through a shared channel in the next-generation mobile communication system, a device for collecting and scheduling status information of buffer statuses, available transmission power statuses, and channel statuses of UEs is required, and corresponds to the NR NB 310. One base station generally controls a plurality of cells. The base station may have a bandwidth wider than the conventional maximum bandwidth in order to implement super-high-speed data transmission compared to conventional LTE, may apply orthogonal frequency-division multiplexing (OFDM) through radio-access technology, and may further apply beamforming technology. Further, an adaptive modulation and coding (AMC) scheme of determining a modulation scheme and a channel-coding rate is applied depending on the channel status of the NR UE. The NR CN 305 performs a function of supporting mobility, configuring a bearer, and configuring QoS. The NR CN is a device for performing a function of managing the mobility of the NR UE and various control functions, and is connected to a plurality of base stations. Further, the next-generation mobile communication system may be linked to the conventional LTE system, and the NR CN is connected to an MME 325 through a network interface. The MME is connected to an eNB 330, which is a conventional base station.

Figure 4:
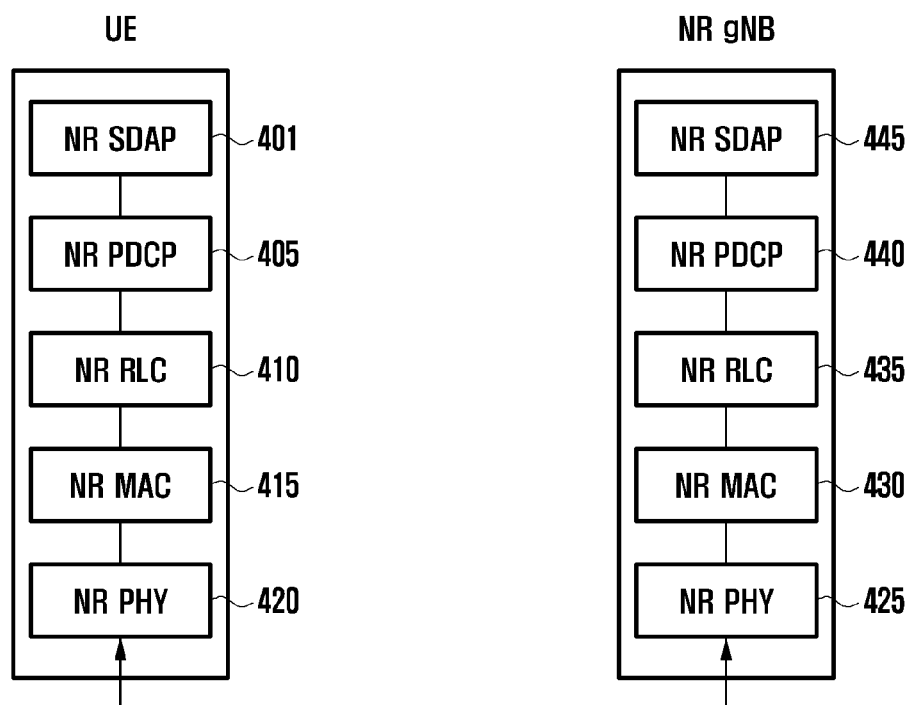
FIG. 4 illustrates the structure of a wireless protocol of a next-generation mobile communication system to which the disclosure can be applied.

FIG. 4 illustrates the structure of a wireless protocol of a next-generation mobile communication system to which the disclosure can be applied.

Referring to FIG. 4, the UE and the base station include NR SDAPs 401 and 445, NR PDCPs 405 and 440, NR RLCs 410 and 435, and NR MACs 415 and 430 in the wireless protocol of the next-generation mobile communication system.

The main functions of the NR SDAPs 401 and 445 may include some of the following functions.

User data transmission function (transfer of user-plane data)
Function of mapping QoS flow and a data bearer for uplink and downlink (mapping between a QoS flow and a DRB for both DL and UL)
Function of marking a QoS flow ID for uplink and downlink (marking QoS flow ID in both DL and UL packets)
Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCPs 405 and 440 may include some of the following functions.

Header compression and decompression function (Header compression and decompression: ROHC only)
User data transmission function (transfer of user data)
Sequential delivery function (in-sequence delivery of upper-layer PDUs)
Non-sequential delivery function (out-of-sequence delivery of upper-layer PDUs)
Reordering function (PDCP PDU reordering for reception)
Duplicate detection function (duplicate detection of lower-layer SDUs)
Retransmission function (retransmission of PDCP SDUs)
Ciphering and deciphering function (Ciphering and deciphering)
Timer-based SDU removal function (timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the reordered data without regard to the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLCs 410 and 435 may include some of the following functions.

Data transmission function (transfer of upper-layer PDUs)
Sequential delivery function (in-sequence delivery of upper-layer PDUs)
Non-sequential delivery function (out-of-sequence delivery of upper-layer PDUs)
ARQ function (error correction through ARQ)
Concatenation, segmentation, and reassembly function (concatenation, segmentation and reassembly of RLC SDUs)
Re-segmentation function (re-segmentation of RLC data PDUs)
Reordering function (reordering of RLC data PDUs)
Duplicate detection function (duplicate detection)
Error detection function (protocol error detection)
RLC SDU deletion function (RLC SDU discard)
RLC reestablishment function (RLC reestablishment)

The sequential delivery function (In-sequence delivery) of the NR RLC device is a function of sequentially transferring RLC PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer if a predetermined timer expires when there is a lost RLC SDU, a function of sequentially transferring all RLC SDUs received before the timer starts to the higher layer, or if a predetermined timer expires when there is a lost RLC SDU, and a function of sequentially transferring all RLC SDUs received up to that point in time to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential delivery function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 415 and 430 may be connected to a plurality of NR RLC layer devices configured in one UE and main functions of the NR MAC may include some of the following functions.

Mapping function (Mapping between logical channels and transport channels)

Multiplexing and demultiplexing function (multiplexing/demultiplexing of MAC SDUs)

Scheduling information report function (scheduling information reporting)

HARQ function (error correction through HARQ)

Logical channel priority control function (priority handling between logical channels of one UE)

UE priority control function (priority handling between UEs by means of dynamic scheduling)

MBMS service identification function (MBMS service identification)

Transport format selection function (transport format selection)

Padding function (padding)

The NR PHY layers 420 and 425 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Since a frequency of a notably high band can be used in the next-generation mobile communication system, a frequency bandwidth may also be very wide. However, in UE implementation, completely supporting the very wide bandwidth requires high implementation complexity, which incurs high costs. Accordingly, the next-generation mobile communication system may introduce the concept of a bandwidth part (BWP), and thus a plurality of BWPs may be configured in one cell (Spcell (special cell) or Scell (secondary cell)) and the UE and the base station may transmit and receive data in one or a plurality of BWPs according to a configuration of the base station.

The disclosure proposes a state transition method or bandwidth part switching method or a detailed operation considering a state of an Scell and a plurality of bandwidth parts configured in the Scell when a dormant bandwidth part proposed in the disclosure is introduced. Further, the disclosure manages a dormant mode in units of bandwidth parts (BWP-levels) and proposes a state transition method or a bandwidth part switching method, and also proposes a detailed operation in a bandwidth part according to a state of each Scell or a state or a mode (active, inactive, or dormant) of each bandwidth part.

In addition, the disclosure configures a plurality of bandwidth parts for each downlink or uplink in one cell (Spcell, Pcell (primary cell), Pscell (primary secondary cell), or Scell) and configures and operates active bandwidth part (active DL or UL BWP,) a dormant BWP (or dormant DL BWP), or an inactive bandwidth part (inactive or deactivated DL/UL BWP) through bandwidth part switching. That is, it is possible to increase a data transmission rate through a method similar to the carrier aggregation by transitioning a downlink or uplink BWP to an activated state for one cell. Further, the UE does not monitor a PDCCH to save a battery by transitioning or switching the downlink BWP to a dormant BWP. Further, the UE may measure a channel for the downlink BWP and report a channel measurement result, thereby supporting rapid activation of a cell or a BWP in the future. Further, it is possible to save the batter of the UE by transitioning the downlink (or uplink) BWP to a deactivated state in one cell. An indication of the state transition between BWPs for each cell or BWP switching may be configured through an RRC message, a MAC CE, or downlink control information (DCI) of a PDCCH.

In the disclosure, the BWP may be used without distinction between the uplink and the downlink, and the meaning thereof may be each of an uplink BWP and a downlink BWP according to the context.

In the disclosure, a link may be used without distinction between the uplink and the downlink, and the meaning thereof may indicate the uplink or the downlink according to the context.

The disclosure configures and introduces a dormant BWP for the SCell of the UE performing carrier aggregation. The UE configured with the dormant BWP does not monitor a PDCCH in the dormant BWP so as to reduce battery consumption of the UE, and measures a channel (for example, measures or reports channel state information (CSI) or channel quality information (CQI)) or perform beam measurement, beam tracking, or beam operation, thereby performing switching or activation to a normal BWP and thus rapidly starting data transmission in the normal BWP in the case in which data transmission is needed. The dormant BWP may not be configured or applied to the SpCell (the PCell of the MCG (master cell group) or the PCell (or the PSCell) of the SCG (secondary cell group) in which a signal should be continuously monitored, a feedback is transmitted or received, or synchronization is identified or maintained or the SCell in which a PUCCH is configured.

The disclosure proposes various embodiments realized on the basis of PDCCH DCI, a MAC CE, or an RRC message in order to operate the dormant BWP proposed in the disclosure for the SCell of the UE.

The network or the base station may configure a Spcell (Pcell and PScell) and a plurality of Scells in the UE. The Spcell refers to a Pcell when the UE communicates with one base station, and refers to a Pcell of a master base station or a PScell of a secondary base station when the UE communicates with two base stations (the master base station and the secondary base station). The Pcell and the Pscell are primary cells used by each MAC layer device for communication between the UE and the base station, and correspond to cells for synchronizing timing, performing random access, transmitting HARQ ACK/NACK feedback through PUCCH transmission resources, and exchanging most control signals. A technology in which the base station operates a plurality of Scells as well as the Spcell to increase uplink or downlink transmission resources is referred to as carrier aggregation (CA).

When the UE receives a configuration of a Spcell and a plurality of Scells through an RRC message, the UE may receive a configuration of a state or mode for each Scell or a BWP of the SCell through the RRC message, the MAC CE, or the PDCCH DCI. The state or mode of the Scell may be configured as an active mode or activated state, or a deactivated mode or deactivated state. The active mode or the activated state of the Scell may mean that the UE may exchange uplink or downlink data with the gNB in an activated BWP of the SCell, or an activated normal BWP or a BWP other than an activated dormant BWP of the Scell in the active mode or the activated Scell. Further, the active mode or the activated state of the Scell may mean that the UE may monitor a PDCCH to identify an indication of the gNB, measure a channel for a downlink of the Scell in the active mode or the activated state (or an activated BWP, an activated normal BWP, or a BWP other than an activated dormant BWP of the Scell), periodically report measurement information, and periodically transmit a pilot signal (sounding reference signal (SRS)) to the gNB so that the gNB can measure an uplink channel.

However, the deactivated mode or the deactivated state of the SCell may mean that the UE does not monitor a PDCCH to identify an indication of the gNB, does not measure a channel, does not transmit a measurement report, and does not transmit a pilot signal since BWPs configured in the Scell is in the deactivated state, the configured BWPs are not activated, or there is no activated BWP among the configured BWPs.

Accordingly, in order to activate Scells in the inactive mode, the base station first configures measurement configuration information in the UE through an RRC message, and the UE measures a cell or a frequency on the basis of the measurement configuration information. After receiving the cell or frequency measurement report of the UE, the base station may activate the deactivated Scells on the basis of the frequency/channel measurement information. Therefore, much latency may be generated when the gNB activates carrier aggregation for the UE and start data transmission or reception.

The disclosure proposes a dormant mode or a dormant state for a BWP of each activated Scell (or active SCell) or proposes configuration or introduction of a dormant bandwidth part (BWP) for each activated SCell in order to reduce a battery of the UE and rapidly start data transmission or reception.

In a BWP in a dormant mode of the activated Scell or a dormant BWP (dormant BWP in the activated SCell) or when the dormant BWP is activated, the UE cannot exchange data with the gNB, does not monitor a PDCCH to identify an indication from the gNB, or does not transmit a pilot signal but measures a channel, but transmits a report on the measurement result of the measured frequency/cell/channel according to a configuration of the gNB periodically or when an event is generated. Accordingly, since the UE does not monitor the PDCCH in the dormant BWP in the activated Scell and does not transmit the pilot signal, the UE may save a battery compared to a normal BWP (or a BWP other than the dormant BWP or compared to the case in which a normal BWP (or a BWP other than the dormant BWP) of the activated Scell is activated, and the base station may reduce a transmission delay by rapidly activating the normal BWP of the activated SCell based on the measurement report or the measurement report of the dormant BWP of the activated Scell to promptly use the carrier aggregation since the channel measurement report is transmitted unlike the case in which the SCell is deactivated.

The active mode or the activated state of the Scell may mean that the UE may exchange uplink or downlink data with the gNB in an activated BWP of the SCell, an activated normal BWP, or a BWP other than an activated dormant BWP, in the Scell of the active mode or the activated Scell. Further, the active mode or the activated state of the Scell may mean that the UE may monitor a PDCCH to identify an indication of the gNB, measure a channel for a downlink of the Scell in the active mode or the activated state (or an activated BWP, an activated normal BWP, or a BWP other than an activated dormant BWP of the Scell), periodically report measurement information, and periodically transmit a pilot signal (sounding reference signal (SRS)) to the gNB so that the gNB can measure an uplink channel. In the disclosure, the active mode or the activated state of the Scell may mean that the UE cannot exchange uplink or downlink data with the gNB in an activated dormant BWP of the Scell, the UE cannot monitor a PDCCH to identify an indication of the gNB, but the UE can measure a channel for the downlink of the activated dormant BWP of the Scell in the active mode or the activated state, and the UE can periodically report measurement information to the gNB in the Scell in the active mode or the activated Scell.

In the disclosure, the dormant BWP may be a state of the BWP or may be used as a name of the logical concept indicating a specific BWP. Accordingly, the dormant BWP may be activated, deactivated, or switched. For example, an indication indicating switching of an activated second BWP of a first Scell to a dormant BWP, an indication indicating transition of a the first SCell to a dormant state or a dormant mode, or an indication indicating activation of the dormant BWP of the first SCell may be interpreted as the same meaning.

In the disclosure, the normal BWP may indicate a BWP other than a dormant BWP among a BWP configured in each SCell of the UE through an RRC message. In the normal BWP, the UE may exchange uplink or downlink data with the gNB, monitor a PDCCH to identify an indication of the gNB, measure a channel for the downlink, periodically report measurement information to the gNB, and periodically transmit a pilot signal (sounding reference signal (SRS)) to the gNB to allow the gNB to measure an uplink channel. Further, the normal BWP may indicate a first active BWP, a default BWP, a first active BWP activated from a dormant state, or an initial BWP.

Among BWPs configured in each SCell of the UE, only one dormant BWP may be configured for the downlink. In another method, among BWPs configured in each SCell of the UE, one dormant BWP may be configured for the uplink or the downlink.

Figure 5:
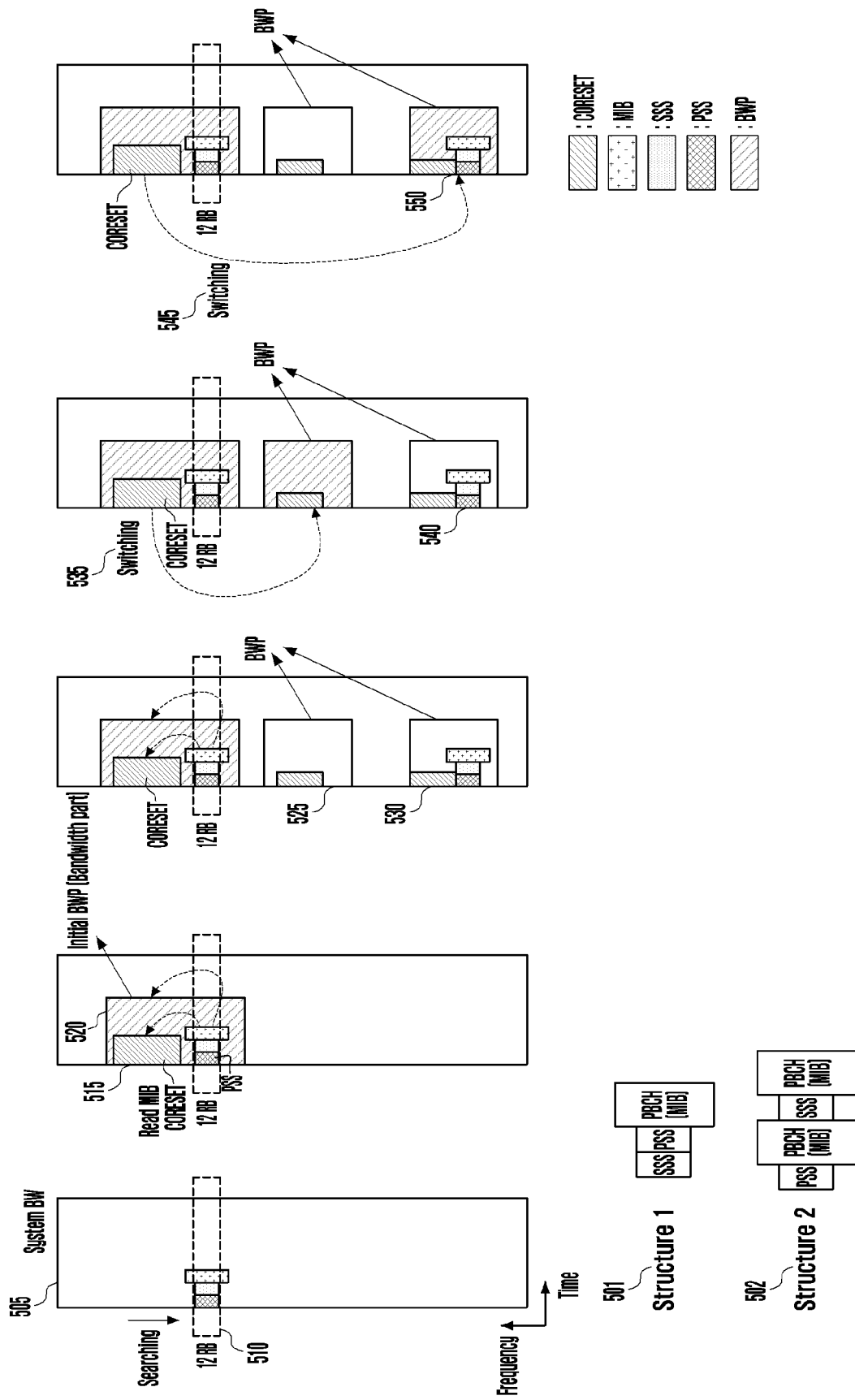
FIG. 5 illustrates a procedure of providing a service to a UE through the efficient use of a significantly wide frequency bandwidth in a next-generation mobile communication system of the disclosure.

FIG. 5 illustrates a procedure of providing a service to a UE through the efficient use of a significantly wide frequency bandwidth in a next-generation mobile communication system of the disclosure.

In FIG. 5, a method of providing a service to UEs having different capabilities or categories by efficiently using a significantly wide frequency bandwidth and saving a battery in the next-generation mobile communication system is described.

One cell to which an base station provides a service may serve a significantly wide frequency band as indicated by reference numeral 505. However, in order to provide a service to UEs having different capabilities, the wide frequency bandwidth may be divided into a plurality of bandwidth parts to manage one cell.

First, the UE, when power thereof is initially turned on, may search the entire frequency band provided by a service provider (PLMN) in units of predetermined resource blocks (for example, in units of 12 resource blocks (RBs)). That is, the UE may start discovering a primary synchronization sequence (PSS)/secondary synchronization sequence (SSS)

in the entire system bandwidth in units of resource blocks as indicated by reference numeral 510. If the UE searches for the PSS/SSS 501 or 502 in units of resource blocks and then detects the signals, the UE may read the signals, analyze (decode) the signals, and identify a boundary between a subframe and a radio transmission resource frame (radio frame). Accordingly, the subframe may be separated in units of 13 s and the UE synchronizes a downlink signal with the base station. The resource block (RB) is the size of a predetermined frequency resource and a predetermined time resource, and may be defined as a two-dimensional unit. For example, the RB may be defined in units of 13 s as time resources and defined by 12 subcarriers (1 carrier×15 kHz=180 kHz) as frequency resources. If the UE completes synchronization, the UE may identify information on a control resource set (CORESET) by checking a master system information block (MIB) or minimum system information (MSI) and identify initial access bandwidth part (BWP) information as indicated by reference numerals 515 and 520. CORESET information refers to the location of time/frequency transmission resources through which a control signal is transmitted from the base station, and may be, for example, the location of resources through which a PDCCH channel is transmitted. That is, the CORESET information is information indicating resources through which first system information (system information block 1: SIB 1) is transmitted and indicates frequency/time resources through which a PDCCH is transmitted. The UE may identify information on an initial BWP by reading the first system information. As described above, if the UE completes synchronization of the downlink signal with the base station and is able to receive a control signal, the UE may perform a random-access procedure in an initial BWP of a cell on which the UE camps, make a request for configuring an RRC connection, receive an RRC message, and make an RRC connection configuration.

In the RRC connection configuration, a plurality of BWPs may be configured per cell (Pcell, Pscell, Spcell, or Scell). A plurality of BWPs may be configured for the downlink within one cell, and a plurality of BWPs may be configured for the uplink separately.

The plurality of BWPs may be indicated and configured by a bandwidth part identifier (BWP identifier) to be used as an initial BWP, a default BWP, a first active BWP, a dormant BWP, or a first active BWP activated from a dormant state (first active BWP from dormant).

The initial BWP may be used as a cell-specific BWP, one of which exists per cell, and may be used as a BWP in which the UE initially accessing the cell may configure the connection in the cell through a random-access procedure or in which the UE configuring the connection may perform synchronization. The base station may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the UE which accesses the base station through an RRC message. The initial BWP may be used while being designated with BWP identifier number 0 in each of the uplink and the downlink. That is, all UEs accessing the same cell may equally designate the same initial BWP to BWP identifier number 0 use the initial BWP. This confers an advantage of easily performing a contention-based random-access procedure because the base station can transmit a random-access response (RAR) message in the initial BWP, which all UEs can read, during the random-access procedure.

The first active BWP may be configured to be UE-specific and may be designated and indicated by a BWP identifier among a plurality of BWPs. The first active BWP may be configured for each of the downlink and the uplink, and include a first active downlink BWP and a first active uplink BWP configured with respective BWP identifiers. When a plurality of BWPs are configured in one cell, the first active BWP may be used to indicate which BWP is to be activated and used first. For example, when a Pcell or Pscell and a plurality of Scells are configured in the UE and a plurality of BWPs are configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving information indicating activation of the Scell or the BWP in a deactivated state through an RRC message, MAC control information, or DCI, the UE may perform an operation of switching the current or activated downlink BWP of the Scell to activate the first active downlink BWP (or a BWP configured or indicated by an RRC message) or switching the current or activated uplink BWP to activate the first active uplink BWP (or a BWP configured or indicated by an RRC message). Further, the UE may perform the operation when receiving an indication indicating transition of the Scell or the BWP to the dormant state through an RRC message, MAC control information, or DCI. This is because the base station can effectively use carrier aggregation only by measuring and reporting a frequency/channel for the first active downlink/uplink BWP even when a channel measurement report is transmitted in the dormant state since the current or activated downlink BWP is switched to activate the first active downlink BWP (or the BWP configured or indicated by the RRC message) or the uplink BWP is switched to activate the first active uplink BWP (or the BWP configured or indicated by the RRC message) when the Scell or the BWP is activated.

The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched, and the BWP may be indicated by a BWP identifier (for example, 0, 1, 2, 3, or 4).

The reason why the default BWP is used only for the downlink is to make it easy to perform base station scheduling because the base station allows the UE to receive an indication of the base station (for example, DCI of a PDCCH) by falling back to the default BWP for each cell after a predetermined time. For example, if the base station configures the default BWP of the UEs accessing one cell as the initial BWP, the base station may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the base station, the default BWP may be defined and configured for the uplink and thus used like the default BWP of the downlink.

The dormant BWP refers to a BWP in a dormant mode of the activated Scell or a dormant BWP (dormant BWP in the activated Scell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH in the dormant BWP in the activated Scell and does not transmit the pilot signal, the UE may save a battery compared to a normal BWP (or a BWP which is not the dormant BWP) of the activated SCell or compared to the case in which a normal BWP (or a BWP which is not the dormant BWP) of the activated Scell is activated, and the base station may reduce transmission latency by rapidly activating the normal BWP of the activated SCell based on the measurement report or the measurement report of the dormant BWP of the activated Scell to promptly use the carrier aggregation since the channel measurement report is transmitted unlike the case in which the SCell is deactivated.

A first active BWP activated from a dormant state after switching from a dormant state or a dormant BWP (or a first active non-dormant BWP or a BWP configured or indicated through an RRC message) may be a BWP which should be activated by switching the current or activated BWP of the activated SCell by the UE or a BWP which should be activated from a dormant state configured in the RRC message according to an indication in the case in which the UE receives an indication of switching a BWP of the activated SCell from a dormant BWP to a normal BWP (or a BWP which is not the dormant BWP) from the base station through PDCCH DCI, a MAC CE, or an RRC message, receives an indication of switching or transitioning an active BWP from a dormant BWP to a normal BWP, or receives an indication indicating switching or transitioning the active BWP from the dormant BWP to the normal BWP (for example, a first active BWP activated from a dormant state) when the UE operates a BWP of one activated SCell as a dormant BWP or when an activated BWP of the activated SCell is a dormant BWP or is switched to a dormant BWP in the SCell.

Figure 6:
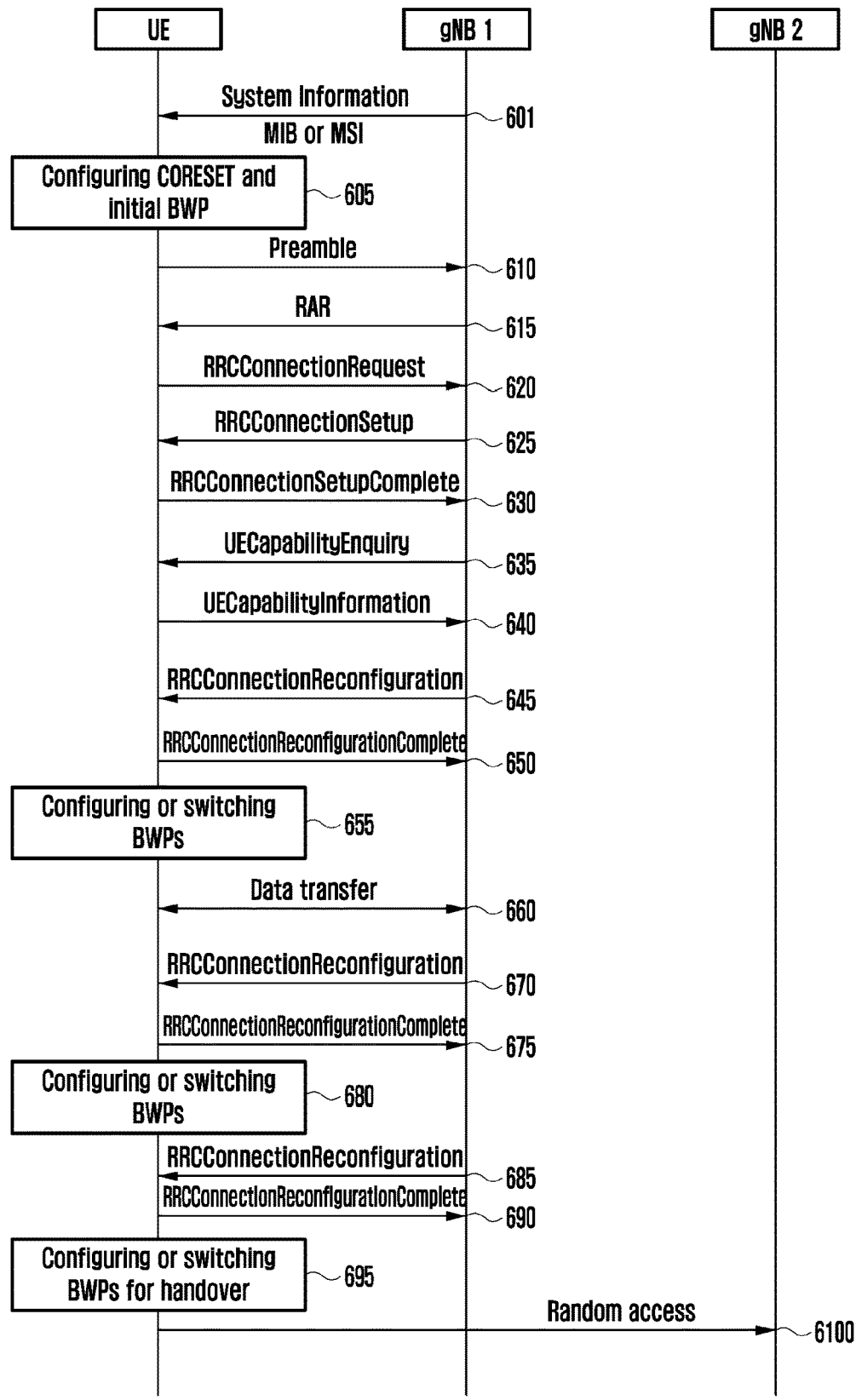
FIG. 6 illustrates a procedure in which the UE transitions from an RRC-idle mode to an RRC-connected mode in the next-generation mobile communication system of the disclosure and proposes a method of configuring a plurality of bandwidth parts (BWPs) and configuring a default BWP or a first active BWP.

FIG. 6 illustrates a procedure in which the UE switches from an RRC-idle mode to an RRC-connected mode in the next-generation mobile communication system of the disclosure and proposes a method of configuring a plurality of bandwidth parts (BWPs) and configuring a default BWP or a first active BWP.

One cell to which the base station provides service may serve a very wide frequency band. First, the UE may search the entire frequency band provided by a service provider (PLMN) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks. If the UE searches for the PSS/SSS in units of resource blocks and then detects the signals, the UE may read the signals, analyze (decode) the signals, and identify a boundary between a subframe and a radio transmission resource frame (radio frame). If the UE completes synchronization, the UE may read system information of a cell on which the UE currently camps. That is, the UE may identify information on a control resource set (CORESET) by checking a master system information block (MIB) or minimum system information (MSI) and identify initial access bandwidth part (BWP) information by reading system information in steps 601 and 605. CORESET information refers to the location of time/frequency transmission resources through which a control signal is transmitted from the base station, and may be, for example, the location of resources through which a PDCCH channel is transmitted.

As described above, if the UE completes synchronization of the downlink signal with the base station and is able to receive a control signal, the UE may perform a random-access procedure in the initial BWP, receive a random-access response, make a request for configuring an RRC connection, receive an RRC message, and configure the RRC connection in steps 610, 615, 620, 625, and 630.

If the basic RRC connection is completely configured, the base station may transmit an RRC message which asks about a UE capability to the UE (UECapabilityEnquire) in order to identify the UE capability in 635. In another method, the base station may ask (request) the MME or the AMF about the UE capability in order to identify the UE capability. This is because the MME or the AMF may have UE capability information if the UE previously accessed the MME or the AMF. If there is no UE capability required by the base station, the base station may make a request for UE capability to the UE.

The reason why the base station transmits the RRC message to the UE to identify the UE capability is to identify the UE capability, for example, information indicating a frequency band that the UE can read or an area of the frequency band that the UE can read. After identifying the UE capability, the base station may configure an appropriate BWP in the UE. If the UE receives the RRC message which asks about the UE capability, the UE may indicate a range of a bandwidth which the UE supports, indicate an offset from a reference center frequency to inform of a range of a bandwidth supported in the current system bandwidth, directly indicate a start point and a last point of the supported frequency bandwidth, or indicate a center frequency and a bandwidth in step 640.

The BWP may be configured through an RRCSetup message or an RRCResume message of the RRC connection configuration in step 625 or an RRCReconfiguration message in step 645, the RRC message may include configuration information of a PCell, a Pscell, or a plurality of Scells, and a plurality of BWPs may be configured for each cell (PCell, Pscell, or Scell). When a plurality of BWPs is configured for each cell, a plurality of BWPs to be used in the downlink of each cell may be configured. In the case of an FDD system, a plurality of BWPs to be used in the uplink of each cell may be configured to be distinguished from downlink BWPs. In the case of a TDD system, a plurality of BWPs to be used in common in the downlink and the uplink of each cell may be configured.

The information for configuring the BWP of each cell (PCell, Pscell, or Scell) may include some of the following information.

Downlink BWP configuration information of the cell
Initial downlink BWP configuration information
A plurality of pieces of BWP configuration information and BWP IDs corresponding to the respective BWPs
Initial state configuration information of the downlink BWP of the cell (for example, activated state, dormant state, or deactivated state)
A BWP ID indicating a first active downlink BWP
A BWP identifier indicating a default BWP
Configuration information for monitoring a PDCCH for each BWP. For example, the configuration information includes CORESET information, search space resource information, PDCCH transmission resources, periodicity, and subframe number information
A BWP identifier indicating a dormant BWP or a 1-bit indicator indicating a dormant BWP for each BWP in the BWP configuration information
A BWP identifier indicating a first active BWP activated from a dormant state or a 1-bit indicator indicating a first active BWP activated from a dormant state for each BWP in the BWP configuration information
BWP inactivity timer configuration and a timer value
Uplink BWP configuration information of the cell
Initial uplink BWP configuration information
A plurality of pieces of BWP configuration information and BWP IDs corresponding to the respective BWPs
Initial state configuration information of the downlink BWP of the cell (for example, activated state, dormant state, or deactivated state)
A BWP identifier indicating a dormant BWP or a 1-bit indicator indicating a dormant BWP for each BWP in the BWP configuration information
A BWP identifier indicating a first active uplink BWP The configured initial BWP, default BWP, or first active BWP may be used for the following purpose, and may be operated so as to suit the purpose.

The initial BWP may be used as a cell-specific BWP, one of which exists per cell, and may be used as a BWP in which the UE initially accessing the cell may configure the connection in the cell through a random-access procedure or in which the UE configuring the connection may perform synchronization. The base station may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the UE which accesses the base station through an RRC message. The initial BWP may be used while being designated with BWP identifier number 0 in each of the uplink and the downlink. That is, all UEs accessing the same cell may equally designate the same initial BWP to BWP identifier number 0 use the initial BWP. This confers an advantage of easily performing a contention-based random-access procedure because the base station can transmit a random-access response (RAR) message in the initial BWP, which all UEs can read, during the random-access procedure.

The first active BWP may be configured to be UE specific and may be designated and indicated by a BWP identifier among a plurality of BWPs. The first active BWP may be configured for each of the downlink and the uplink, and include a first active downlink BWP and a first active uplink BWP configured as respective BWP identifiers. When a plurality of BWPs is configured in one cell, the first active BWP may be used to indicate which BWP is to be activated and used first. For example, when a Pcell or Pscell and a plurality of Scells are configured in the UE and a plurality of BWPs is configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving an indication indicating activation of any Scell or a BWP of any activated Scell in a deactivated state or a dormant state or switching or activation from an inactive or dormant bandwidth to a normal BWP through an RRC message, MAC control information, or DCI of a PDCCH, the UE may perform an operation of switching the current or activated downlink BWP of the Scell to activate the first active downlink BWP (or a BWP configured or indicated by an RRC message) or switching the current or activated uplink BWP to activate the first active uplink BWP (or a BWP configured or indicated by an RRC message). Further, upon receiving an indication indicating transition of the activated Scell or the BWP to the dormant state or an indication indicating switching or activation to the dormant BWP through the RRC message, MAC control information, or the DCI Of the PDCCH, the UE may switch the BWP to the dormant BWP, activate the BWP, or make the BWP be the dormant state.

Making the BWP be in the dormant state, switching the BWP to the dormant BWP, or activating the dormant BWP may indicate the performance of an operation proposed in the dormant state in the disclosure. That is, an operation of measuring a channel in a downlink BWP (or a dormant BWP) and transmitting a report to the base station without monitoring a PDCCH may be performed. In another method, when the activated SCell or BWP is activated or switched to the normal BWP, a first active downlink BWP may be activated by switching a downlink BWP and a first active uplink BWP may be activated by switching an uplink BWP, and thus the dormant BWP may be configured as the first active downlink or uplink BWP or a default BWP. The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform base station scheduling because the base station allows the UE to receive an indication of the base station (for example, DCI of a PDCCH) by falling back to the default BWP for each cell after a predetermined time. For example, if the base station configures the default BWP of the UEs accessing one cell as the initial BWP, the base station may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the base station, the default BWP may be defined and configured for the uplink and thus used like the default BWP of the downlink.

The dormant BWP refers to a BWP in a dormant mode of the activated Scell or a dormant BWP (dormant BWP in the activated Scell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH in the dormant BWP in the activated Scell and does not transmit the pilot signal, the UE may save a battery compared to a normal BWP (or a BWP other than the dormant BWP or compared to the case in which a normal BWP (or a BWP other than the dormant BWP) of the activated Scell is activated, and the base station may reduce a transmission delay by rapidly activating the normal BWP of the activated SCell based on the measurement report or the measurement report of the dormant BWP of the activated Scell to promptly use the carrier aggregation since the channel measurement report is transmitted unlike the case in which the SCell is deactivated.

The first active BWP activated from a dormant state (or a first active non-dormant BWP) may be a first active BWP activated from a dormant state, that is, BWP which the UE should switch or activate in the activated SCell, configured in the RRC message according to an indication in the case in which the UE receives an indication indicating switching of the BWP of the activated SCell from a dormant BWP to a normal BWP (or a BWP which is not the dormant BWP) through PDCCH DCI, a MAC CE, or an RRC message from the base station, receives an indication indicating switching or transmission of the active BWP from a dormant BWP to a normal BWP, and receives an information indicating switching, transition, or activation of the active BSP from a dormant BWP to a normal BWP (for example, a first active BWP activated from a dormant state).

In the disclosure, switching a first BWP to a second BWP may be activating the second BWP or may be deactivating the activated first BWP and activating the second BWP.

In an RRCSetup message of the RRC connection configuration, an RRCResume message of step 625, or an RRCReconfiguration message of step 645, a state transition timer may be configured to allow the UE to transition the state by itself even though the UE does not receive an indication through an RRC message, MAC control information, or DCI of a PDCCH. For example, if a cell deactivation timer (ScellDeactivationTimer) is configured for each Scell and the cell deactivation timer expires, the Scell may transition to the deactivated state. Alternatively, a downlink (or uplink) BWP hibernation timer (DLBWPHibernationTimer or ULBWPHibernationTimer) may be configured for each SCell or each SCell BWP and a cell hibernation timer (ScellHibernationTimer) may be configured for each SCell. If the cell hibernation timer or the downlink (or uplink) BWP hibernation timer expires, the Scell or the downlink (or uplink) BWP may be transitioned to a dormant state or switched to a dormant BWP. For example, when the cell hibernation timer or the downlink (uplink) BWP hibernation timer expires, the SCell or downlink (uplink) BWP in an activated state may be transitioned or switched to a dormant BWP, and the Scell or downlink (or uplink) BWP in a deactivated state or the dormant state may not be transitioned to a dormant state or a dormant BWP. The BWP hibernation timer may start when an indication indicating switching or activating a BWP is received through an RRC message, a MAC CE, or PDCCH DCI or may stop when an indication indicating switching to a dormant BWP, an indication hibernation of the BWP, or an indication indicating activation of a dormant BWP is received through an RRC message, a MAC CE, or PDCCH DCI. Further, a dormant cell deactivation timer (dormantScellDeactivationTimer) or a dormant or downlink (or uplink) dormant BWP inactivity timer (dormantDLDeactivationTimer or dormantULDeactivationTimer) may be configured for each Scell or downlink (uplink) BWP, and an Scell or downlink (uplink) dormant BWP in a dormant state may be transitioned to a deactivated state. When the dormant cell deactivation timer or the dormant or downlink (uplink) BWP inactivity timer expires, only the Scell or downlink (or uplink) BWP in a dormant state is transitioned to a deactivated state, but the Scell or BWP in an activated state or a deactivated state is not transitioned to the deactivated state. Further, the dormant BWP hibernation timer may start when an indication indicating switching, hibernation, or activation of the dormant BWP is received through an RRC message, a MAC CE, or PDCCH DCI or may stop when an indication indicating deactivation or activation of the BWP or the SCell or an indication indicating activation of a normal BWP (for example, a BWP which is not a dormant BWP configured through RRC) is received through an RRC message, a MAC CE, or PDCCH DCI. If the cell deactivation timer (ScellDeactivationTimer) (or the downlink (or uplink) BWP hibernation timer) and the cell hibernation timer (ScellHibernationTimer) (or the downlink (or uplink) dormant BWP inactivity timer) are configured together, the cell hibernation timer (ScellHibernationTimer) (or the downlink (or uplink) dormant BWP hibernation timer) is prioritized. That is, if the cell hibernation timer (ScellHibernationTimer) (or the downlink (or uplink) BWP hibernation timer) is configured, the corresponding Scell or downlink (or uplink) BWP is not deactivated even though the cell deactivation timer (ScellDeactivationTimer) (or the downlink (or uplink) dormant BWP inactivity timer) expires. In other words, when the cell hibernation timer (or the downlink (or uplink) BWP hibernation timer) is configured, the Scell or downlink (or uplink) BWP may be first transitioned from an activated state to a dormant state or switched to a dormant BWP, and then the cell or BWP which has been transitioned to the dormant state may be transitioned to the deactivated state due to expiration of the dormant cell or BWP inactivity timer. Accordingly, when the cell hibernation timer or the BWP hibernation timer is configured, the cell deactivation timer or the dormant BWP inactivity timer does not influence the state transition of the Scell or downlink (or uplink) BWP. The Scell or downlink (or uplink) BWP is not directly transitioned to the deactivated state if the cell hibernation timer or the BWP hibernation timer is configured even though the cell deactivation timer or the dormant BWP inactivity timer expires.

If the cell deactivation timer (or the downlink (or uplink) BWP hibernation timer) is not configured in the RRC message, the UE may consider the cell deactivation timer (or the downlink (or uplink) BWP hibernation timer) to be set to an infinite value.

In the RRCSetup message of the RRC connection configuration, the RRCResume message of step 625, or the RRCReconfiguration message of step 645, frequency measurement configuration information (measurement configuration) and frequency measurement gap configuration information (measurement gap information) may be configured, and frequency measurement object information may be included. Further, in the RRCSetup message of the RRC connection configuration, the RRCResume message of step 625, or the RRCReconfiguration message of step 645, a function for reducing power consumption of the UE (power saving mode) may be configured, or configuration information such as a discontinuous reception (DRX) cycle, an offset, an on-duration interval (an interval in which the UE should monitor a PDCCH), or time information, time information indicating when the UE should monitor or search for a PDCCH from the gNB before the on-duration interval during the DRX cycle, or short time period information may be configured together with the function for reducing power consumption. If the function for reducing power consumption of the UE is configured, the UE may configure a DRX cycle and search for a wake-up signal (WUS) in an interval configured to monitor the PDCCH by the gNB before the on-duration interval, and the gNB may indicate whether to skip (or not perform) or perform monitoring of the PDCCH in the on-duration interval to the UE through DCI of the PDCCH of the WUS. The UE should monitor the PDCCH in the on-duration interval, but the gNB may allow the UE to reduce battery consumption by making the UE not monitor the PDCCH in the on-duration interval through the WUS.

As described above, when the RRC connection configuration is completed, the UE may configure a plurality of BWPs according to the indication configured through the RRC message. Further, in order to save a battery, the UE may activate one or a small number of BWPs among the plurality of configured BWPs. For example, the gNB may indicate one BWP to be activated. The gNB may indicate activation of the BWP through the RRC message, MAC control information (MAC CE), or L1 signaling (PHY layer control signal such as DCI of the PDCCH) to indicate switching of the initial access BWP to a new BWP. In another method, the UE may define new bitmap information through DCI of the PDCCH and indicate activation, hibernation, or deactivation. In another method, the UE may indicate whether to activate the normal BWP (for example, the first active BWP activated from the dormant state), activate the dormant BWP, switch the dormant BWP, or switch the BWP through the bitmap. Since there are many new accessing users in the initial access BWP, it may be more advantageous for scheduling to allocate a new BWP and separately manage the connected users. This is because the initial access BWP may be shared and used by all UEs in common rather than being configured in a UE-specific manner. Further, the default BWP may be dynamically indicated through the MAC control information, L1 signaling, or system information in order to reduce signaling overhead.

Hereinafter, the disclosure newly proposes the dormant BWP in the next-generation mobile communication system and proposes in detail the UE operation in each BWP when each BWP is transitioned or switched.

Figure 7:
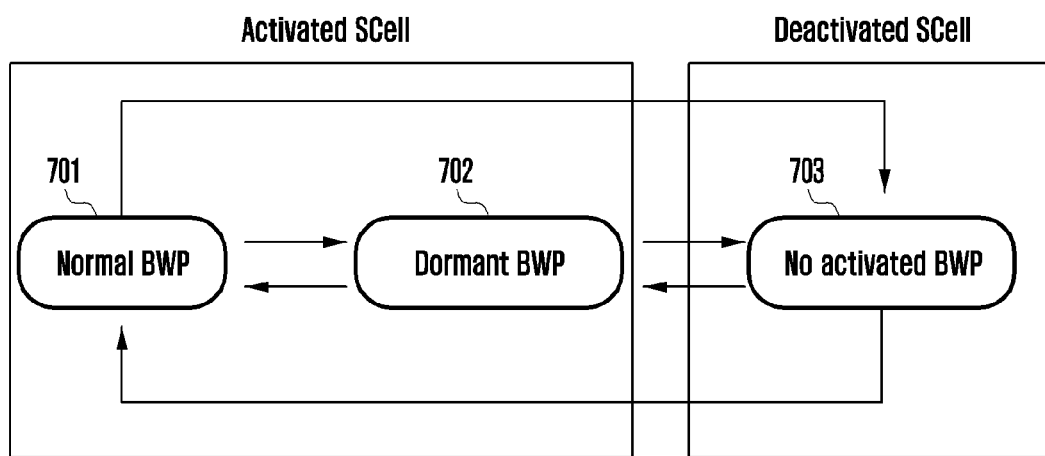
FIG. 7 illustrates a procedure of transitioning a state for each BWP or switching the BWP proposed in the disclosure.

FIG. 7 illustrates a procedure of transitioning a state for each BWP or switching the BWP proposed in the disclosure.

As illustrated in FIG. 7, the BWP of each cell (for example, SCell) of the UE may be activated to a normal BWP as indicated by reference numeral 701, activated to a dormant BWP as indicated by reference numeral 702, or deactivated as indicated by reference numeral 703, and the normal BWP or the dormant BWP may be activated or deactivated through an indication by configuration information of the RRC message, MAC control information, or DCI of the PDCCH. In another method, the BWP of each cell of the UE may have an activated state 701, a deactivated state 703, or a dormant state 702, and may perform state transition due to an indication by configuration information of the RRC message, MAC control information, or DCI of the PDCCH.

The operation of transitioning the state (activated, dormant, or deactivated state) for each BWP of the Scell proposed in the disclosure, or the operation of activating the normal BWP or the dormant BWP, activating the first active BWP activated from the dormant state, or deactivating the normal BWP or the dormant BWP may be performed by an indication or configuration of one of the following cases.

If the state of the BWP of the Scell is configured through the RRC message, or the BWP of each SCell is configured through RRC message, and if the dormant BWP is configured to the SCell, or the first active BWP is configured as the dormant BWP, the SCell starts through switching to or activating the dormant BWP and performs operation in the dormant BWP.

The case in which Scell activation or deactivation, or dormant MAC CEs are received The case in which a MAC CE indicating activation or deactivation of the normal BWP or the first active BWP or the dormant BWP from the dormant state is received, The case in which DCI of a PDCCH indicating activation, deactivation, or switching of the normal BWP or the first active BWP or the dormant BWP from the dormant state is received, The case in which a cell hibernation timer is not configured in an active-state Scell and a configured cell deactivation timer expires, The case in which a BWP hibernation timer is not configured in the active BWP and a configured BWP inactivity timer (for example, a bwpDeactivatedTimer) expires, The case in which a cell hibernation timer configured in an active Scell expires, The case in which a BWP hibernation timer configured in an active BWP expires, The case in which a dormant Scell deactivation timer configured in a dormant Scell expires, The case in which a dormant BWP inactivity timer (dormantBWPDeactivatedTimer) configured in the dormant BWP expires, Further, the state transition operation or the dormant BWP operation method proposed in the disclosure have the following features.

No dormant BWP may be configured in the Spcell (Pcell or Pscell) (or downlink BWP or uplink BWP of the cell) but only a normal BWP is configured therein and is in an activated state. The Spcell performs synchronization and transmits/receives a primary control signal, and thus if the BWP of the Spcell is dormant or inactive or operated as the dormant BWP, the connection with the base station is released, so that the Spcell should be maintained in the activated state.

If a PUCCH is configured in spite of the Scell or the BWP of the SCell, a dormant state or a dormant BWP cannot be configured. The Scell should be in the activated state or use a normal BWP after activating the same since there may be another cell which should transmit a feedback of HARQ ACK/NACK through the PUCCH.

Due to such a characteristic, the cell deactivation timer (ScellDeactivationTimer) or the BWP hibernation timer may not be applied to the Spcell or the BWP of the Spcell and the Scell or the BWP of the SCell in which the PUCCH is configured, and may be driven only for the other Scells.

The cell or BWP hibernation timer (ScellHibernationTimer) is prioritized than the cell or BWP inactivity timer (ScellDeactivationTimer). If one value is set as a timer value through the RRC message, the same value may be applied to all cells. In another method, the base station may configure different timer values for Scells or BWPs in consideration of the characteristics of each Scell or BWP.

If the Scell or BWP is not indicated as being active or dormant through the RRC message, the Scell or BWP may fundamentally operate in the deactivated state initially.

In the disclosure, an uplink may indicate an uplink BWP and a downlink may indicate a downlink BWP. This is because only one active or dormant BWP can be operated for each uplink or downlink.

Hereinafter, the disclosure proposes in detail a method of operating the state transition in units of BWPs (bandwidth part-level) proposed in the disclosure to rapidly activate the carrier aggregation and save the battery of the UE.

In the disclosure, the BWP may be configured for each cell in the RRCSetup message, the RRCReconfiguration message, or the RRCResume message as described with reference to FIG. 6. The RRC message may include configuration information for a PCell, a Pscell, or a plurality of Scells and configure a plurality of BWPs for each cell (PCell, Pscell, or Scell). When the plurality of BWPs are configured for each cell, a plurality of BWPs to be used in the downlink of each cell may be configured in the RRC message. In the case of an FDD system, a plurality of BWPs to be used in the uplink of each cell may be configured to be distinguished from downlink BWPs. In the case of a TDD system, a plurality of BWPs to be used in common in the downlink and the uplink of each cell may be configured.

In a first method of the information configuration method for configuring the BWP of each cell (PCell, Pscell, or Scell), one or a plurality of pieces of the following information is included and a new indicator is introduced in the BWP and thus whether each BWP is a normal BWP (for example, a BWP that can be operated or configured in an activated state or a deactivated state) or a dormant BWP (for example, a BWP that can be operated or configured in a dormant state) may be indicated. For example, whether the BWP is a dormant BWP or not may be indicated through a BWP identifier.

Downlink BWP configuration information of each cell
    Initial downlink BWP configuration information
    A plurality of pieces of BWP configuration information and BWP IDs corresponding to the respective BWPs
    Downlink initial state configuration information of the cell (for example, activated state, dormant state, or deactivated state)
    A BWP identifier indicating a first active downlink BWP
    A BWP identifier indicating a default BWP
    A BWP identifier indicating a dormant BWP or a 1-bit indicator indicating a dormant BWP for each BWP in the BWP configuration information
    BWP inactivity timer configuration and a timer value
    Uplink BWP configuration information of each cell
    Initial uplink BWP configuration information
    A plurality of pieces of BWP configuration information and BWP identifiers (IDs) corresponding to the respective BWPs
    Uplink initial state configuration information of the cell (for example, activated state, dormant state, or deactivated state)
    A BWP identifier indicating a first active uplink BWP
    A BWP identifier indicating a dormant BWP or a 1-bit indicator indicating a dormant BWP for each BWP in the BWP configuration information As another method of the information configuration method of configuring the BWP of each cell (PCell, Pscell, or Scell), a second method may separate configuration information by not configuring configuration information (for example, a search space, PDCCH transmission resources, and periodicity) required to read a PDCCH for a BWP corresponding to a dormant BWP may not be configured (in another method, periodicity may be configured to be very long along with other configuration information) and configuring configuration information (for example, a search space, PDCCH transmission resources, and periodicity) required to read a PDCCH for a normal BWP. This is because the dormant BWP is a BWP to reduce battery consumption of the UE by not reading a PDCCH and may measure a channel and reporting a channel measurement result to the PCell so as to rapidly activate the BWP or the cell, thereby promptly allocating uplink or downlink transmission resources. Accordingly, in the disclosure, the dormant BWP may be a BWP in which configuration information (for example, a search space, PDCCH transmission resources, and periodicity) for PDCCH monitoring is not configured or indicate a BWP indicated by a dormant BWP identifier or a BWP configured to be monitored with very long periodicity even though configuration information for PDCCH monitoring is configured therein. In another method, in the disclosure, the dormant BWP may a BWP in which PDCCH transmission resources and periodicity are not configured in configuration information for PDCCH monitoring and thus the PDCCH monitoring is not performed in the cell in which the dormant BWP is configured but search space information or cross-carrier scheduling configuration information is configured and thus switching or an indication for the dormant BWP is received in another cell through cross-carrier scheduling. Since data transmission/reception is not possible in the dormant BWP, only PDCCH configuration information (PDCCH-config) is configured for the dormant BWP (or a first BWP) (for example, only search space information is configured). On the other hand, PDCCH monitoring should be performed in a normal BWP (or a second BWP) which is not the dormant BWP and also data transmission/reception should be possible, and thus PDCCH configuration information (for example, CORESET configuration information, search space configuration information, PDCCH transmission resources, or periodicity) and PDSCH configuration information, PUSCH configuration information, or random access-related configuration information may be further configured.

Accordingly, as described above, the uplink or downlink normal BWP should be configured for each cell, but the dormant BWP may be or may not be configured for each cell, and the configuration thereof may be handled by base station implementation according to the purpose thereof.

Further, a first active BWP, a default BWP, or an initial BWP may be configured as the dormant BWP according to base station implementation.

In the dormant BWP, the UE cannot exchange data with the base station, does not monitor a PDCCH to identify an indication of the base station, does not a pilot signal, but measures a channel, and reports a measurement result for the measured frequency/cell/channel periodically or when an event is generated according to a configuration of the base station. Accordingly, the UE does not monitor the PDCCH and not transmit the pilot signal in the dormant BWP, thereby reducing a battery compared to the active mode. Unlike the deactivated mode, the UE transmits a channel measurement report, so that the base station may rapidly activate the cell in which the dormant BWP is configured on the basis of the measurement report of the dormant BWP to use carrier aggregation. Further, in the disclosure, the dormant BWP is configured in downlink BWP configuration information and is used only for the downlink BWP.

In the disclosure, the UE operation for the dormant BWP (dormant bandwidth part) or the UE operation for the activated SCell when the dormant BWP is activated is described below.

When the UE receives an indication indicating operation as or activation to a dormant BWP for a serving cell (PCell or SCell) from the PCell or SpCell, receives an indication indicating hibernating a BWP (for example, a downlink BWP) of a serving cell (for example, SCell) or the serving cell (for example, SCell) or an indication indicating activation of a dormant BWP through PDCCH DCI (L1 control signal), a MAC CE, or an RRC message, receives an indication indicating switching of a BWP (for example, a downlink BWP) to a dormant BWP through PDCCH DCI (L1 control signal), a MAC CE, or an RRC message (when the indication is received through PDCCH L1 control signal, the indication may be received by the PDCCH of its own cell through self-scheduling or received by the PDCCH of the PCell through cross-carrier scheduling), a BWP hibernation timer is configured and expires, an activated BWP of the activated Scell is a dormant BWP, or the activated BWP of the activated SCell is not a normal BWP, one or a plurality of operations among the following operations may be performed.

The uplink BWP or the downlink BWP is switched to a BWP (for example, a dormant BWP) configured through RRC, and the BWP is activated or hibernated.

The cell deactivation timer configured or driven in the cell or BWP is stopped.

The BWP hibernation timer is stopped when the BWP hibernation timer is configured in the BWP of the cell.

The dormant BWP inactivity timer starts or restarts in the BWP of the cell.

The BWP inactivity timer configured for the BWP of the cell is stopped. This is to prevent an unnecessary BWP switching procedure in the cell.

Periodic downlink transmission resources (DL SPS or configured downlink assignment) or periodic uplink transmission resources (UL SPS or configured uplink grant Type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the active state to the dormant state. This is because there is no information on periodic transmission resources activated or indicated through L1 signaling when the BWP transitions from the inactive state to the dormant state. In another method, the periodic transmission resources may be released only when the periodic downlink transmission resources or the periodic uplink transmission resources are configured or when the transmission resources are configured and used.

The periodic uplink transmission resources (configured uplink grant Type 1 configured through RRC) configured in the BWP of the cell may be suspended. The term "suspend" means that transmission resource configuration information configured through the RRC message is stored in the UE but is not used anymore. The proposed method, that is, the operation of suspending the periodic uplink transmission resources (configured uplink grant Type 1) may be performed only when the BWP transitions from the active state to the dormant state. This is because periodic transmission resources are not used when the BWP transitions from the inactive state to the dormant state. In another method, the periodic transmission resources may be released only when the periodic downlink transmission resources or the periodic uplink transmission resources are configured or when the transmission resources are configured and used.

An HARQ buffer configured in the uplink or downlink BWP is all emptied.

The UE does not transmit an SRS to the uplink BWP of the cell.

The UE measures a channel (CSI, CQI, PMI, RI, PTI, or CRI) for the downlink in the BWP of the cell according to the configuration of the gNB and reports the measurement. For example, the UE may periodically report the channel or frequency measurement.

The UE does not transmit uplink data through a UL-SCH in the BWP of the cell.

The UE does not perform a rand access procedure for the BWP of the cell.

The UE does not monitor a PDCCH in the BWP of the cell.

The UE does not monitor a PDCCH for the BWP of the cell. However, in the case of cross-scheduling, an indication may be received by monitoring a PDCCH for the cell (for example, SCell) in the scheduled cell (for example, PCell).

No PUCCH or SPUCCH transmission is performed in the BWP of the cell.

The downlink BWP may be hibernated, and a channel measurement may be performed and reported. Further, the uplink BWP of the cell may be deactivated and not used. This is because the channel is measured only for the downlink BWP in the dormant-state Scell and the measurement result is reported to the uplink BWP of the Spcell (Pcell or Pscell) or the Scell in which there is a PUCCH.

If an indication indicating activation or switching to the dormant BWP for the downlink is made or an indication indicating hibernation of the BWP is made, a random access procedure is performed without cancelling the same. This is because a preamble is transmitted through the uplink and a random access response is received through the downlink of the Pcell when the random access procedure is performed in the Scell. Accordingly, even though the downlink BWP is hibernated or switched to the dormant BWP, a problem does not occur.

In the disclosure, the UE operation when the normal BWP (active bandwidth part (BWP)) of the activated SCell is activated or when a BWP which is not the dormant BWP is activated is described below.

If an indication indicating activation of a normal BWP (for example, a downlink BWP) of the current cell (PCell or SCell) or a normal BWP which is not a dormant BWP or an indication indicating activation of the cell is received through DCI (L1 control signal) of a PDCCH, a MAC CE, or an RRC message, if an indication indicating switching of a BWP (for example, a downlink BWP) to an active BWP (or a BWP which is not the dormant BWP) is received through DCI (L1 control signal) of a PDCCH, a MAC CE, or an RRC message, if the activated BWP of the current activated cell is a normal BWP, or if the activated BW of the current activated cell is not a dormant BWP (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed.

The BWP is switched to the indicated uplink or downlink BWP or activated. Alternatively, the uplink or downlink BWP is switched to a predetermined BWP (for example, an uplink or uplink first active BWP), and the BWP is activated.

A sounding reference signal (SRS) is transmitted to allow the gNB to measure a channel for the uplink in the activated BWP. For example, the SRS may be periodically transmitted.

If a PUCCH is configured in the activated BWP, the PUCCH is transmitted.

A BWP inactivity timer or cell deactivation timer starts or restarts. In another method, the BWP inactivity timer or cell deactivation timer may start or restart only when a BWP or cell hibernation timer is not configured. If the BWP or cell hibernation timer can be configured through the RRC message, the BWP or the cell may be hibernated when the timer expires. For example, the BWP inactivity timer or cell deactivation timer may start or restart only in the hibernated BWP or cell.

If there are type 1 configuration transmission resources of which the use is suspended, the stored type 1 transmission resources may be initialized and used. The type 1 configuration transmission resources are periodic (uplink or downlink) transmission resources pre-allocated through an RRC message, which can be used after being activated through the RRC message.

A PHR is triggered for the BWP.

The UE may report a channel measurement result (CSI, CQI, PMI, RI, PTI, or CRI) for the downlink in the activated BWP according to a configuration of the gNB.

A PDCCH is monitored to read an indication of the gNB in the activated BWP.

A PDCCH is monitored to read cross-scheduling in the activated BWP.

The BWP inactivity timer starts or restarts. In another method, the BWP inactivity timer may start or restart only when a BWP hibernation timer is not configured. If the BWP hibernation timer can be configured through the RRC message, the BWP may be switched to a dormant state or a dormant BWP when the timer expires. For example, the BWP inactivity timer may start or restart only in the dormant BWP.

If a link BWP hibernation timer is configured for the BWP,
the BWP hibernation timer starts or restarts for the BWP.

In the disclosure, the UE operation when an active BWP (active bandwidth part (BWP)), a BWP, or an SCell is deactivated is described below.

If an indication indicating deactivation of a BWP (for example, a downlink BWP) of the current cell (PCell or SCell) is received through DCI (L1 control signal) of a PDCCH, a MAC CE, or an RRC message, if an indication indicating deactivation of a BWP (for example, a downlink BWP) or an indication indicating switching to an inactive BWP is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), if the BWP inactivity timer or cell deactivation timer expires in the cell, if the activated SCell is deactivated, or if the BWP of the SCell is deactivated, one or a plurality of operations of the following operations may be performed.

The cell of the indicated uplink or downlink BWP is deactivated.

The UE stops the BWP inactivity timer (for example, a deactivation timer for a downlink BWP) configured and driven in the cell or BWP.

Periodic downlink transmission resources (DL SPS or configured downlink assignment) or periodic uplink transmission resources (UL SPS or configured uplink grant Type 2) configured in the cell or BPW may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The periodic transmission resources may be called type 2 configuration transmission resources. Further, the operation of releasing (clearing) the periodic transmission resources may be performed only when the Scell transitions from the active state to the inactive state. This is because the releasing (clearing) operation is not needed when the transition is made from the dormant state to the inactive state because there are no periodic transmission resources in the dormant state. In another method, the periodic transmission resources may be released only when the periodic downlink transmission resources or the periodic uplink transmission resources are configured or when the transmission resources are configured and used.

The periodic uplink transmission resources (configured uplink grant Type 1 configured through RRC) configured in the cell or BWP may be suspended. The term "suspend" means that transmission resource configuration information configured through the RRC message is stored in the UE but is not used anymore. The periodic transmission resources may be called type 1 configuration transmission resources. Further, the operation of releasing (clearing) the periodic transmission resources may be performed only when the Scell transitions from the active state to the inactive state. This is because the releasing (clearing) operation is not needed when the transition is made from the dormant state to the inactive state because there are no periodic transmission resources in the dormant state. In another method, the periodic transmission resources may be released only when the periodic downlink transmission resources or the periodic uplink transmission resources are configured or when the transmission resources are configured and used.

All HARQ buffers configured for the cell or BWP are emptied.

The periodic transmission resources are released (cleared) if there are PUSCH transmission resources configured for a periodic channel measurement report (semi-persistent CSI reporting) for the cell or BWP.

The UE does not transmit an SRS for the cell or BWP.

The UE neither measures a channel (CSI, CQI, PMI, RI, PTI, or CRI) for the downlink nor reports the channel measurement for the cell or BWP.

The UE does not transmit uplink data through a UL-SCH in the cell or BWP.

The UE does not perform a random access procedure for the cell or BWP.

The UE does not monitor a PDCCH in the cell or BWP.

The UE does not monitor a PDCCH for the cell or BWP. Further, in the case of cross-scheduling, a PDCCH for the cell is not monitored in the scheduled cell.

A PUCCH or an SPUCCH is not transmitted in the cell or BWP.

In the disclosure, the activated state, the deactivated state, or the dormant state are operated and cell or BWP transition or switching is performed in units of BWPs. When state transition or switching is performed in units of BWPs, a BWP indicated to have state transition or switching (a downlink BWP or an uplink BWP) is transitioned or switched according to an indication of state transition or switching. For example, if a BWP (a downlink or uplink BWP) is transitioned from an activated state to a dormant state or switched to a dormant BWP (or activated), the BWP may be transitioned to the dormant state or switched to the dormant BWP (or activated).

In the disclosure, BWP switching means that, if BWP switching is indicated with a BWP identifier through PDCCH DCI while downlink assignment is allocated, the downlink BWP is switched to a BWP indicated by the BWP identifier, and if BWP switching is indicated with a BWP identifier through PDCCH DCI while a UL grant is allocated, the uplink BWP is switched to a BWP indicated by the BWP identifier. The UE operation follows a DCI format although description for the uplink and the downlink is not separated since PDCCH DCI formats are different for the downlink assignment (format1) and the UL grant (format0).

The method of operating the state transition in units of BWPs (BWP levels) and the operation of the BWP according to each state proposed in the disclosure may be expanded and applied to various embodiments. Hereinafter, detailed embodiments for expanding and applying the content proposed in the disclosure are described.

Figure 8:
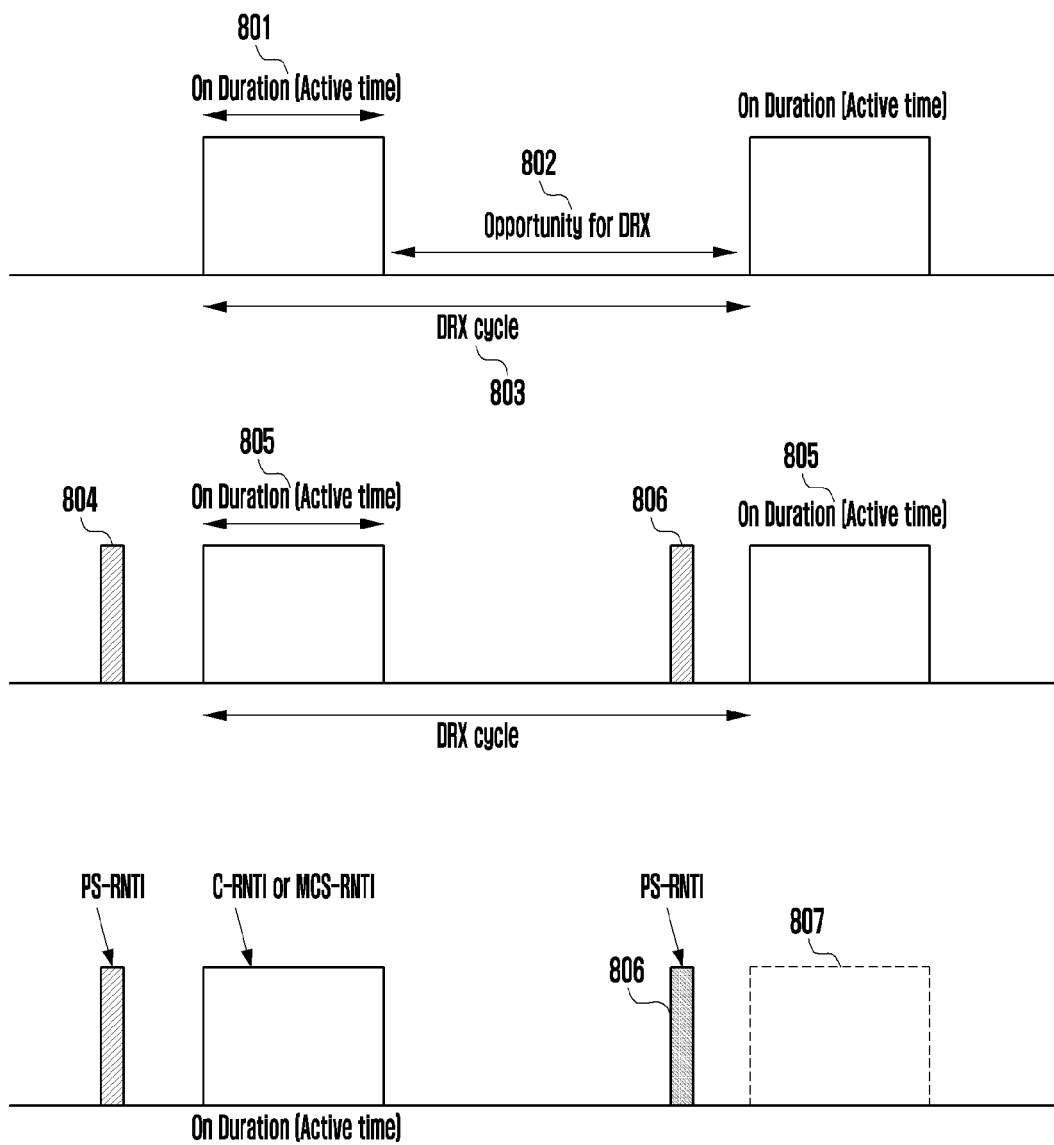
FIG. 8 illustrates a DRX configuration or DRX operation method by which a battery of the UE can be saved, proposed in the disclosure.

FIG. 8 illustrates a DRX configuration or DRX operation method by which a battery of the UE can be saved, proposed in the disclosure.

In FIG. 8, the gNB may configure a DRX function such as a DRX cycle, a start point, an offset, or on-duration (active time) in the PCell, the SCell, or the PSCell for the UE through the RRC message as illustrated in FIG. 6. The disclosure considers configuration of the DRX function in the PCell, SpCell, or the PSCell.

As described above, if the DRX function is configured in the PCell (SpCell or PSCell), the UE may consider a DRX cycle 803, a DRX start time, or an offset to apply the DRX function. When the DRX function is applied, the UE may monitor a PDCCH or DCI of the PDCCH which can be received from the gNB in the PCell only within the active time 801 (on-duration) of the DRX. Further, the UE does not need to monitor the PDCCH or the DCI of the PDCCH outside the active time 802 of the DRX function, thereby reducing battery consumption of the UE.

In FIG. 6, the gNB may configure a power saving function (power saving mode) in the UE through the RRC message in order to further reduce battery consumption of the UE. When the power saving function is configured along with the DRX function, the PDCCH is monitored outside the active time during a short time interval 804 configured through the RRC before the active time 801 in which the UE should monitor the PDCCH, and a wake up signal (WUS) is monitored and received outside the active time. The gNB may indicate whether the UE should monitor the PDCCH or not in the next active time 805 or 807 through a bit of the DCI of the PDCCH of the WUS.

That is, the UE in which the power saving function or the DRX function is configured may monitor the WUS during the short time interval 804 configured in the RRC message before the active time 805. If a bit value of the DCI of the PDCCH for the next active time 805 or 807 is 0 (or 1) in the WUS, it may indicate that the UE does not monitor the PDCCH within the next active time 807 or indicate that the UE does not monitor the PDCCH by not driving a timer corresponding to the next active time in the MAC layer device. If the bit value of the DCI of the PDCCH for the next active time 805 or 807 is 1 (or 0) in the received WUS, it may indicate that the UE monitors the PDCCH within the next active time 805 or may indicate that the UE monitors the PDCCH by driving a timer corresponding to the next active time in the MAC layer device.

Further, the UE may not monitor the WUS or the PDCCH for searching for the WUS within the active time.

When monitoring the WUS during the short time interval 804 configured in the RRC message before the active time 805, the UE in which the power saving function or the DRX function is configured may search for a signal by identifying the PDCCH through a first RNTI (for example, a PS-RNTI). The first RNTI (for example, the PS-RNTI) may be configured in a plurality of UEs, and the gNB may indicate at once whether to monitor the PDCCH within the next active time to the plurality of UEs through the first RNTI (for example, PS-RNTI).

When monitoring and searching for the PDCCH in the active time 805, the UE in which the power saving function or the DRX function is configured may search for a signal on the basis of a second RNTI (for example, a C-RNTI), a third RNTI (for example, an MCS-C-RNTI), or a fourth RNTI (SPS-C-RNTI) uniquely configured in the UE through the RRC message. The second RNTI (for example, C-RNTI) may be used to indicate general UE scheduling, the third RNTI (for example, MCS-C-RNTI) may be used to indicate a modulation and coding scheme of the UE, and the fourth RNTI (SPS-C-RNTI) may be used to indicate periodic transmission resources of the UE.

Figure 9:
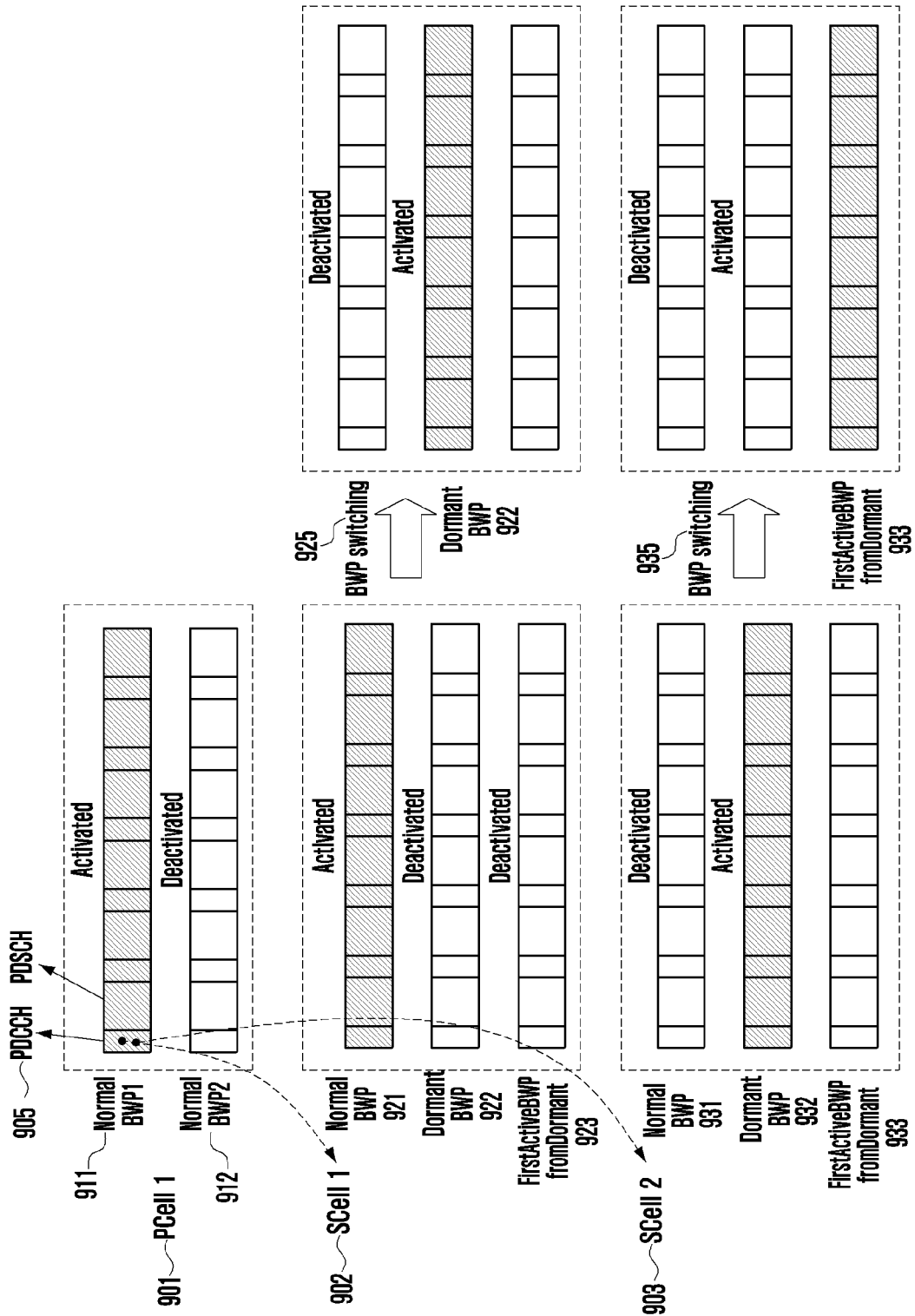
FIG. 9 illustrates the concept of a method of operating a dormant BWP in an activated SCell proposed in the disclosure.

FIG. 9 illustrates the concept of a method of operating a dormant BWP in an activated SCell proposed in the disclosure.

The gNB may configure a plurality of SCells to the UE for carrier aggregation, allocate each SCell identifier, and configure a dormant BWP for each SCell through the RRC message as illustrated in FIG. 6. Further, the plurality of SCells may be included in each SCell group, and one SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value).

In FIG. 9, the gNB may define a new bitmap for PDCCH DCI transmitted in the PCell, map bit values such that each bit value of the bitmap indicates each SCell identifier value or each SCell group identifier value, and define each bit value to indicate whether to switch the SCell or SCells belonging to the SCell group corresponding to the bit to a dormant BWP or activate the dormant BWP thereof. Further, the gNB may indicate whether to switch the SCell or SCells belonging to the SCell group corresponding to the bit from a dormant BWP to a normal BWP (for example, a first active BWP activated from a dormant state) or activate the normal BWP (for example, first active BWP activated from a dormant state).

In FIG. 9, the UE may receive the PDCCH DCI in the PCell 901, read the DCI, and then identify whether there is a bitmap including an indication for BWPs of SCells or SCell groups (for example, switching to or activating the dormant BWP, or switching to or activating the normal BWP). If there is the bitmap, the UE may switch to or activate the BWP according to the bit value for the SCell or SCells 902, 903 belonging to the SCell group indicated by each bit. For example, if the bit of the bitmap indicates a first SCell 902 (or a first SCell identifier) or an SCell group including the first SCell (or an SCell group identifier) and the bit value is 0 (or 1), the UE may activate a BWP 921 to a dormant BWP 922 for the first SCell 902 or switch the current BWP to the dormant BWP 922 or, if the current BWP is not a dormant BWP, switch or activate the currently activated BWP 921 to the dormant BWP 922 as indicated by reference numeral 925.

In FIG. 9, the UE may receive the PDCCH DCI in the PCell 901, read the DCI, and then identify whether there is a bitmap including an indication for BWPs of SCells or SCell groups (for example, switching to or activating the dormant BWP, or switching to or activating the normal BWP). If there is the bitmap, the UE may switch to or activate the BWP according to the bit value for the SCell or SCells 902, 903 belonging to the SCell group indicated by each bit. For example, if the bit of the bitmap indicates the second Scell 903 (or a second Scell identifier) or an Scell group including the second Scell (or an SCell group identifier) and the bit value is 1 (or 0), the UE may switch or activate a BWP of the second Scell 903 to a BWP configured through an RRC message (for example, a first active BWP from a dormant state 933) as indicated by reference numeral 935, if the current activated BWP for the second Scell 903 is a dormant BWP 932, the current activated BWP is not a normal BWP, or the current BWP (or cell) is activated and is activated to the dormant BWP 932 (or activated to a BWP which is not the normal BWP). When the bit value is 1 (or 0) and thus an Scell or Scells belonging to an Scell group indicated by the bit should be switched or activated to the first active BWP from the dormant state, the Scell or Scells belonging to the Scell group may not apply the bit value, may ignore the bit value, or may not read the bit value if the state of the Scell is in a deactivated state or the state of the Scell is in an activated state and an activated BWP is not a dormant BWP (or is a normal BWP).

Figure 10:
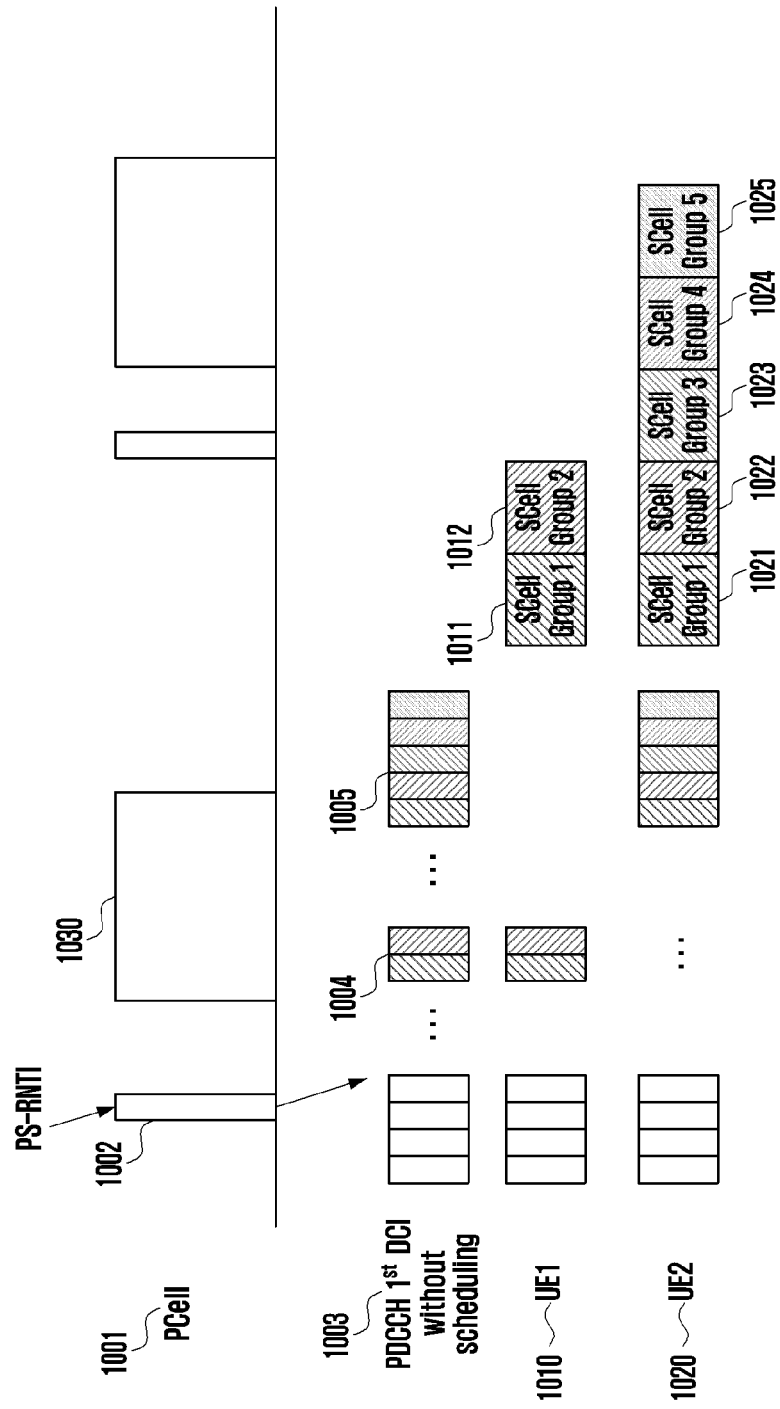
FIG. 10 illustrates a first embodiment that embodies the concept of the method of operating the dormant BWP in the activated SCell described with reference to FIG. 9 of the disclosure.

FIG. 10 illustrates a first embodiment that embodies the conception of the method of operating the dormant BWP in the activated SCell described with reference to FIG. 9 of the disclosure.

In the first embodiment, the gNB may configure a plurality of SCell to the UE for carrier aggregation, allocate each SCell identifier, configure a dormant BWP for each SCell, and may not configure a dormant BWP for some SCells through the RRC message as described in FIG. 6. Further, the plurality of SCells may be included in each SCell group, and one SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value). SCell groups or SCell group identifiers configured to realize or apply the first embodiment of the disclosure may be referred to as first SCell groups. The first SCell groups may indicate group identifiers to which the operation indicated by a DCI bitmap value included in a PDCCH DCI monitored and received within a short time interval or out of active time by the UE is applied in the first embodiment of the disclosure.

In FIG. 10, the gNB may configure a power saving function or a DRX function to each of a plurality of UEs through the RRC message as described in FIG. 6. The gNB may configure time information of a short time interval 1002 for detecting a first DCI format or a WUS before the active time 1030 of the DRX cycle in the PCell or SpCell or configure configuration information of the first DCI format through the RRC message. The gNB may configure the location of a bitmap including an indication for the first SCell groups of each UE in the first DCI format through the RRC message for the first DCI format detected within the short time interval 1002 in the PCell or SpCell by the UE. Further, the gNB may configure a search space of PDCCH monitoring or a UE identifier (for example, PS-RNTI) for searching for the first DCI format within the short time interval 1002 to the UE through the RRC message. When the SCell is switched or activated to the dormant BWP, the UE does not monitor PDCCH DCI, and thus it is very inefficient for the UE to receive the PDCCH DCI or the bitmap proposed in the disclosure in the SCell instead of the PCell or SpCell. Accordingly, the disclosure proposes monitoring of the PDCCH DCI in the PCell or SpCell.

For example, as described above, the gNB may configure the power saving function or the DRX function to a plurality of UEs and transmit the first DCI format on PDCCH transmission resources in the short time interval 1002 configured before the next active time 1030 of the DRX cycle configured to the UEs as indicated by reference numeral 1003, and the first DCI format may include bitmaps 1004, 1005 including indication information for dormant BWPs of the first SCell groups configured to each of the plurality of UEs.

A first UE 1010 applying information configured through the RRC message may monitor the PDCCH on the basis of the PS-RNTI which is an identifier configured within the short time interval 1002 configured before the next active time 1030 of the DRX cycle and search for the first DCI format 1003 from the gNB in the search space. If the first DCI format 1003 is detected, the first UE may read the bitmap 1004 including indication information for the dormant BWPs of the first SCell groups of the first UE in the first DCI format 1003 based on time information or location information configured through the RRC message. The length of the bitmap may be configured to be the same as the number of first SCell groups configured in the first UE or maximally configured to a predetermined number (for example, 5). Further, each bit value of the bitmap may be mapped to or indicate each first SCell group in an ascending order of SCell group identifier values of the first SCell groups configured to the first UE from the right bit (for example, from the least significant bit (LSB)) of the bitmap. In another method, each bit value of the bitmap may be mapped to or indicate each first SCell group in a descending order of SCell group identifier values of the first SCell groups configured in the first UE from the right bit (for example, from the least significant bit (LSB)) of the bitmap. In another method, each bit value of the bitmap may be mapped to or indicate each first SCell group in an ascending order of SCell group identifier values of the first SCell groups configured in the first UE from the left bit (for example, from the most significant bit (MSB)) of the bitmap. In another method, each bit value of the bitmap may be mapped to or indicate each first SCell group in a descending order of SCell group identifier values of the first SCell groups configured in the first UE from the left bit (for example, from the most significant bit (MSB)) of the bitmap.

When a bit value of the bitmap 1011 or 1012 is 0, the bit value of 0 may indicate switching to a dormant BWP or activation of a dormant BWP for each activated SCell among SCells included in the first SCell group corresponding to the bit (if the dormant BWP is configured). In another method, when the bit value of the bitmaps is 0, the bit value of 0 may indicate switching to a dormant BWP or activation of a dormant BWP if a BWP activated for each activated SCell among SCells included in the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the first SCell group corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell among SCells included in the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the first SCell group corresponding to the bit, indicate activation to the normal BWP (for example, the first active BWP activated from the dormant state), or indicate maintenance, continuous use, application, or activation of the current active BWP.

A second UE 1020 applying information configured through the RRC message may monitor the PDCCH on the basis of the PS-RNTI which is an identifier configured within the short time interval 1002 configured before the next active time 1030 of the DRX cycle and search for the first DCI format from the gNB in the search space as indicated by reference numeral 1003. If the first DCI format 1003 is detected, the second UE may read the bitmap 1005 including indication information for the dormant BWPs of the first SCell groups of the second UE in the first DCI format 1003 based on time information or location information configured through the RRC message. The length of the bitmap may be configured to be the same as the number of first SCell groups configured in the second UE or maximally configured to a predetermined number (for example, 5). Further, each bit value of the bitmap may be mapped to or indicate each first SCell group in an ascending order of SCell group identifier values of the first SCell groups configured in the second UE from the right bit (for example, from the least significant bit (LSB)) of the bitmap. In another method, each bit value of the bitmap may be mapped to or indicate each first SCell group in a descending order of SCell group identifier values of the first SCell groups configured in the second UE from the right bit (for example, from the least significant bit (LSB)) of the bitmap. In another method, each bit value of the bitmap may be mapped to or indicate each first SCell group in an ascending order of SCell group identifier values of the first SCell groups configured in the second UE from the left bit (for example, from the most significant bit (MSB)) of the bitmap. In another method, each bit value of the bitmap may be mapped to or indicate each first SCell group in a descending order of SCell group identifier values of the first SCell groups configured in the second UE from the left bit (for example, from the most significant bit (MSB)) of the bitmap.

When a bit value of the bitmap 1021, 1022, 1023, 1024 or 1025 is 0, the bit value of 0 may indicate switching to a dormant BWP or activation of a dormant BWP for each activated SCell among SCells included in the first SCell group corresponding to the bit (if a dormant BWP is configured). In another method, when the bit value of the bitmap is 0, the bit value of 0 may indicate switching to a dormant BWP or activation of a dormant BWP if a BWP activated for each activated SCell among SCells included in the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the first SCell group corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell among SCells included in the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the first SCell group corresponding to the bit, indicate activation to the normal BWP (for example, the first active BWP activated from the dormant state), or indicate maintenance, continuous use, application, or activation of the current active BWP.

The first embodiment of the disclosure is realized as described above, and the first DCI format of the PDCCH proposed by the first embodiment may be used within the short time interval and is not accompanied by downlink transmission resources (for example, PDSCH) or uplink transmission resources (for example, PUSCH) for the UE. Accordingly, the UE may receive the first DCI format of the PDCCH and may not transmit ACK or NACK information thereof (for example, HARQ ACK or NACK) in the first embodiment.

The first embodiment proposed in the disclosure may be more specifically realized as follows.

In the first embodiment of the disclosure, a dormancy or non-dormancy operation for SCells of the UE and an operation for a PDCCH monitoring indicator are described below.

The UE in which the DRX function or the power saving function for the PCell or SpCell is configured may monitor the PDCCH within the short time interval 804 of FIG. 8 or 1002 of FIG. 10 and may follow the operation described below. Further, the UE may monitor the PDCCH in an activated downlink BWP of the PCell or SpCell.

- The UE may monitor the PDCCH and search for the first DCI format (for example, DCI format 2-6) or the WUS with the PS-RNTI.
- The UE may receive a configuration of a plurality of search spaces and apply the same in order to monitor the PDCCH for searching for the first DCI format (for example, DCI format 2-6) or the WUS in the activated downlink BWP of the PCell or SpCell according to a common search space configured through the RRC message.
- The size of data (payload) of the first DCI format may be determined as a size configured through RRC (for example, SizeDCI_2-6).
- When the WUS or the first DCI format is detected, the UE may identify the location of a PDCCH monitoring indicator of the WUS configured through RRC, and if a value of the PDCCH monitoring indicator is 0, the UE may not start a timer for the active time (or on-duration) of the next longer DRX cycle so as not to monitor the PDCCH within the active time. If the value of the PDCCH monitoring indicator is 1, the UE may monitor the PDCCH within the active time by starting the timer for the active time (or on-duration) of the next longer DRX cycle.
- When the WUS or the first DCI format is detected, the UE may identify the location of the WUS configured through the RRC message, and if a plurality of first SCell groups for the first embodiment of the disclosure are configured through the RRC message, the UE may read the size of a bitmap corresponding to the number of first SCells groups.
- The location of the bitmap for the first embodiment of the disclosure may be right behind a PDCCH monitoring indicator.
- The size of the bitmap for the first embodiment of the disclosure may be the same as the number of first SCell groups configured to the UE through the RRC message in which SCells are included or configured, and each bit of the bitmap may correspond to each first SCell group (or first SCell group identifier or SCells belonging to the first SCell group) in an ascending order of SCells group identifier values of the configured first SCell group. In another method, each bit of the bitmap may correspond to or mapped to each first SCell group (or first SCell group identifier or SCells belonging to the first SCell group) in a descending order of SCell group identifier values of the configured first SCell group. In another method, each bit of the bitmap may correspond to or may be mapped to each first SCell group (or first SCell group identifier or SCells belonging to the first SCell group) in an ascending order of SCell group identifier values of the first SCell group sequentially from the right bit (from the least significant bit (LSB)) or the left bit (from the most significant bit (MSB)). In another method, each bit of the bitmap may correspond to or may be mapped to each first SCell group (or first SCell group identifier or SCells belonging to the first SCell group) in a descending order of SCell group identifier values of the first SCell group sequentially from the right bit (from the least significant bit (LSB)) or the left bit (from the most significant bit (MSB)).
- When the bit value of the bitmap is 0, the bit value of 0 may indicate switching to a dormant BWP or activation of a dormant BWP for each activated SCell among SCells included in the first SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells included in the first SCell group corresponding to the bit is not a dormant BWP (or is a normal BWP).
- When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the first SCell group corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell among SCells included in the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the first SCell group corresponding to the bit, indicate activation to the normal BWP (for example, the first active BWP activated from the dormant state), or indicate maintenance, continuous use, application, or activation of the current active BWP.

The short time interval 804 of FIG. 8 or 1002 of FIG. 10 within which the PDCCH should be monitored to search for the first DCI format or the WUS may be calculated or indicated by an offset configured in the RRC message, and the first DCI format or the WUS may be detected within a short time interval before the active time of the DRX cycle.

The first DCI format (for example, DCI format 2_6) may not be detected or monitored through unnecessary PDCCH monitoring within the active time of the DRX cycle in order to reduce a battery of the UE.

If the UE did not detect the first DCI format or the WUS within the short time interval 804 of FIG. 8 or 1002 of FIG. 10 even though the power saving function or the DRX function is configured (or the UE is configured to search for the first DCI format within the short time), the UE may perform the basic operation below within the active time of the DRX cycle.

If a search space in which PDCCH monitoring is performed to search for the first DCI format in an activated downlink BWP of the PCell or SpCell is configured or provided and the UE did not detect the first DCI format,
  if the power saving function is configured in the RRC message or an indicator (for example, power saving (ps)—Wake up Or Not) indicating whether to start a timer (or wake up and perform a search within the active time) to monitor the PDCCH within the next active time for the power saving function or not start the timer (or not perform the search within the active time) is configured (or provided), the UE may or not start the timer for the active time according to the indicator.
  if the power saving function is configured in the RRC message or an indicator (for example, power saving (ps)—Wake up Or Not) indicating whether to start a timer (or wake up and perform a search within the active time) to monitor the PDCCH within the next active time for the power saving function or not start the timer (or not perform the search within the active time) is not configured (or not provided), the UE may not start the timer for the active time.

If a search space in which PDCCH monitoring is performed to search for the first DCI format in an activated downlink BWP of the PCell or SpCell is configured or provided and the UE is not configured (or is not required) to search for the first DCI format through PDCCH monitoring within a short time interval before the next active time of the DRX cycle, or if a short time interval within which the first DCI format is detected through PDCCH monitoring before the next active time of the DRX cycle is not configured,
  the UE should start a timer for the next active time of the DRX cycle.

Another embodiment that is embodied from the first embodiment of the disclosure proposed in the disclosure is described below.

<PDCCH Monitoring Indication and Dormancy/Non-Dormancy Behaviour for Scells>

A UE configured with DRX mode operation on the PCell or on the SpCell
  a PS-RNTI for DCI format 2_6 by ps-RNTI
  a number of search space sets, by dci-Format2-6, to monitor PDCCH for detection of DCI format 2_6 on the active DL BWP of the PCell or of the SpCell according to a common search space
  a payload size for DCI format 2_6 by SizeDCI_2-6
  a location in DCI format 2_6 of a Wake-up indication bit by PSPositionDCI2-6, where
    the UE may not start the drx-onDurationTimer for the next long DRX cycle when a value of the 'PDCCH monitoring' bit is '0', and
    the UE starts the drx-onDurationTimer for the next long DRX cycle when a value of the 'PDCCH monitoring' bit is '1'
  a bitmap, when the UE is provided a number of groups of configured SCells by Scell-groups-for-dormancy-outside-active-time, where
    the bitmap location is immediately after the 'PDCCH monitoring' bit location
    the bitmap size is equal to the number of groups of configured SCells where each bit of the bitmap from LSB or MSB corresponds to a group of configured SCells from the number of groups of configured Scells in the ascending order or descending order of configured dormant SCell group identity.
    a '0' value for a bit of the bitmap indicates an active DL BWP, provided by dormant-BWP, for the UE for each activated SCell in the corresponding group of configured Scells
  Option 1.
    if the previous DL BWP was a dormant DL BWP or if the active DL BWP is a dormant DL BWP, a '1' value for a bit of the bitmap indicates an active DL BWP, provided by firstActiveDownlinkBWPFromDormant, for the UE for each activated SCell in the corresponding group of configured Scells. Otherwise, it indicates to continue the current active DL BWP.
  Option 2.
    if the previous DL BWP was not an active DL BWP (normal DL BWP) or if the active DL BWP is not an active DL BWP(normal DL BWP), a '1' value for a bit of the bitmap indicates an active DL BWP, provided by firstActiveDownlinkBWPFromDormant, for the UE for each activated SCell in the corresponding group of configured Scells. Otherwise, it indicates to continue the current active DL BWP.
  Option 3.
    a '1' value for a bit of the bitmap indicates an active DL BWP switched from dormant DL BWP, provided by firstActiveDownlinkBWPFromDormant or the current active DL BWP, for the UE for each activated SCell in the corresponding group of configured Scells
  an offset by ps-Offset indicating a time, where the UE starts monitoring PDCCH for detection of DCI format 2_6 according to the number of search space sets, prior to a slot where the drx-onDurationTimer would start on the PCell or on the SpCell
  for each search space set, the PDCCH monitoring occasions are the ones in the first Ts slots indicated by duration, or Ts=1 slot if duration is not provided, starting from the first slot of the first Ts slots and ending prior to the start of drx-onDurationTimer.

The UE does not monitor PDCCH for detecting DCI format 2_6 during Active Time.

If a UE reports for an active DL BWP a requirement for a number of slots prior to the beginning of a slot where the UE would start the drx-onDurationTimer, the UE is not required to monitor PDCCH for detection of DCI format 2_6 during the number of slots.

If a UE is provided search space sets to monitor PDCCH for detection of DCI format 2_6 in the active DL BWP of the PCell or of the SpCell and the UE does not detect DCI format 2_6
- if the UE is provided ps-WakeupOrNot, the UE is indicated by ps-WakeupOrNot whether the UE may not start or whether the UE may start the drx-onDurationTimer for the next DRX cycle
- if the UE is not provided ps-WakeupOrNot, the UE may not start Active Time indicated by drx-onDurationTimer for the next DRX cycle If a UE is provided search space sets to monitor PDCCH for detection of DCI format 2_6 in the active DL BWP of the PCell or of the SpCell and the UE
- is not required to monitor PDCCH for detection of DCI format 2_6, for all corresponding PDCCH monitoring occasions outside Active Time prior to a next DRX cycle, or
- does not have any PDCCH monitoring occasions for detection of DCI format 2_6 outside Active Time of a next DRX cycle the UE shall start by drx-onDurationTimer for the next DRX cycle.

Figure 11:
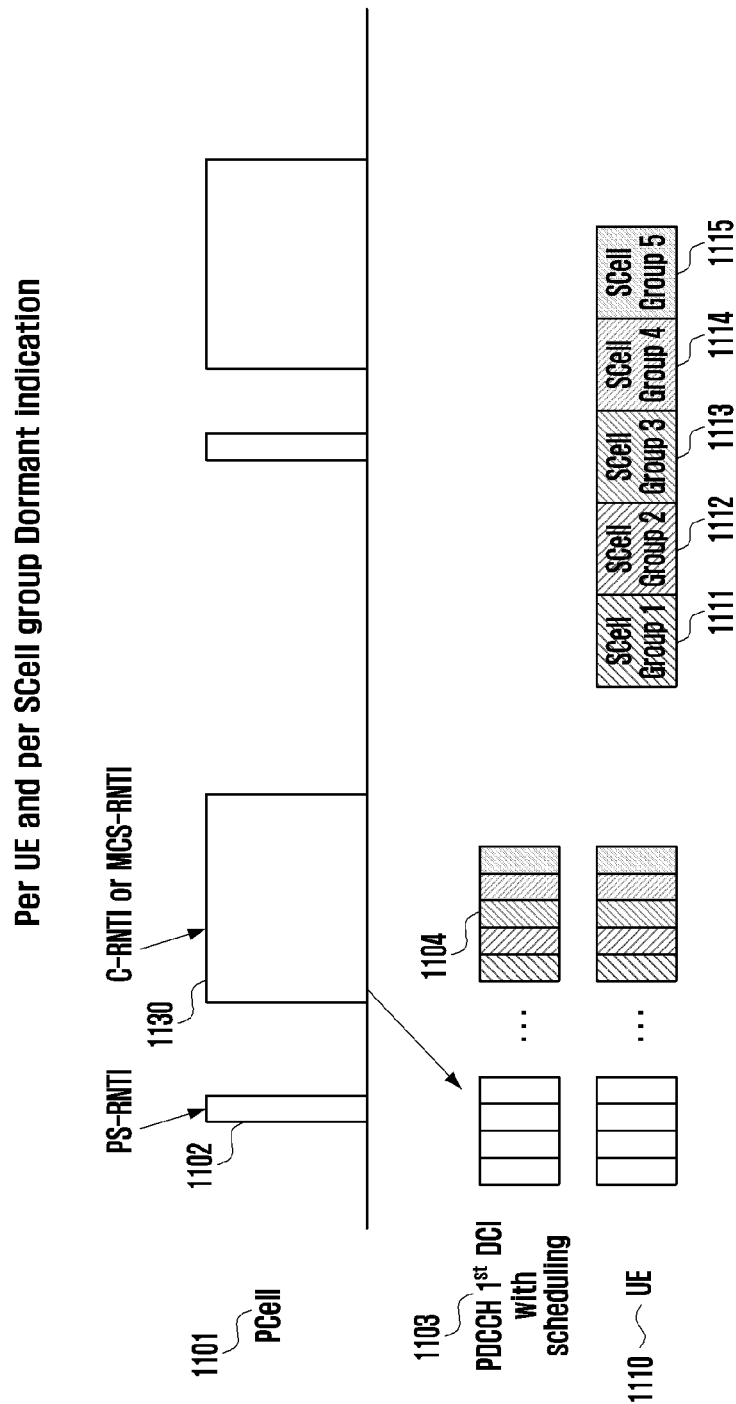
FIG. 11 illustrates a second embodiment that embodies the concept of the method of operating the dormant BWP in the activated SCell described with reference to FIG. 9 of the disclosure.

FIG. 11 illustrates a second embodiment that embodies the conception of the method of operating the dormant BWP in the activated SCell described with reference to FIG. 9 of the disclosure.

In the second embodiment, the gNB may configure a plurality of SCell in the UE for carrier aggregation, allocate each SCell identifier, configure a dormant BWP for each SCell, and may not configure a dormant BWP for some SCells through the RRC message as described in FIG. 6. Further, the plurality of SCells may be included in each SCell, and one SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value). SCell groups or SCell group identifiers configured to realize or apply the second embodiment of the disclosure may be referred to as second SCell groups. The second SCell groups may indicate group identifiers to which the operation indicated by a DCI bitmap value included in a PDCCH DCI monitored and received within the active time by the UE is applied in the second embodiment of the disclosure.

In FIG. 11, the gNB may configure a power saving function or a DRX function to the UE through the RRC message as described in FIG. 6. Further, in the RRC message, configuration information of a second DCI format (for example, DCI format 0_1 or DCI format 11) for which the UE should search within an active time 1130 of the DRX cycle for the PCell or SpCell may be configured. When the UE detected the second DCI format in the PCell or SpCell, the UE may identify whether a bitmap including an indicator for second SCell groups for the UE in the second DCI format. Further, the gNB may configure a search space of PDCCH monitoring or a UE identifier (for example, C-RNTI, MCS-C-RNTI, or SPS-C-RNTO) for searching for the second DCI format within the active time 1130 in the UE through the RRC message. When the SCell is switched or activated to the dormant BWP, the UE does not monitor PDCCH DCI, and thus it is very inefficient for the UE to receive the PDCCH DCI or the bitmap proposed in the disclosure in the SCell instead of the PCell or SpCell.

Accordingly, the disclosure proposes monitoring of the PDCCH DCI in the PCell or SpCell.

For example, the gNB may transmit the second DCI format on PDCCH transmission resources of the active time 1130 in the PCell or SpCell as described above as indicated by reference numeral 1103, and the second DCI format may include a bitmap 1104 indicating indication information for the dormant BWP of the second SCell groups configured to the UE.

As described above, the first UE 1110 applying information configured by the RRC message may monitor the PDCCH on the basis of the UE identifier (for example, C-RNTI, MCS-C-RNTI, or SPS-C-RNTI) which is an identifier configured within the active time 1130 of the DRX cycle and search for the second DCI format 1103 from the gNB in the search space. If the second DCI format 1103 is detected, the first UE may read the bitmap 1104 including indication information for the dormant BWP of the second SCell groups of the first UE 1110 in the second DCI format 1103. The length of the bitmap may be configured to be the same as the number of second SCell groups configured to the first UE or maximally configured to a predetermined number (for example, 5). Further, each bit value of the bitmap may be mapped to or indicate each second SCell group in an ascending order of SCell group identifier values of the second SCell groups configured in the first UE from a right bit (for example, from the least significant bit (LSB)) of the bitmap. In another method, each bit value of the bitmap may be mapped to or indicate each second SCell group in a descending order of SCell group identifier values of the second SCell groups configured in the first UE from a right bit (for example, from the least significant bit (LSB)) of the bitmap. In another method, each bit value of the bitmap may be mapped to or indicate each second SCell group in an ascending order of SCell group identifier values of the second SCell groups configured in the first UE from a left bit (for example, from the most significant bit (MSB)) of the bitmap. In another method, each bit value of the bitmap may be mapped to or indicate each second SCell group in a descending order of SCell group identifier values of the second SCell groups configured in the first UE from a left bit (for example, from the most significant bit (MSB)) of the bitmap.

When a bit value of the bitmaps 1111, 1112, 1113, 1114, or 1115 is 0, the bit value of 0 may indicate switching to a dormant BWP or activation of a dormant BWP for each activated SCell among SCells included in the second SCell group corresponding to the bit (if a dormant BWP is configured). In another method, when the bit value of the bitmap is 0, the bit value of 0 may indicate switching to a dormant BWP or activation of a dormant BWP if a BWP activated for each activated SCell among SCells included in the second SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the second SCell group corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell among SCells included in the second SCell group corresponding to the bit is the dormant BWP (or is not the normal BWP). Otherwise (if the current or activated BWP for each activated SCell among SCells included in the second SCell group corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the second SCell group corresponding to the bit, indicate activation to the normal BWP (for example, the first active BWP activated from the dormant state), or indicate maintenance, continuous use, application, or activation of the current active BWP.

The second embodiment of the disclosure is realized as described above, and the second DCI format of the PDCCH proposed by the second embodiment may be used within the active time and accompanied by downlink transmission resources (for example, PDSCH) or uplink transmission resources (for example, PUSCH) for the PCell or SpCell of the UE. Accordingly, in the second embodiment, the UE may receive the second DCI format of the PDCCH and transmit ACK or NACK information (for example, HARQ ACK or NACK) for scheduling information (downlink transmission resources or uplink transmission resources) of the PCell or SpCell indicated by the second DCI format, and accordingly the gNB may identify whether the UE successfully receives an indication of the second DCI format in the second embodiment.

More specifically, the second embodiment proposed in the disclosure may be realized as follows.

In the second embodiment of the disclosure, a dormancy or non-dormancy operation for SCells of the UE and an operation for a PDCCH monitoring indicator are described below.

For the PCell or SpCell, if a search space is configured, provided, or detected to allow the UE to monitor a PDCCH in order to search for the second DCI format (for example, DCI format 0_1 or DCI format 1_1) within the active time 1130 of FIG. 11, and if a bitmap including an indication for the second SCell groups of the UE is included in the second DCI format, the UE may receive the bitmap and operate as follows. Further, the UE may monitor the PDCCH in an activated downlink BWP of the PCell or SpCell.

- The UE may monitor the PDCCH and search for the second DCI format (for example, DCI format 0_1 or DCI format 11) by a UE identifier (C-RNTI, MCS-C-RNTI, or SPS-C-RNTI).
- The UE may receive a configuration of a plurality of search space sets and apply the same in order to monitor the PDCCH for searching for the second DCI format in the activated downlink BWP of the PCell or SpCell according to a common search space configured through the RRC message.
- When the second DCI format is detected, the UE may read the size of a bitmap corresponding to the number of second SCell groups if a plurality of second SCell groups for the second embodiment of the disclosure are configured through the RRC message.
- The location of the bitmap for the second embodiment of the disclosure may be right behind a PDCCH monitoring indicator.
- The size of the bitmap for the second embodiment of the disclosure may be the same as the number of second SCell groups configured in the UE through the RRC message in which SCells are included or configured, and each bit of the bitmap may correspond to or may be mapped to each second SCell group (or second SCell group identifier or SCells belonging to the second SCell group) in an ascending order of SCells group identifier values of the configured second SCell group. In another method, each bit of the bitmap may correspond to or may be mapped to each second SCell group (or second SCell group identifier or SCells belonging to the second SCell group) in a descending order of SCell group identifier values of the configured second SCell group. In another method, each bit of the bitmap may correspond to or may be mapped to each second SCell group (or second SCell group identifier or SCells belonging to the second SCell group) in an ascending order of SCell group identifier values of the second SCell group sequentially from the right bit (from the least significant bit (LSB)) or the left bit (from the most significant bit (MSB)). In another method, each bit of the bitmap may correspond to or may be mapped to each second SCell group (or second SCell group identifier or SCells belonging to the second SCell group) in a descending order of SCell group identifier values of the second SCell group sequentially from the right bit (from the least significant bit (LSB)) or the left bit (from the most significant bit (MSB)).
- When the bit value of the bitmap is 0, the bit value of 0 may indicate switching to a dormant BWP or activation of a dormant BWP for each activated SCell among SCells included in the second SCell group corresponding to the bit (if a dormant BWP is configured). In another method, when the bit values of the bitmaps are 0, the bit value of 0 may indicate switching to a dormant BWP or activation of a dormant BWP if a BWP activated for each activated SCell among SCells included in the second SCell group corresponding to the bit is not a dormant BWP (or is a normal BWP).
- When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the second SCell group corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell among SCells included in the second SCell group corresponding to the bit is the dormant BWP (or is not the normal BWP). Otherwise (if the current or activated BWP for each activated SCell among SCells included in the second SCell group corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the second SCell group corresponding to the bit, indicate activation to the normal BWP (for example, the first active BWP activated from the dormant state), or indicate maintenance, continuous use, application, or activation of the current active BWP.

Another embodiment which is embodied from the second embodiment proposed in the disclosure is described below.

If a UE is provided search space sets to monitor PDCCH for detection of DCI format 0_1 and DCI format 1_1 and if one or both of DCI format 0_1 and DCI format 1_1 include a XYZ field, for PCell,

- the XYZ field is a bitmap with size equal to a number of groups of configured SCells, provided by Scell-groups-for-dormancy-within-active-time,
- each bit of the bitmap corresponds to a group of configured SCells from the number of groups of configured Scells in the ascending order or descending order of configured dormant SCell group identity
- a '0' value for a bit of the bitmap indicates an active DL BWP, provided by dormant-BWP, for the UE for each activated SCell in the corresponding group of configured Scells Option 1.
- if the previous DL BWP was a dormant DL BWP, a '1' value for a bit of the bitmap indicates an active DL BWP, provided by first-non-dormant-BWP-ID-for-DCI-inside-active-time, for the UE for each activated SCell in the corresponding group of configured Scells. Otherwise, it indicates to continue the current active DL BWP.

Option 2.
- if the previous DL BWP was not an active DL BWP, a '1' value for a bit of the bitmap indicates an active DL BWP, provided by first-non-dormant-BWP-ID-for-DCI-inside-active-time, for the UE for each activated SCell in the corresponding group of configured Scells. Otherwise, it indicates to continue the current active DL BWP.

Option 3.
- a '1' value for a bit of the bitmap indicates an active DL BWP switched from dormant DL BWP, provided by first-non-dormant-BWP-ID-for-DCI-inside-active-time or the current active DL BWP, for the UE for each activated SCell in the corresponding group of configured Scells In FIG. 6 of the disclosure, through an RRCSetup message, an RRCResume message 625, or an RRCReconfiguration message 645 of the RRC connection configuration, the gNB may configure first SCell group configuration information which can be applied to the first embodiment proposed in the disclosure and second SCell group configuration information which can be applied to the second embodiment in the UE. In the RRC message, the gNB may allocate a SCell identifier to each SCell of the UE, and may allocate a first SCell group identifier to each of the first SCell groups and a second SCell group identifier to each of the second SCell groups. Further, the gNB may allocate a first SCell group set identifier indicating the first SCell groups and indicate a second SCell group set identifier indicating the second SCell groups. Each SCell identifier may be included in or mapped to each first SCell group or each second SCell group. The gNB may include the SCell or the SCell identifier in the first SCell group or the second SCell group or map the SCell or the SCell identifier to the first SCell group or the second SCell group to configure the SCell or the SCell identifier only when a dormant BWP (for example, a downlink dormant BWP) is configured for the SCell.

Figure 12:
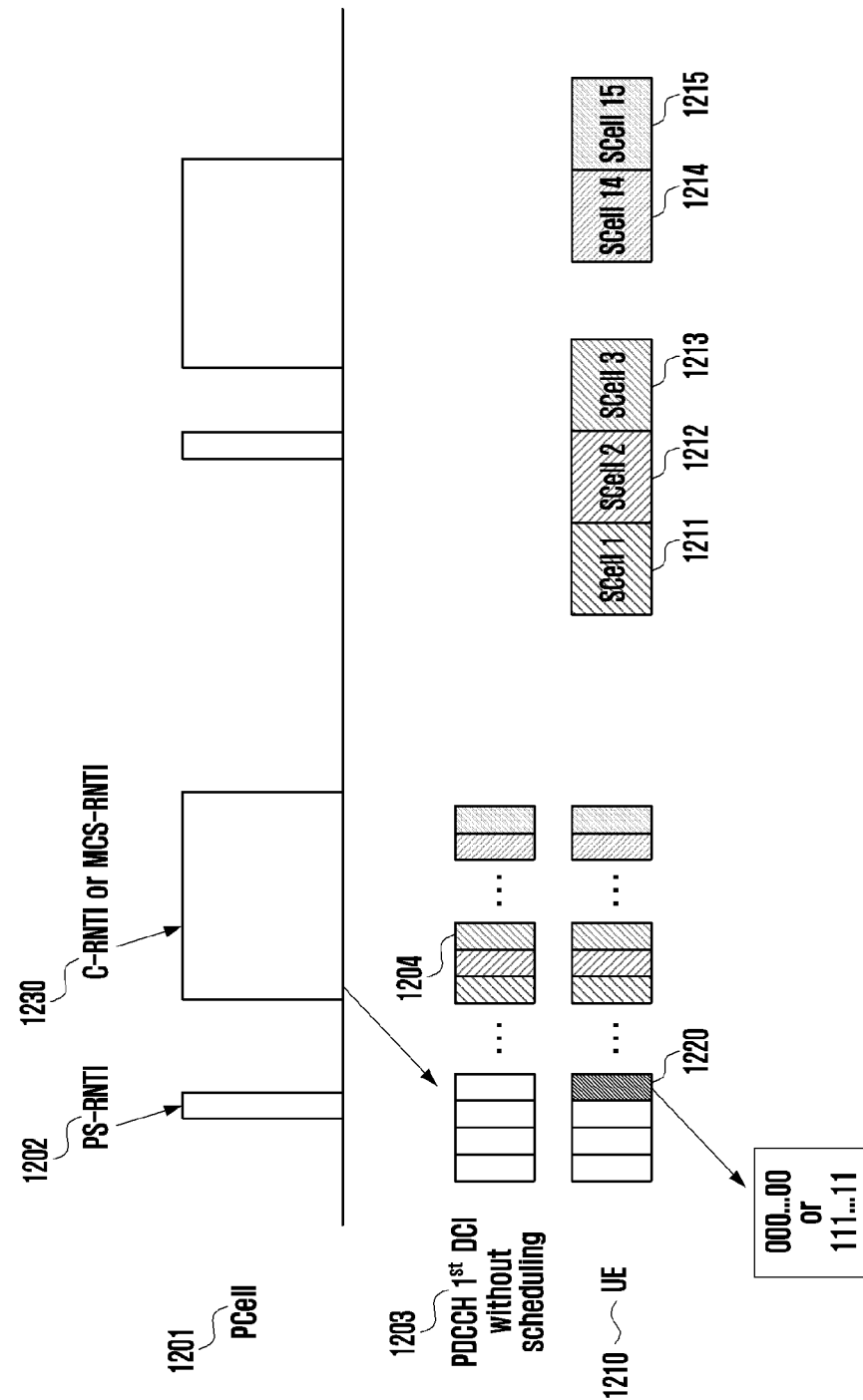
FIG. 12 illustrates a third embodiment that embodies the concept of the method of operating the dormant BWP in the activated SCell described with reference to FIG. 9 of the disclosure.

FIG. 12 illustrates a third embodiment that embodies the conception of the method of operating the dormant BWP in the activated SCell described with reference to FIG. 9 of the disclosure.

In the third embodiment, the gNB may configure a plurality of SCell to the UE for carrier aggregation, allocate each SCell identifier, configure a dormant BWP for each SCell, and may not configure a dormant BWP for some SCells through the RRC message as described in FIG. 6. An SCell identifier value may be allocated as a predetermined bit value and have an integer value (or a natural number value). In order to realize or apply the third embodiment of the disclosure, SCell identifiers configured in the RRC message may be used. The SCell identifiers may indicate SCells or SCell identifiers to which the operation indicated by a DCI bitmap value included in a PDCCH DCI monitored and received within the active time by the UE is applied in the third embodiment of the disclosure.

In FIG. 12, the gNB may configure a power saving function or a DRX function to the UE through the RRC message as described in FIG. 6. Further, in the RRC message, configuration information of a third DCI format (for example, DCI format 1_1) for which the UE should search within an active time 1230 of the DRX cycle for the PCell or SpCell may be configured. When the UE detected the third DCI format in the PCell or SpCell, the UE may identify whether a bitmap including an indicator for each SCell or SCell identifier of the UE in the third DCI format.

The third DCI format may include a transmission resource type (resourceAllocation) field, a frequency transmission resource allocation (frequency domain resource assignment) field, a modulation and coding scheme (MCS) field, a new data indicator (NDI) field, a redundancy version (RV) field, an HARQ process number field, an antenna port field, or a DMRS sequence initialization (DMRS SI) field.

If the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the detected third DCI format, bits or fields located thereafter are not interpreted as the modulation and coding scheme (MCS) field, the new data indicator (NDI) field, the redundancy version (RV) field, the HARQ process number field, the antenna port field, or the DMRS sequence initialization (DMRS SI) field, but information indicated by the bitmap may be applied by considering and reading bitmap fields indicating switching to the dormant BWP for each SCell configured in the UE or activation or indicating switching of the dormant BWP to the normal BWP or the activation. However, if the type indicated by the transmission resource type field (for example, resourceAllocation) is the first type (for example, resourceAllocationType0) and all bits of the frequency transmission resource allocation field are not 0 or if the type indicated by the transmission resource type field (for example, resourceAllocation) is a second type (for example, resourceAllocationType1) and all bits of the frequency transmission resource allocation field are not 1 in the detected third DCI format, bits or fields located thereafter are interpreted, read, and applied as the modulation and coding scheme (MCS) field, the new data indicator (NDI) field, the redundancy version (RV) field, the HARQ process number field, the antenna port field, or the DMRS sequence initialization (DMRS SI) field.

When the UE detected the third DCI format of the PDCCH, if the third DCI format is scrambled with a second UE identifier (for example, SPS-C-RNTI) or detected thereby, a special instruction indicating activation or release of periodic transmission resources configured in the UE may be indicated when the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the detected third DCI format.

Accordingly, if the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format only when the third DCI format of the PDCCH is detected through scrambling with the first UE identifier (for example, C-RNTI or MCS-C-RNTI), the third embodiment of the disclosure proposes interpretation of the fields thereafter as the bitmap indicating the dormant BWP operation for each SCell of the UE.

Further, the gNB may configure a search space of PDCCH monitoring or a UE identifier (for example, C-RNTI or MCS-C-RNTI) for searching for the third DCI format within the active time 1230 in the UE through the RRC message.

For example, the gNB may transmit the third DCI format on PDCCH transmission resources of the active time 1230 in the PCell or SpCell as described above as indicated by reference numeral 1203, and may include a bitmap 1204 indicating indication information for the dormant BWP of the third SCell groups configured to the UE.

As described above, the first UE 1210 applying information configured through the RRC message may monitor the PDCCH on the basis of (or through scrambling with) the first UE identifier (for example, C-RNTI or MCS-C-RNTI) which is an identifier configured within the active time 1230 of the DRX cycle to search for the third DCI format from the gNB in the search space as indicated by reference numeral 1203. If the third DCI format 1203 is detected and the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format 1203 as indicated by reference numeral 1220, fields thereafter may be interpreted as the bitmap indicating the dormant BWP operation for each SCell of the UE and the first UE may read the bitmap 1204 including indication information for the dormant BWP for a plurality of SCells (or SCell identifiers) configured in the first UE.

When the proposed condition is met, the bitmap may have a fixed length, for example, 15 bits or 16 bits since the bitmap is considered to replace the conventional MCS field, NDI field, RV field, HARQ process number field, antenna port field, or DMRS SI field.

In the third embodiment proposed in the disclosure, embodiment 3-1 to which a first bitmap mapping method is applied is described below.

In the first bitmap mapping method, each bit value of the bitmap may be mapped to and indicate each SCell in an ascending order or a descending order of SCell identifier values of SCells configured in the first UE from a right bit (for example, from the least significant bit (LSB)) of the bitmap or from a left bit (for example, from the most significant bit (MSB)).

In another method, in the first bitmap mapping method, each bit value of the bitmap may be mapped to and indicate each SCell in an ascending order of SCell identifier values of SCells of a cell group (a master cell group (MCG) or a secondary cell group (SCG)) configured in the first UE from a right bit (for example, from the least significant bit (LSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in an ascending order only for SCells belonging to the cell group of the SCG. The reason why the SCells mapped to the bitmap are restricted to the SCells of one cell group is that the number of SCell identifiers which can be configured in one UE is 32 and the bitmap is 15 bits or 16 bits.

In another method, in the first bitmap mapping method, each bit value of the bitmap may be mapped to and indicate each SCell in a descending order of SCell identifier values of SCells of a cell group (a master cell group (MCG) or a secondary cell group (SCG)) configured in the first UE from a right bit (for example, from the least significant bit (LSB)) of the bitmap. If the UE receives the third DCI format in the PCell, the SCell identifier values may be mapped to the bitmap in a descending order only for SCells belonging to the cell group of the MCG. If the UE receives the third DCI format in the PSCell, the SCell identifier values may be mapped to the bitmap in a descending order only for SCells belonging to the cell group of the SCG. The reason why the SCells mapped to the bitmap are restricted to the SCells of one cell group is that the number of SCell identifiers which can be configured in one UE is 32 and the bitmap is 15 bits or 16 bits.

In another method, in the first bitmap mapping method, each bit value of the bitmap may be mapped to and indicate each SCell in an ascending order of SCell identifier values of SCells of a cell group (a master cell group (MCG) or a secondary cell group (SCG)) configured in the first UE from a left bit (for example, from the most significant bit (MSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in an ascending order only for SCells belonging to the cell group of the SCG. The reason why the SCells mapped to the bitmap are restricted to the SCells of one cell group is that the number of SCell identifiers which can be configured in one UE is 32 and the bitmap is 15 bits or 16 bits.

In another method, in the first bitmap mapping method, each bit value of the bitmap may be mapped to and indicate each SCell in a descending order of SCell identifier values of SCells of a cell group (a master cell group (MCG) or a secondary cell group (SCG)) configured in the first UE from a left bit (for example, from the most significant bit (MSB)) of the bitmap. If the UE receives the third DCI format in the PCell, the SCell identifier values may be mapped to the bitmap in a descending order only for SCells belonging to the cell group of the MCG. If the UE receives the third DCI format in the PSCell, the SCell identifier values may be mapped to the bitmap in a descending order only for SCells belonging to the cell group of the SCG. The reason why the SCells mapped to the bitmap are restricted to the SCells of one cell group is that the number of SCell identifiers which can be configured in one UE is 32 and the bitmap is 15 bits or 16 bits.

When the mapping rule from the left bit or the right bit of the bitmap is applied, it is possible to reduce the number of bitmaps which the UE should read, thereby enabling more rapid UE processing.

When a bit value of the bitmap 1211, 1212, 1213, 1214, or 1215 is 0, the bit value of 0 may indicate switching to a dormant BWP or activation of a dormant BWP for each activated SCell corresponding to the bit (if a dormant BWP is configured or is included in a first SCell group or a second SCell group). In another method, when the bit value of the bitmap is 0, the bit value of 0 may indicate switching to a dormant BWP or activation of a dormant BWP if a BWP activated for each activated SCell corresponding to the bit is not a dormant BWP (or is a normal BWP). If the dormant BWP is not configured in the activated SCell corresponding to the bit of the bitmap, the UE may ignore or may not read or apply the bit value.

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP. If the dormant BWP is not configured in the activated SCell corresponding to the bit of the bitmap, the UE may ignore or may not read or apply the bit value.

In the third embodiment proposed in the disclosure, embodiment 3-2 to which a second bitmap mapping method is applied is described below.

In the second bitmap mapping method, each bit value of the bitmap may be mapped to and indicated by each SCell in an ascending order or a descending order of SCell identifier values of SCells included in a first SCell group or a second SCell group or in which a dormant BWP is configured among SCells configured in the first UE from a right bit (for example, from the least significant bit (LSB)) of the bitmap or from a left bit (for example, from the most significant bit (MSB)).

In another method, in the second bitmap mapping method, each bit value of the bitmap may be mapped to and indicate each SCell in an ascending order of SCell identifier values of SCells included in a first SCell group or a second SCell group or in which a dormant BWP is configured among SCells of a cell group (a master cell group (MCG) or a secondary cell group (SCG)) configured in the first UE from a right bit (for example, from the least significant bit (LSB)). If the UE receives the third DCI format in the PCell, Scells included in the first SCell group or the second SCell group or in which the dormant BWP is configured among the SCells belonging to the cell group of the MCG may be mapped to the bitmap in an ascending order of the SCell identifier values. Further, if the UE receives the third DCI format in the PSCell, Scells included in the first SCell group or the second SCell group or in which the dormant BWP is configured among the SCells belonging to the cell group of the SCG may be mapped to the bitmap in an ascending order of the SCell identifier values. The reason why the SCells belonging to one cell group are mapped to the bitmap is that the number of SCell identifiers which can be configured in one UE is 32 and the bitmap is 15 bits or 16 bits.

In another method, in the second bitmap mapping method, each bit value of the bitmap may be mapped to and indicate each SCell in a descending order of SCell identifier values of SCells included in a first SCell group or a second SCell group or in which a dormant BWP is configured among SCells of a cell group (a master cell group (MCG) or a secondary cell group (SCG)) configured in the first UE from a right bit (for example, from the least significant bit (LSB)) of the bitmap. If the UE receives the third DCI format in the PCell, Scells included in the first SCell group or the second SCell group or in which the dormant BWP is configured among the SCells belonging to the cell group of the MCG may be mapped to the bitmap in a descending order of the SCell identifier values. Further, if the UE receives the third DCI format in the PSCell, Scells included in the first SCell group or the second SCell group or in which the dormant BWP is configured among the SCells belonging to the cell group of the SCG may be mapped to the bitmap in a descending order of the SCell identifier values. The reason why the SCells belonging to one cell group are mapped to the bitmap is that the number of SCell identifiers which can be configured in one UE is 32 and the bitmap is 15 bits or 16 bits.

In another method, in the second bitmap mapping method, each bit value of the bitmap may be mapped to and indicate each SCell in an ascending order of SCell identifier values of SCells included in a first SCell group or a second SCell group or in which a dormant BWP is configured among SCells of a cell group (a master cell group (MCG) or a secondary cell group (SCG)) configured in the first UE from a left bit (for example, from the most significant bit (MSB)) of the bitmap. If the UE receives the third DCI format in the PCell, Scells included in the first SCell group or the second SCell group or in which the dormant BWP is configured among the SCells belonging to the cell group of the MCG may be mapped to the bitmap in an ascending order of the SCell identifier values. Further, if the UE receives the third DCI format in the PSCell, Scells included in the first SCell group or the second SCell group or in which the dormant BWP is configured among the SCells belonging to the cell group of the SCG may be mapped to the bitmap in an ascending order of the SCell identifier values. The reason why the SCells belonging to one cell group are mapped to the bitmap is that the number of SCell identifiers which can be configured in one UE is 32 and the bitmap is 15 bits or 16 bits.

In another method, in the second bitmap mapping method, each bit value of the bitmap may be mapped to and indicated by each SCell in a descending order of SCell identifier values of SCells included in a first SCell group or a second SCell group or in which a dormant BWP is configured among SCells of a cell group (a master cell group (MCG) or a secondary cell group (SCG)) configured in the first UE from a left bit (for example, from the most significant bit (MSB)) of the bitmap. If the UE receives the third DCI format in the PCell, the SCell identifier values may be mapped to the bitmap in a descending order only for SCells belonging to the cell group of the MCG. Further, if the UE receives the third DCI format in the PSCell, Scells included in the first SCell group or the second SCell group or in which the dormant BWP is configured among the SCells belonging to the cell group of the SCG may be mapped to the bitmap in a descending order of the SCell identifier values. The reason why the SCells belonging to one cell group are mapped to the bitmap is that the number of SCells which can be configured in one UE is 32 and the bitmap is 15 bits or 16 bits.

When the mapping rule from the left bit or the right bit of the bitmap is applied, it is possible to reduce the number of bitmaps which the UE should read, thereby enabling more rapid UE processing.

When a bit value of the bitmap 1211, 1212, 1213, 1214 or 1215 is 0, the bit value of 0 may indicate switching to a dormant BWP or activation of a dormant BWP for each activated SCell corresponding to the bit (if a dormant BWP is configured or is included in a first SCell group or a second SCell group). In another method, when the bit value of the bitmap is 0, the bit value of 0 may indicate switching to a dormant BWP or activation of a dormant BWP if a BWP activated for each activated SCell corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP.

The third embodiment of the disclosure is realized as described above, and the third DCI format of the PDCCH proposed by the third embodiment may be used within the active time and is not accompanied by downlink transmission resources (for example, PDSCH) or uplink transmission resources (for example, PUSCH) for the PCell or SpCell of the UE. Accordingly, in the third embodiment, the UE may receive the third DCI format of the PDCCH and may not transmit ACK or NACK information (for example, HARQ ACK or NACK) for the indication in the third DCI formation.

More specifically, the third embodiment proposed in the disclosure may be realized as follows.

In the third embodiment of the disclosure, a dormancy or non-dormancy operation for SCells of the UE and an operation for a PDCCH monitoring indicator are described below.

For the PCell or SpCell, if a search space is configured, provided, or detected to allow the UE to monitor a PDCCH in order to search for the third DCI format (for example, DCI format 11) through scrambling with or on the basis of a first UE identifier (for example, C-RNTI or MCS-C-RNTI) within the active time as indicated by reference numeral 1230 of FIG. 12 and if the type indicated by a transmission resource type field (for example, resourceAllocation) in the third DCI format is a first type (for example, resourceAllocation-Type0) and all bits of a frequency transmission resource allocation field are 0 or if the type indicated by the transmission resource type field (for example, resourceAllocation) is a second type (for example, resourceAllocationType1) and all bits of the frequency transmission resource allocation field are 1, the UE may consider that the third DCI format includes information on an indication indicating activation or switching of a downlink BWP activated for each activated SCell configured in the UE (or in which a dormant BWP is configured) to the dormant BWP or to a BWP first activated from a dormant state, analyze fields after the transmission resource field or the frequency transmission resource allocation field as a bitmap indicating a dormant BWP operation for each SCell of the UE, and read a bitmap 1204 including indication information for dormant BWPs for a plurality of SCells (or SCell identifiers) configured in the UE.

That is, if the type indicated by the transmission resource type field (for example, resourceAllocation) is a first type (for example, resourceAllocation-Type0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format, bits or fields located thereafter are not analyzed by the modulation and coding scheme (MCS) field, the new data indicator (NDI) field, the redundancy version (RV) field, the HARQ process number field, the antenna port field, or the DMRS sequence initialization (DMRS SI) field, but information indicated by the bitmap may be applied by considering and reading bitmap fields indicating switching to the dormant BWP for each SCell configured in the UE or activation or indicating switching of the dormant BWP to the normal BWP or the activation.

When the condition is met in the third DCI format and the UE reads the bitmap, the first bitmap mapping method or the second bitmap mapping method proposed in the disclosure may be applied.

When the bit value of the bitmap is 0, the bit value of 0 may indicate switching to a dormant BWP or activation of a dormant BWP for each activated SCell or SCell identifier corresponding to the bit (if a dormant BWP is configured or is included in a first SCell group or a second SCell group). In another method, when the bit value of the bitmap is 0, the bit value of 0 may indicate switching to a dormant BWP or activation of a dormant BWP if the dormant BWP is configured for each activated SCell corresponding to the bit or is included in a first SCell group or a second SCell group, or if the activated BWP is not the dormant BWP (or is a normal BWP). In another method, when the bit value of the bitmap is 0, the bit value of 0 may indicate switching to a dormant BWP or activation of a dormant BWP for each activated SCell (in which a dormant BWP is configured or included in a first SCell group or a second SCell group) or SCell identifier corresponding to the bit. In another method, when the bit value of the bitmap is 0, the bit value of 0 may indicate switching to a dormant BWP or activation of a dormant BWP for each activated SCell or SCell identifier corresponding to the bit. If the bit of the bitmap indicates the SCell in which no dormant BWP is configured or the SCell identifier, the UE may ignore the bit to not read or apply the bit.

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP. In another method, when the bit value of the bitmap is 1, the bit value of 1 may indicate switching to the normal BWP (for example, the first active BWP activated from the dormant state) or activation to the normal BWP (for example, the first active BWP activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated.

Another embodiment which is further embodied from the third embodiment proposed in the disclosure is described below.

If a UE is provided search space sets to monitor PDCCH for detection of DCI format 1_1 scrambled by C-RNTI or MCS-C-RNTI, for PCell or SpCell and if resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1 the UE considers the DCI format 11 as indicating an active DL BWP provided by dormant-BWP or by first-non-dormant-BWP-ID-for-DCI-inside-active-time for each activated SCell and interprets the sequence of fields of, for transport block 1

Modulation and coding scheme
New data indicator
Redundancy version
and of
HARQ process number
Antenna port(s)
DMRS sequence initialization as providing a bitmap to each configured SCell from LSB or MSB, in an ascending order of the SCell index for the cell group, where—a '0' value for a bit of the bitmap indicates an active DL BWP, provided by dormant-BWP, for the UE for a corresponding activated SCell configured with dormant BWP or belonging to SCell dormant group.

Option 1.
  if the previous DL BWP was a dormant DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.

Option 2.
  if the previous DL BWP was not an active DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.

Option 3.
  a '1' value for a bit of the bitmap indicates an active DL BWP switched from dormant DL BWP, provided by first-non-dormant-BWP-ID-for-DCI-inside-active-time or the current active DL BWP, for the UE for a corresponding activated SCell Another embodiment which is embodied from the third embodiment proposed in the disclosure is described below.

If a UE is provided search space sets to monitor PDCCH for detection of DCI format 1_1 scrambled by C-RNTI or MCS-C-RNTI, for PCell or SpCell and if resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1 the UE considers the DCI format 1_1 as indicating an active DL BWP provided by dormant-BWP or by first-non-dormant-BWP-ID-for-DCI-inside-active-time for each activated SCell and interprets the sequence of fields of, for transport block 1

Modulation and coding scheme
New data indicator
Redundancy version
and of
HARQ process number
Antenna port(s)
DMRS sequence initialization as providing a bitmap to each configured SCell from LSB or MSB, in an ascending order of the SCell index configured with dormant BWP or belonging to dormant SCell group for the cell group, where—a '0' value for a bit of the bitmap indicates an active DL BWP, provided by dormant-BWP, for the UE for a corresponding activated SCell Option 1.
  if the previous DL BWP was a dormant DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.
Option 2.
  if the previous DL BWP was not an active DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.
Option 3.
  a '1' value for a bit of the bitmap indicates an active DL BWP switched from dormant DL BWP, provided by first-non-dormant-BWP-ID-for-DCI-inside-active-time or the current active DL BWP, for the UE for a corresponding activated SCell If an active DL BWP provided by dormant-BWP for a UE on an activated SCell is not a default DL BWP for the UE on the activated SCell, as described in Clause 12, the BWP inactivity timer is not used for transitioning from the active DL BWP provided by dormant-BWP to the default DL BWP on the activated SCell.

Figure 13:
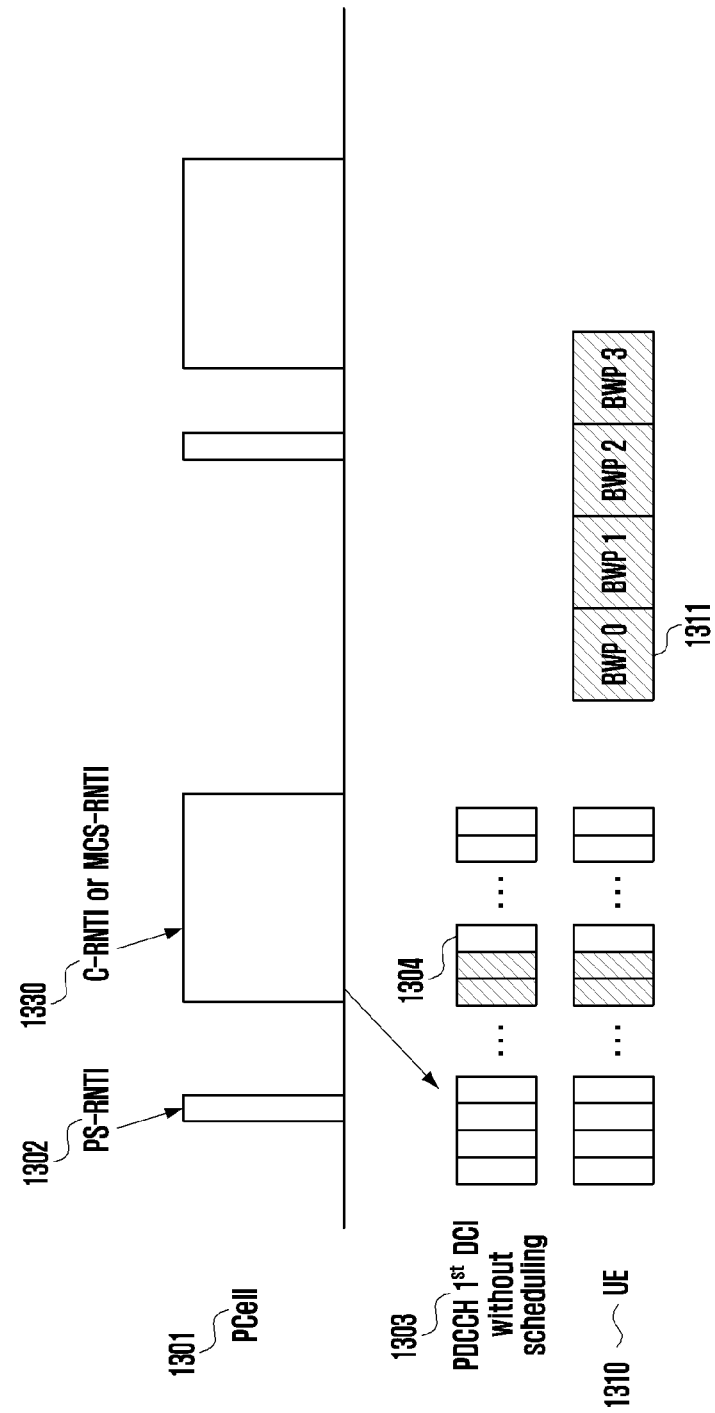
FIG. 13 illustrates a fourth embodiment that embodies the concept of the method of operating the dormant BWP in the activated SCell described with reference to FIG. 9 of the disclosure.

FIG. 13 illustrates a fourth embodiment that embodies the conception of the method of operating the dormant BWP in the activated SCell described with reference to FIG. 9 of the disclosure.

In the fourth embodiment, the gNB may configure a plurality of SCells in the UE for carrier aggregation through the RRC message as described in FIG. 6, allocate each SCell identifier, configure a dormant BWP for each SCell, and may not configure a dormant BWP for some SCells. A plurality of BWPs may be configured to each SCell, and a BWP identifier may be allocated to each BWP. A value of 0, 1, 2, 3, or 4 may be allocated to each BWP identifier. A predetermined bit value (for example, 5 bits) may be allocated to the SCell identifier value, and the SCell identifier may have an integer value (or a natural number value). In order to realize or apply the fourth embodiment of the disclosure, SCell identifiers or BWP identifiers configured in the RRC message may be used. In the fourth embodiment of the disclosure, in order to monitor PDCCH DCI in a PCell or SCell within an active time and indicate switching or activation of a BWP by a 2-bit indicator of received DCI, the UE may indicate a BWP identifier value. The 2-bit indicator value may be 0, 1, 2, or 3, and refer to a specific BWP identifier value to indicate a BWP to which the current BWP switches or a BWP to be activated.

In FIG. 13, the gNB may configure a power saving function or a DRX function in the UE through the RRC message as illustrated in FIG. 6. Further, in the RRC message, the gNB may configure configuration information of a fourth DCI format (for example, DCI format 0 or DCI format 1) for which the UE should search within an active time 1330 of the DRX cycle for the PCell, SpCell, or SCell. When the UE detected the fourth DCI format in the PCell, SpCell, or SCell (for example, on the basis of a UE identifier (C-RNTI, MCS-RNTI, or SPS-C-RNTI), the UE may identify whether a 2-bit indicator indicating BWP switching of the activated SCell of the UE is included in the fourth DCI format. The 2-bit indicator may indicate a BWP identifier value and, for example, indicate a BWP identifier value configured through the RRC message, such as 00=0, 01=1, 10=2, or 11=3.

The PDCCH DCI proposed by the fourth embodiment (for example, the fourth DCI format) may be accompanied by downlink transmission resources (downlink assignment) or uplink transmission resources (uplink grant), and may be used to switch a BWP currently activated in the PCell, SpCell, or SCell to another BWP or to activate the BWP.

For example, in order to indicate switching of the current BWP activated in the PCell, SpCell, or SCell to a first BWP or activation of the current BWP through PDCCH DCI 1303 proposed by the fourth embodiment, the gNB may indicate an identifier value 1311 of the first BWP through a 2-bit indicator 1304 of the fourth DCI format and indicate downlink transmission resources or uplink transmission resources for the first BWP. The UE may read the received 2-bit indicator of the received fourth DCI format, switch the current BWP to the first BWP 1311 or activate the current BWP according to an indication, receive downlink data through the downlink transmission resources of the first BWP, or transmit uplink data through the uplink transmission resources. The UE may transmit HARQ ACK or NACK for the downlink transmission resources in the first BWP. Accordingly, upon receiving HARQ ACK or NACK for the downlink transmission in the first BWP or receiving uplink data through the uplink transmission resources, the gNB may know that the BWP indicated by the fourth DCI format of the PDCCH is successfully indicated. Further, the fourth embodiment may be applied to a procedure of switching the current BWP (for example, a first BWP) activated in the PCell, SpCell, or SCell to a second BWP (for example, a BWP first activated from a dormant state configured through RRC) or activating the current BWP through the PDCCH DCI 1303.

When the fourth embodiment is applied, the gNB or the UE may specifically operate as follows.
  In the case in which an indication indicating switching of a second BWP (a normal BWP or a BWP which is not a dormant BWP) of any serving cell (for example, SCell) to a first BWP (dormant BWP) or activation of the second BWP is made,
  Alternatively, in the case in which an indication indicating switching of a second BWP (a normal BWP or a BWP which is not a dormant BWP) to another second BWP or activation of the second BWP is made,
  if self-scheduling is configured in the UE for the serving cell,
    the gNB applies the fourth embodiment to transmit the proposed PDCCH DCI to the UE in the serving cell.
    the UE may receive the PDCCH DCI in the serving cell, perform the procedure proposed by the fourth embodiment, and perform switching to a BWP indicated by a 2-bit indicator of the DCI or perform activation.
  if cross-scheduling is configured in the UE for the serving cell,
    the gNB applies the fourth embodiment to transmit the indication for the serving cell to the UE in the PCell or SpCell through the PDCCH DCI.
    the UE may receive the indication for the serving cell in the PCell or SpCell through the PDCCH DCI, perform the procedure proposed by the fourth embodiment, and perform switching to a BWP indicated by a 2-bit indicator of the DCI or perform activation.
  If an indication indicating switching of a first BWP (dormant BWP) of a serving cell (for example, SCell)

to a second BWP (a normal BWP or a BWP which is not a dormant BWP) or activation of the first BWP is made, the PDCCH is not monitored in the serving cell when the first dormant BWP is activated in the serving cell, and thus the gNB or the UE cannot apply the fourth embodiment in the serving cell.

if cross-scheduling is configured in the UE for the serving cell or if the gNB realizes the first embodiment, the second embodiment, or the third embodiment proposed in the disclosure in the PCell or SpCell through cross-scheduling, the gNB applies the first embodiment, the second embodiment, the third embodiment, or the fourth embodiment to transmit the indication for the serving cell to the UE in the PCell or SpCell through the PDCCH DCI.

the UE may receive the indication for the serving cell in the PCell or SpCell through the PDCCH DCI, perform the procedure proposed by the fourth embodiment, and perform switching to a BWP indicated a 2-bit indicator of the DCI or perform activation. In another method, the UE may receive the indication for the serving cell in the PCell or SpCell through the PDCCH DCI, perform the procedure proposed by the first embodiment, the second embodiment, or the third embodiment, and perform switching to a BWP (for example, a BWP first activated from a dormant state) configured or indicated by RRC or perform activation according to an indication of a DCI bitmap of the embodiments.

When the first embodiment, the second embodiment, the third embodiment, or the fourth embodiment of the disclosure is applied, if the downlink dormant BWP configured in the SCell of the UE is not a downlink default BWP (default DL BWP), a BWP inactivity timer for switching or transitioning the dormant BWP to a default BWP may not be used. This is because, when the default BWP is configured as a normal BWP which is not a dormant BWP, the dormant BWP is automatically switched to the normal BWP when the timer expires, and thus battery consumption due to PDCCH monitoring may be generated.

Figure 14:
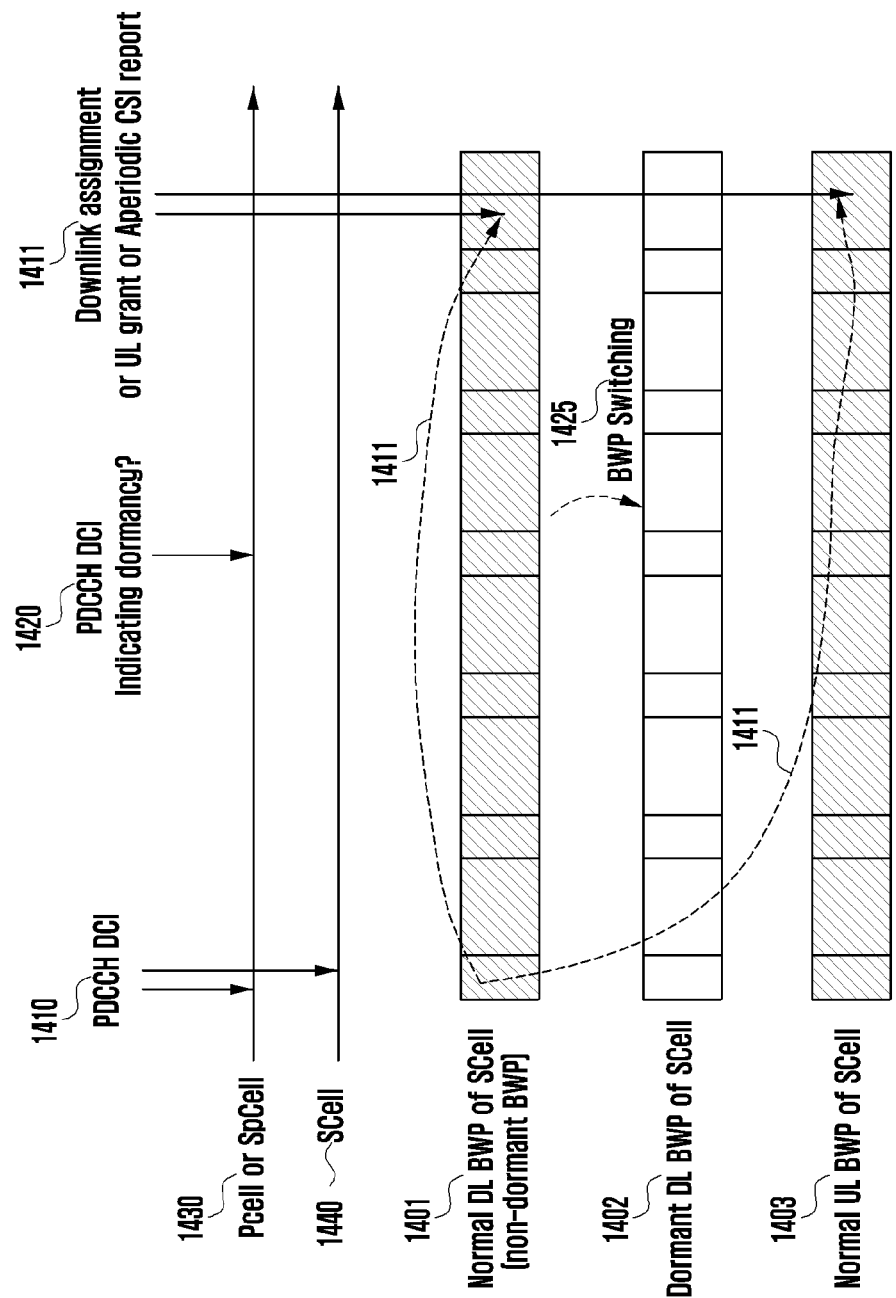
FIG. 14 illustrates a problem occurring due to a temporal difference between instructions or indications of PDCCH DCI which the gNB transmits or the UE receives from the gNB.

FIG. 14 illustrates a problem occurring due to a temporal difference between instructions or indications of PDCCH DCI which the gNB transmits or the UE receives from the gNB.

In FIG. 14, the UE may receive first PDCCH DCI 1410 in a Pcell or SpCell 1430 through cross-scheduling or in an SCell 1440 through self-scheduling for a second BWP (a downlink BWP 1401 which is not a dormant BWP or an uplink BWP 1403 which is not a dormant BWP) of the activated Scell 1440. The first PDCCH DCI may indicate (or allocate) uplink transmission resources 1411 (PUSCH) for the uplink BWP, indicate (or allocate) downlink transmission resources 1411 (PDSCH) for the downlink BWP, or indicate (or allocate) the uplink transmission resources 1411 (PUSCH) for an aperiodic channel measurement report (aperiodic CSI report) for the uplink BWP.

After receiving the first PDCCH DCI, the UE may receive second PDCCH DCI 1420 in the Pcell or SpCell 1430 or the SCell before receiving downlink data through the downlink transmission resources (PDSCH) of the downlink BWP indicated by the first PDCCH DCI or before transmitting uplink data (or aperiodic channel measurement result report) through the uplink transmission resources (PUSCH) of the uplink BWP indicated by the first PDCCH DCI.

The first embodiment, the second embodiment, the third embodiment, or the fourth embodiment proposed in the disclosure may be applied when the gNB transmits the first PDCCH DCI or the second PDCCH DCI, and the UE operation may be performed according to the first embodiment, the second embodiment, the third embodiment, or the fourth embodiment proposed in the disclosure when the UE receives the first PDCCH DCI or the second PDCCH DCI.

A first problem which may occur due to switching between downlink normal BWPs in the embodiment of FIG. 14 is described below.

If the second PDCCH DCI 1420 indicates switching of the current second downlink BWP to a third downlink BWP (a BWP which is not a dormant BWP), the UE performs switching to the third downlink BWP before receiving downlink data through the downlink transmission resources 1411 indicated by the first PDCCH DCI, and thus a problem that downlink data cannot be received through the downlink transmission resources 1411 indicated by the first PDCCH DCI may occur. Accordingly, in order to solve the first problem, one of the following methods may be applied or a plurality of methods among the following methods may be combined and applied.

First solution: When the second PDCCH DCI 1420 indicates switching of the current second downlink BWP of the SCell to the third downlink BWP (BWP which is not the dormant BWP), the UE may directly perform switching to the third downlink BWP indicated by the second PDCCH DCI 1420 before receiving downlink data through the downlink transmission resources 1411 indicated by the first PDCCH DCI. Accordingly, the UE may not receive downlink data through the downlink transmission resources 1411 indicated by the first PDCCH DCI, the UE may consider that the downlink data is not transmitted, or the UE may not be required to receive the downlink data. That is, the gNB may determine that the downlink data indicated by the first PDCCH DCI is not important and may transmit the second PDCCH DCI 1420 to the UE.

Second solution: Transmission of the second PDCCH DCI 1420 indicating switching of the current second downlink BWP to the third downlink BWP (BWP which is not the dormant BWP) by the gNB may be limited before the UE successfully receive the downlink data through the downlink transmission resources 1411 indicated by the first PDCCH DCI. Accordingly, specifically, the gNB may transmit the second PDCCH DCI 1420 to the UE after the UE receives the downlink data through the downlink transmission resources 1411 indicated by the first PDCCH DCI and transmits HARQ ACK or NACK in response thereto or successfully receives the downlink data or after the gNB identifies that the UE successfully receives the downlink data (receives ACK). That is, the gNB cannot transmit the second PDCCH DCI 1420 to the UE before the UE receives the downlink data through the downlink transmission resources 1411 indicated by the first PDCCH DCI, transmits HARQ ACK or NACK in response thereto, or successfully receives the downlink data or before the gNB identifies that the UE successfully receives the downlink data (receives ACK).

Third solution: When the second PDCCH DCI 1420 indicates switching of the current second downlink BWP of the SCell to the third downlink BWP (BWP which is not the dormant BWP), the UE may perform switching to the third downlink BWP indicated by the second PDCCH DCI 1420 after receiving downlink data through the downlink transmission resources 1411 indicated by the first PDCCH DCI or after receiving the downlink data and then transmitting HARQ ACK or NACK. Accordingly, the UE receives downlink data through the downlink transmission resources 1411 indicated by the first PDCCH DCI and then performs switching.

In the embodiment of FIG. 14, a second problem which may occur due to switching between uplink normal BWPs is described below.

If the second PDCCH DCI 1420 indicates switching of the current second uplink BWP to a third uplink BWP (a BWP which is not a dormant BWP), the UE performs switching to the indicated third downlink BWP before transmitting uplink data through the uplink transmission resources 1411 indicated by the first PDCCH DCI, and thus a problem that uplink data cannot be transmitted through the uplink transmission resources 1411 indicated by the first PDCCH DCI may occur. Accordingly, in order to solve the second problem, one of the following methods may be applied or a plurality of methods among the following methods may be combined and applied.

First solution: When the second PDCCH DCI 1420 indicates switching of the current second uplink BWP of the SCell to the third uplink BWP (BWP which is not the dormant BWP), the UE may directly perform switching to the third downlink BWP indicated by the second PDCCH DCI 1420 before receiving uplink data through the uplink transmission resources 1411 indicated by the first PDCCH DCI. Accordingly, the UE may not transmit uplink data through the up transmission resources 1411 indicated by the first PDCCH DCI, the UE may consider that the uplink data is not transmitted, or the UE may not be required to transmit the uplink data. That is, the gNB may determine that the uplink data indicated by the first PDCCH DCI is not important and may transmit the second PDCCH DCI 1420 to the UE.

Second solution: Transmission of the second PDCCH DCI 1420 indicating switching of the current second uplink BWP to the third uplink BWP (BWP which is not the dormant BWP) by the gNB may be limited before the UE successfully transmits the uplink data through the uplink transmission resources 1411 indicated by the first PDCCH DCI. Accordingly, specifically, the gNB may transmit the second PDCCH DCI 1420 to the UE after the UE transmits the uplink data through the uplink transmission resources 1411 indicated by the first PDCCH DCI, receives HARQ ACK or NACK in response thereto, or successfully transmits the uplink data, or after the gNB identifies that the UE successfully transmits the uplink data (receives ACK). That is, the gNB cannot transmit the second PDCCH DCI 1420 to the UE before the UE transmits the uplink data through the uplink transmission resources 1411 indicated by the first PDCCH DCI, receives HARQ ACK or NACK in response thereto, successfully transmits the uplink data, or identifies that the gNB successfully receives the uplink data (receives ACK or identifies an NDI value).

Third solution: When the second PDCCH DCI 1420 indicates switching of the current second uplink BWP of the SCell to the third uplink BWP (BWP which is not the dormant BWP), the UE may perform switching to the third uplink BWP indicated by the second PDCCH DCI 1420 after transmitting uplink data through the uplink transmission resources 1411 indicated by the first PDCCH DCI or identifying that the gNB successfully receives the uplink data (for example, identifying an NDI value). Accordingly, the UE transmits uplink data through the uplink transmission resources 1411 indicated by the first PDCCH DCI and then performs switching.

In the embodiment of FIG. 14, a third problem which may occur due to switching of a downlink normal BWP to a downlink dormant BWP is described below.

If the second PDCCH DCI 1420 indicates switching 1425 of the current second downlink BWP to a first downlink BWP (dormant BWP), the UE performs switching to the indicated first downlink BWP before the UE transmits uplink data through the uplink transmission resources 1411 or the downlink transmission resources 1411 indicated by the first PDCCH DCI, and thus a problem that uplink data cannot be transmitted through the uplink transmission resources 1411 indicated by the first PDCCH DCI or a problem that downlink data cannot be received through the downlink transmission resources 1411 indicated by the first PDCCH DCI may occur. Accordingly, in order to solve the third problem, a method for a downlink BWP or a method for an uplink BWP is proposed, and one of the following methods may be applied or a plurality of methods among the following methods may be combined and applied.

The operation of the downlink BWP proposed to solve the third problem is described below, and one of the following methods may be applied or a plurality of methods among the following methods may be combined and applied.

First solution: When the second PDCCH DCI 1420 indicates switching of the current second downlink BWP of the SCell to the first downlink BWP (dormant BWP), the UE may directly perform switching to the first downlink BWP indicated by the second PDCCH DCI 1420 before receiving downlink data through the downlink transmission resources 1411 indicated by the first PDCCH DCI. Accordingly, the UE may not receive downlink data through the downlink transmission resources 1411 indicated by the first PDCCH DCI, the UE may consider that the downlink data is not transmitted, or the UE may not be required to receive the downlink data. That is, the gNB may determine that the downlink data indicated by the first PDCCH DCI is not important and may transmit the second PDCCH DCI 1420 to the UE.

Second solution: Transmission of the second PDCCH DCI 1420 indicating switching of the current second downlink BWP to the first downlink BWP (dormant BWP) by the gNB may be limited before the UE successfully receive the downlink data through the downlink transmission resources 1411 indicated by the first PDCCH DCI. Accordingly, specifically, the gNB may transmit the second PDCCH DCI 1420 to the UE after the UE receives the downlink data through the downlink transmission resources 1411 indicated by the first PDCCH DCI and transmits HARQ ACK or NACK in response thereto or successfully receives the downlink data or after the gNB identifies that the UE successfully receives the downlink data (receives ACK). That is, the gNB cannot transmit the second PDCCH DCI 1420 to the UE before the UE receives the downlink data through the downlink transmission resources 1411 indicated by the first PDCCH DCI, transmits HARQ ACK or NACK in response thereto, or successfully receives the downlink data or before the gNB identifies that the UE successfully receives the downlink data (receives ACK).

Third solution: When the second PDCCH DCI 1420 indicates switching of the current second downlink BWP of the SCell to the first downlink BWP (dormant BWP), the UE may perform switching to the first downlink BWP indicated by the second PDCCH DCI 1420 after receiving downlink data through the downlink transmission resources 1411 indicated by the first PDCCH DCI or after receiving the downlink data and then transmitting HARQ ACK or NACK. Accordingly, the UE receives downlink data through the downlink transmission resources 1411 indicated by the first PDCCH DCI and then performs switching.

The operation of the uplink BWP proposed to solve the third problem is described below, and one of the following methods may be applied or a plurality of methods among the following methods may be combined and applied.

First solution: When the second PDCCH DCI 1420 indicates switching of the current second downlink BWP of the SCell to the first downlink BWP (dormant BWP), the UE may directly perform switching to the first downlink BWP indicated by the second PDCCH DCI 1420 before transmitting uplink data through the uplink transmission resources 1411 indicated by the first PDCCH DCI. Further, when the second PDCCH DCI 1420 indicates switching of the current second downlink BWP of the SCell to the first downlink BWP (dormant BWP), the UE may directly hibernate or deactivate an uplink BWP corresponding to the SCell and may apply the operation proposed in the disclosure when the BWP is hibernated or deactivated. In another method, when the second PDCCH DCI 1420 indicates switching of the current second downlink BWP of the SCell to the first downlink BWP (dormant BWP), the UE may directly switch the uplink BWP corresponding to the SCell to a uplink dormant BWP configured through an RRC message or activate the uplink BWP. Accordingly, the UE may not transmit uplink data through the uplink transmission resources 1411 indicated by the first PDCCH DCI, the UE may consider that the uplink data is not transmitted, or the UE may not be required to transmit the uplink data. That is, the gNB may determine that the uplink data indicated by the first PDCCH DCI is not important and may transmit the second PDCCH DCI 1420 to the UE.

Second solution: Transmission of the second PDCCH DCI 1420 indicating switching of the current second downlink BWP to the first downlink BWP (dormant BWP) by the gNB may be limited before the UE successfully transmits the uplink data through the uplink transmission resources 1411 indicated by the first PDCCH DCI. Accordingly, specifically, the gNB may transmit the second PDCCH DCI 1420 to the UE after the UE transmits the uplink data through the uplink transmission resources 1411 indicated by the first PDCCH DCI, receives HARQ ACK or NACK in response thereto, or successfully transmits the uplink data, or after the gNB identifies that the UE successfully transmit the uplink data (receives ACK). That is, the gNB cannot transmit the second PDCCH DCI 1420 to the UE before the UE transmits the uplink data through the uplink transmission resources 1411 indicated by the first PDCCH DCI, receives HARQ ACK or NACK in response thereto, successfully transmits the uplink data, or identifies that the gNB successfully receives the uplink data (receives ACK or identifies an NDI value).

Third solution: When the second PDCCH DCI 420 indicates switching of the current second downlink BWP of the SCell to the first downlink BWP (dormant BWP), the UE may hibernate or deactivate an uplink BWP corresponding to the SCell after transmitting uplink data through the uplink transmission resources 1411 indicated by the first PDCCH DCI or identifying that the gNB successfully receives the uplink data (for example, identifying an NDI value) and may apply the operation proposed in the disclosure when the BWP is hibernated or deactivated. In another method, when the second PDCCH DCI 420 indicates switching of the current second downlink BWP of the SCell to the first downlink BWP (dormant BWP), the UE may switch the uplink BWP corresponding to the SCell to an uplink BWP configured through an RRC message or activate the uplink BWP after transmitting uplink data through the uplink transmission resources 1411 indicated by the first PDCCH DCI or identifying that the gNB successfully receives the uplink data (for example, identifying an NDI value) and may apply the operation proposed in the disclosure when the BWP is hibernated or deactivated. When the second PDCCH DCI 1420 indicates switching of the current second downlink BWP of the SCell to the first downlink BWP (dormant BWP), the UE may directly perform switching to the first downlink BWP indicated by the second PDCCH DCI 1420 for the downlink BWP before transmitting uplink data through the downlink transmission resources 1411 indicated by the first PDCCH DCI. When the second PDCCH DCI 1420 indicates switching of the current second downlink BWP of the SCell to the first downlink BWP (dormant BWP), the UE may perform switching to the first downlink BWP indicated by the second PDCCH DCI 1420 for the downlink BWP after successfully transmitting uplink data through the uplink transmission resources 1411 indicated by the first PDCCH DCI. Accordingly, the UE may transmit uplink data through the uplink transmission resources 1411 indicated by the first PDCCH DCI.

In the disclosure, the first solution, the second solution, or the third solution for the downlink BWP and the first solution, the second solution, or the third solution for the uplink BWP to solve the third problem may be applied to the UE transmitting or receiving data to or from the gNB through a frequency division duplex (FDD) system or an FDD method. This is because the uplink and the downlink use different frequencies and different BWPs in the FDD communication. However, one of the following methods may be applied to the UE transmitting or receiving data to or from the gNB through a TDD system or a TDD method. In the TDD communication, since the uplink and the downlink do not share time for the same frequency and the same BWP, switching or activation timing for one BWP is determined as follows.

First solution: When the second PDCCH DCI 1420 indicates switching of the current second downlink BWP of the SCell to the first downlink BWP (dormant BWP), the UE may directly perform switching to the first downlink BWP (uplink or downlink) indicated by the second PDCCH DCI 1420 before receiving downlink data through the downlink transmission resources 1411 indicated by the first PDCCH DCI or transmitting uplink data through the uplink transmission resources 1411 indicated by the first PDCCH DCI. Accordingly, the UE may not receive uplink data through the downlink transmission resources 1411 indicated by the first PDCCH DCI or not transmit uplink data through the uplink transmission resources 1411 indicated by the first PDCCH DCI, the UE may consider that the downlink data is not transmitted, or the UE may not be required to receive the downlink data or transmit the uplink data through the uplink transmission resources 1411 indicated by the first PDCCH DCI. That is, the gNB may determine that the downlink data or the uplink data indicated by the first PDCCH DCI is not important and may transmit the second PDCCH DCI 1420 to the UE.

Second solution: Transmission of the second PDCCH DCI 1420 indicating switching of the current second downlink BWP to the first downlink BWP (dormant BWP) by the gNB may be limited before the UE successfully receive the downlink data through the downlink transmission resources 1411 indicated by the first PDCCH DCI or successfully transmits the uplink data through the uplink transmission resources 1411 indicated by the first PDCCH DCI. Accordingly, specifically, the gNB may transmit the second PDCCH DCI 1420 to the UE after the UE receives the downlink data through the downlink transmission resources 1411 indicated by the first PDCCH DCI and transmits HARQ ACK or NACK in response thereto or successfully receives the downlink data, after the gNB identifies that the UE successfully receives the downlink data (receives ACK), or after the gNB successfully receives uplink data through the uplink transmission resources 1411 indicated by the first PDCCH DCI. That is, the gNB cannot transmit the second PDCCH DCI 1420 to the UE before the UE receives the downlink data through the downlink transmission resources 1411 indicated by the first PDCCH DCI, transmits HARQ ACK or NACK in response thereto, or successfully receives the downlink data, before the gNB identifies that the UE successfully receives the downlink data (receives ACK), or the gNB receives uplink data through the uplink transmission resources 1411 indicated by the first PDCCH DCI.

Third solution: When the second PDCCH DCI 1420 indicates switching of the current second downlink BWP of the SCell to the first downlink BWP (dormant BWP), the UE may perform switching to the first BWP (uplink or downlink) indicated by the second PDCCH DCI 1420 or activate the second downlink BWP after receiving downlink data through the downlink transmission resources 1411 indicated by the first PDCCH DCI, receiving the downlink data and transmitting HARQ ACK or NACK, or successfully transmitting uplink data through the uplink transmission resources 1411 indicated by the first PDCCH DCI. Accordingly, the UE may perform switching or activation after receiving downlink data through the downlink transmission resources 1411 indicated by the first PDCCH DCI or transmitting uplink data through the uplink transmission resources 1411 indicated by the first PDCCH DCI.

When the UE receives an indication indicating to switch to or activate the second downlink BWP from the first downlink BWP (dormant BWP) of the activated SCell according to the first embodiment, the second embodiment, or the third embodiment proposed in the disclosure, the second downlink BWP may be a downlink BWP first activated from a dormant state configured through an RRC message. However, when the UE receives an indication indicating activation of the deactivated SCell through MAC control information proposed in the disclosure, the second downlink BWP or the second uplink BWP may be a first activated downlink BWP or a first activated uplink BWP configured through the RRC message when the UE activates the second downlink BWP or the second uplink BWP.

FIG. 15 proposes the structure of an RRC message for configuring configuration information for the application of the first embodiment, the second embodiment, the third embodiment, or the fourth embodiment proposed in the disclosure.

In FIG. 15, the gNB may transmit configuration information for the application of the first embodiment, the second embodiment, the third embodiment, or the fourth embodiment proposed in the disclosure to the UE through the RRC message (for example, RRCSetup message, RRCResume message, or RRCReconfiguration message) as illustrated in FIG. 6.

The format of the RRC message (for example, RRCReconfiguration message) may be configured as illustrated in FIG. 15.

The RRC message may include bearer configuration information 1510 for configuring each bearer.

The RRC message may include cell group configuration information 1511 for configuring each RLC layer device, MAC layer device, PHY layer device, or cell. Accordingly, the cell group configuration information 1511 may include RLC layer device configuration information, MAC layer device configuration information 1521, PHY layer device configuration information 1525, or configuration information 1522, 1523, 1524, 1530, 1540, 1541, and 1542 for configuring the cell.

In order to configure the configuration information for the application of the first embodiment, the second embodiment, the third embodiment, or the fourth embodiment proposed in the disclosure, the gNB may configure a plurality of SCells in the UE for carrier aggregation and allocate each SCell identifier through the RRC message as illustrated in FIG. 15. Further, the gNB may configure a dormant BWP for each SCell, and does not configure a dormant BWP for some SCells. Further, the gNB may include the plurality of SCells in each SCell group (a first SCell group for the first embodiment or a second SCell group for the second embodiment), and one SCell group (the first SCell group for the first embodiment or the second SCell group for the second embodiment) may include a plurality of SCells. An SCell group identifier (a first SCell group identifier for the first embodiment or a second SCell group identifier for the second embodiment) may be allocated to each SCell group (a first SCell group for the first embodiment or a second SCell group for the second embodiment), and a plurality of SCells identifiers may be included in or mapped to the respective SCell group identifiers (the first SCell group identifier for the first embodiment or the second SCell group identifier for the second embodiment). An SCell identifier value or an SCell group identifier value may be allocated as a predetermined bit value and have an integer value (or a natural number value). The number of first SCell groups for the first embodiment may be plural, and the first SCell group may have the SCell group identifier or the SCell group identifier may be mapped to a first SCell group set identifier for the first embodiment. Further, the number of second SCell groups for the second embodiment may be plural, and the second SCell group may have the SCell group identifier or the SCell group identifier may be mapped to a second SCell group set identifier for the second embodiment.

A plurality of BWPs may be configured in each of the uplink and the downlink for each SCell, and a BWP identifier may be allocated to each BWP. A value of 0, 1, 2, 3, or 4 may be allocated to each BWP identifier. A predetermined bit value (for example, 5 bits) may be allocated to the SCell identifier value, and the SCell identifier may have an integer value (or a natural number value). For each SCell, a first active BWP, a default BWP, an initial BWP, a dormant BWP, or a BWP first activated from a dormant state for an uplink or downlink may be indicated and configured by a BWP identifier.

Specifically, a method of configuring configuration information for the application of the first embodiment, the second embodiment, the third embodiment, or the fourth embodiment proposed in the disclosure by the UE or the gNB is described below, and one or a plurality of following methods may be applied.

First method: When an SCell identifier 1540 is configured in cell configuration information 1523, 1530 included in cell group configuration information 1511 of the RRC message, dormant SCell group configuration information may be also included therein and thus a first SCell group (or group identifier) or a second SCell group (or group identifier) to which the SCell identifier is mapped or in which the SCell identifier is included may be indicated. The dormant SCell group configuration information may include the first SCell group set identifier for the first embodiment and include an identifier of the first SCell group belonging to the first SCell group set for the first embodiment, and thus the SCell identifier may be mapped to or included in the first SCell group (group corresponding to the group identifier) of the first SCell group set. Further, the dormant SCell group configuration information may include the second SCell group set identifier for the second embodiment and include an identifier of the second SCell group belonging to the second SCell group set for the second embodiment, and thus the SCell identifier may be mapped to or included in the second SCell group (group corresponding to the group identifier) of the second SCell group set. In another method, the dormant SCell group configuration information may include one of the first SCell group set identifier for the first embodiment and the second SCell group set identifier for the second embodiment and include an identifier of the first SCell group belonging to the first SCell group set for the first embodiment or a second SCell group set identifier for the second embodiment, and thus the SCell identifier may be mapped to or included in the SCell group of one SCell group set among the first SCell group of the first SCell group set and the second SCell group of the second SCell group set. That is, one SCell identifier may be mapped to or included in only one SCell group among the first SCell group for the first embodiment and the second SCell group for the second embodiment or may be included in only one SCell group. In order to configure a plurality of first SCell groups when dormant SCell group configuration information is configured in cell configuration information 1523 and 1530 of the cell group configuration information 1511 of the RRC message, a first SCell group list may be configured, and the first SCell group list may include first SCell group identifiers and, more specifically, may include lists to which SCell groups are added, in which SCell groups are modified, or from which SCell groups are released. Further, in order to configure a plurality of second SCell groups when dormant SCell group configuration information is configured in cell configuration information 1523 and 1530 of the cell group configuration information 1511 of the RRC message, a second SCell group list may be configured, and the second SCell group list may include second SCell group identifiers and, more specifically, may include lists to which SCell groups are added, in which SCell groups are modified, or from which SCell groups are released.

Second method: When an SCell identifier 1540 is configured in cell configuration information 1523 and 1530 of cell group configuration information 1511 of the RRC message, dormant SCell group configuration information may be also included therein and thus a first SCell group (or group identifier) or a second SCell group (or group identifier) to which the SCell identifier is mapped or in which the SCell identifier is included may be indicated. The dormant SCell group configuration information may include an identifier of the first SCell group belonging to the first SCell group set (groups) and thus the SCell identifier may be mapped to or included in the first SCell group (group corresponding to the group identifier) of the first SCell group set. Further, the dormant SCell group configuration information may include an identifier of the second SCell group belonging to the second SCell group set (groups) and thus the SCell identifier may be mapped to or included in the second SCell group (group corresponding to the group identifier) of the second SCell group set. In another method, the dormant SCell group configuration information may include the identifier of the first SCell group belonging to the first SCell group set for the first embodiment or a second SCell group set identifier for the second embodiment and thus the SCell identifier may be mapped to or included in the SCell group of one of the first SCell group of the first SCell group set and the second SCell group of the second SCell group set. That is, one SCell identifier may be mapped to or included in only one SCell group among the first SCell group for the first embodiment and the second SCell group for the second embodiment or may be included in only one SCell group. In order to configure a plurality of first SCell groups when dormant SCell group configuration information is configured in cell configuration information 1523 and 1530 of the cell group configuration information 1511 of the RRC message, a first SCell group list may be configured, and the first SCell group list may include first SCell group identifiers and, more specifically, may include lists to which SCell groups are added, in which SCell groups are modified, or from which SCell groups are released. Further, in order to configure a plurality of second SCell groups when dormant SCell group configuration information is configured in cell configuration information 1523 and 1530 of the cell group configuration information 1511 of the RRC message, a second SCell group list may be configured, and the second SCell group list may include second SCell group identifiers and, more specifically, may include lists to which SCell groups are added, in which SCell groups are modified, or from which SCell groups are released.

Third method: dormant SCell group configuration information may be configured along with cell configuration information 1523 and 1530 of cell group configuration information 1511 of the RRC message. The dormant SCell group configuration information may include a first SCell group set identifier for the first embodiment and include an identifier of a first SCell group belonging to a first SCell group set for the first embodiment, and may configure a first SCell identifier list included in the first SCell group. SCell identifiers included in the first SCell identifier list may be mapped to or included in the first SCell group (a group corresponding to a group identifier) of the first SCell group set. Furthermore, the dormant SCell group configuration information may include a second SCell group set identifier for the second embodiment and include an identifier of a second SCell group belonging to a second SCell group set for the second embodiment, and may configure a second SCell identifier list included in the second SCell group. SCell identifiers included in the second SCell identifier list may be mapped to or included in the second SCell group (a group corresponding to a group identifier) of the second SCell group set. A plurality of first SCell groups and a first SCell identifier list corresponding to each first SCell group may be configured in the first SCell group set of the dormant SCell group configuration information or a plurality of second SCell groups and a second SCell identifier list corresponding to each second SCell group may be configured in the second SCell group set. In another method, the dormant SCell group configuration information may include one of the first SCell group set identifier for the first embodiment and the second SCell group set identifier for the second embodiment and include a first SCell identifier list of the first SCell group belonging to the first SCell group set for the first embodiment or a second SCell identifier list of the second SCell group belonging to the second SCell group set for the second embodiment, and thus each SCell identifier may be mapped to or included in the SCell group of one of the first SCell group of the first SCell group set and the second SCell group of the second SCell group set. That is, one SCell identifier may be mapped to or included in only one SCell group among the first SCell group for the first embodiment and the second SCell group for the second embodiment or may be included in only one SCell group. The SCell identifier list may include lists to which SCell identifiers are added, in which SCell identifiers are modified, or from which SCell identifiers are released. In order to configure a plurality of first SCell groups when dormant SCell group configuration information is configured in cell configuration information 1523 and 1530 of the cell group configuration information 1511 of the RRC message, a first SCell group list may be configured, and the first SCell group list may include first SCell group identifiers and, more specifically, may include lists to which SCell groups are added, in which SCell groups are modified, or from which SCell groups are released. Further, in order to configure a plurality of second SCell groups when dormant SCell group configuration information is configured in cell configuration information 1523 and 1530 of the cell group configuration information 1511 of the RRC message, a second SCell group list may be configured, and the second SCell group list may include second SCell group identifiers and, more specifically, may include lists to which SCell groups are added, in which SCell groups are modified, or from which SCell groups are released.

Fourth method: dormant SCell group configuration information may be configured along with cell configuration information 1523 and 1530 of cell group configuration information 1511 of the RRC message. The dormant SCell group configuration information may include an identifier of a first SCell group belonging to a first SCell group set for the first embodiment and may configure a first SCell identifier list included in the first SCell group. SCell identifiers included in the first SCell identifier list may be mapped to or included in the first SCell group (a group corresponding to a group identifier) of the first SCell group set. Further, the dormant SCell group configuration information may include an identifier of a second SCell group belonging to a second SCell group for the second embodiment and may configure a second SCell identifier list included in the second SCell group. SCell identifiers included in the second SCell identifier list may be mapped to or included in the second SCell group (a group corresponding to a group identifier) of the second SCell group set. A plurality of first SCell groups and a first SCell identifier list corresponding to each first SCell group may be configured in the first SCell group set of the dormant SCell group configuration information or a plurality of second SCell groups and a second SCell identifier list corresponding to each second SCell group may be configured in the second SCell group set. In another method, the dormant SCell group configuration information may include a first SCell identifier list of first SCell groups belonging to a first SCell group set for the first embodiment or a second SCell identifier list of second SCell groups belonging to a second SCell group set for the second embodiment and may configure that each SCell identifier is mapped to or included in the SCell group of one SCell group set among the first SCell group of the first SCell group set and the second SCell group of the second SCell group set. That is, one SCell identifier may be mapped to or included in only one SCell group among the first SCell group for the first embodiment and the second SCell group for the second embodiment or may be included in only one SCell group. The SCell identifier list may include lists to which SCell identifiers are added, in which SCell identifiers are modified, or from which SCell identifiers are released. In order to configure a plurality of first SCell groups when dormant SCell group configuration information is configured in cell configuration information 1523 and 1530 of the cell group configuration information 1511 of the RRC message, a first SCell group list may be configured, and the first SCell group list may include first SCell group identifiers and, more specifically, may include lists to which SCell groups are added, in which SCell groups are modified, or from which SCell groups are released. Further, in order to configure a plurality of second SCell groups when dormant SCell group configuration information is configured in cell configuration information 1523 and 1530 of the cell group configuration information 1511 of the RRC message, a second SCell group list may be configured, and the second SCell group list may include second SCell group identifiers and, more specifically, may include lists to which SCell groups are added, in which SCell groups are modified, or from which SCell groups are released.

The proposed methods may be applied by including the configuration information proposed by the first method, the second method, the third method, or the fourth method in the MAC layer device configuration information 1521, the PHY layer device configuration information 1521, or the bearer configuration information 1510.

Figure 16:
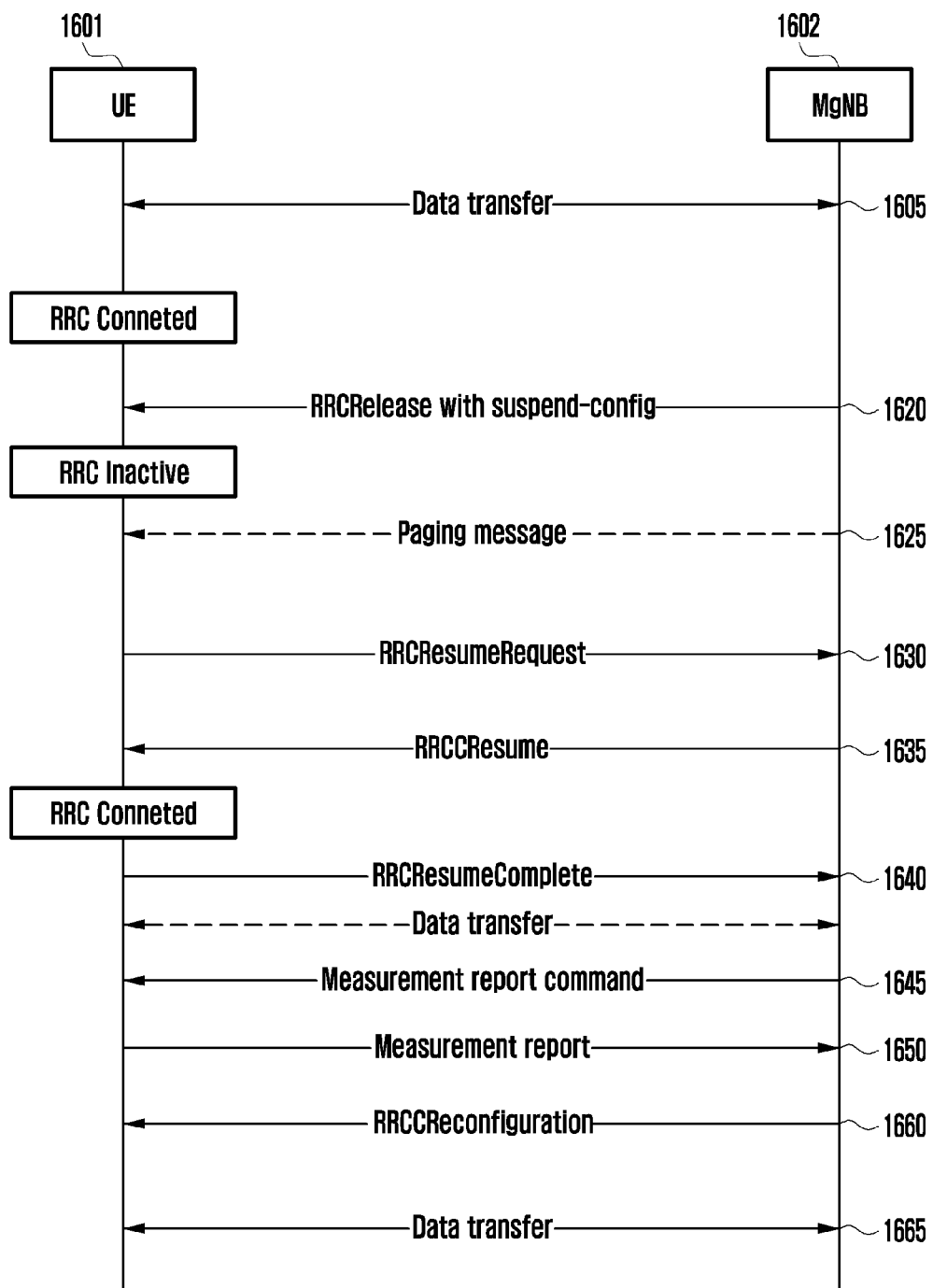
FIG. 16 illustrates a fifth embodiment in which the first embodiment, the second embodiment, the third embodiment, or the fourth embodiment proposed in the disclosure is expanded and applied to a UE in an RRC-inactive mode.

FIG. 16 illustrates a fifth embodiment in which the first embodiment, the second embodiment, the third embodiment, or the fourth embodiment proposed in the disclosure is expanded and applied to a UE in an RRC-inactive mode.

The fifth embodiment proposes continuous storage of SCell configuration information (for example, configuration information described or proposed in FIG. 15) configured or stored for the first embodiment, the second embodiment, the third embodiment, or the fourth embodiment in the RRC-connected mode without releasing or discarding the Scell configuration information as illustrated in FIG. 6 even though the UE transitions to the RRC-inactive mode. Further, when performing an RRC connection resume procedure, the UE in the RRC-inactive mode proposes determining whether to discard, release, maintain and apply, or reconfigure the stored SCell configuration information (for example, configuration information described or proposed in FIG. 15) through an indicator of an RRCResume message or an RRCReconfiguration message transmitted by the gNB or through a reconfiguration procedure. When transmitting an RRCRelease message including a configuration or an indicator indicating transition to the RRC-inactive mode to the UE, the gNB may also transmit an indicator or configuration information indicating whether to discard, release, maintain and apply, or reconfigure the SCell configuration information (for example, configuration information described or proposed in FIG. 15) stored in the RRCRelease message to the UE. When updating an RAN notification area (RNA) while moving in the RRC-inactive mode, the UE may receive and apply an indicator or configuration information indicating whether to discard, release, maintain and apply, or reconfigure the SCell configuration information (for example, configuration information described or proposed in FIG. 15) stored in the RRCRelease message transmitted from the gNB to the UE.

In the fifth embodiment proposed in the disclosure, the gNB may allow configuration of the first active BWP of downlink or uplink BWP configuration information of each cell as the dormant BWP in the SCell configuration information (for example, configuration information described or proposed in FIG. 15) of the RRC message and thus the UE may operate the downlink BWP or the uplink BWP of each SCell as the dormant BWP when the UE activates each SCell, so that battery consumption of the UE can be reduced.

In another method, in the fifth embodiment proposed in the disclosure, the gNB may not allow configuration of the first active BWP of BWP configuration information of the downlink or uplink of each cell as the dormant BWP in SCell configuration information (for example, configuration information described or proposed in FIG. 15) of the RRC message to activate the downlink BWP or the uplink BWP of each SCell as the first active BWP when the UE activates each SCell and switch the same to the dormant BWP or activate the same by the first embodiment, the second embodiment, the third embodiment, or the fourth embodiment proposed in the disclosure, thereby reducing battery consumption of the UE.

Further, the fifth embodiment proposed above may expansively applied to configuration information of each SCell of a master cell group (MCG) or a secondary cell group (SCG) of the UE in which the dual connectivity is configured. That is, SCell configuration information of the SCG may be stored when the UE transitions to the RRC-inactive mode, and an indicator or configuration information indicating whether to discard, release, maintain and apply, or reconfigure the stored SCell configuration information of the MCG or the SCG (for example, configuration information described or proposed in FIG. 15) may be transmitted to the UE through the RRC message (for example, RRCResume, RRCReconfiguration, or RRCRelease) when the RRC connection resume procedure is performed or when the UE transitions to the RRC-inactive mode.

In FIG. 16, a UE 1601 may make a network connection with an gNB 1602 and transmit and receive data in step 1605. If the gNB needs to transition the UE to the RRC-inactive mode for a predetermined reason, the gNB may transmit an RRCRelease message 1620 to transition the UE to the RRC-inactive mode. The indicator or configuration information indicating whether to discard, release, maintain and apply, or reconfigure the stored SCell configuration information of the MCG or the SCG (for example, configuration information described or proposed in FIG. 15) may be transmitted to the UE through the RRC message (for example, RRCRelease). In the case of the UE applying the dual connectivity, the gNB may determine whether to stop or resume master cell group bearer configuration, RRC configuration information, or SCell configuration information of the MCG or the SCG and ask the secondary cell gNB about whether to stop or resume the secondary cell group bearer configuration and the RRC configuration information and receive a response to determine the same in step 1615. Further, the gNB may configure a list of frequencies which the UE measures in the RRC-idle mode or the RRC-inactive mode, frequency measurement configuration information, or a period during which the frequency is measured in the RRCRelease message.

When the UE in the RRC-inactive mode receives a paging message during movement in step 1625, has a need to transmit uplink data, or has a need to update a RAN notification area, the UE may perform the RRC connection resume procedure.

When the UE needs to configure the connection, the UE performs a random access procedure, and when an RRCResumeRequest message is transmitted to the gNB, a proposed UE operation related to transmission of the message is described below in step 1630.

1. The UE identifies system information and, when the system information indicates transmission of a complete UE connection resume identifier (I-RNTI or a full resume ID), prepares transmission by inserting the stored complete UE connection resume identifier (I-RNTI) into the message. If the system information indicates transmission of a truncated UE connection resume identifier (truncated I-RNTI or a truncated resume ID), the UE configures the stored complete UE connection resume identifier (I-RNTI) as the truncated UE connection resume identifier (truncated resume ID) through a predetermined method and prepares transmission by inserting the configured truncated UE connection resume identifier into the message.

2. The UE restores RRC connection configuration information and security context information from stored UE context.

3. The UE updates a new KgNB security key corresponding to a master cell group on the basis of a current KgNB security key, a NextHop (NH) value, and an NCC value received and stored in the RRCRelease message.

4. Upon receiving an SCG-counter value (or sk-counter) in the RRCRelease message, the UE updates a new SKgNB security key corresponding to a secondary cell group on the basis of the KgNB security key and the SCG-counter value (or sk-counter).

5. The UE induces new security keys (K_RRCenc, K_RRC_int, K_UPint, and K_UPenc) to be used in an integrity protection and verification procedure and an encryption and decryption procedure using the newly updated KgNB security key.

6. Upon receiving the SCG-counter value (or sk-counter) in the RRCRelease message, the UE induces new security keys (K_RRCenc, K_RRC_int, K_UPint, and K_UPenc) to be used in an integrity protection and verification procedure and an encryption and decryption procedure using the newly updated SKgNB security key corresponding to the secondary cell group.

7. The UE prepares transmission by calculating a MAC-I and inserting the same into the message.

8. The UE resumes SRB1 (The UE should resume in advance since the UE will receive an RRCResume message through SRB1 in response to an RRCResumeRequest message to be transmitted).

9. The UE configures the RRCResumeRequest message and transmits the same to a lower layer device.

10. The UE resumes the integrity protection and verification procedure by applying the updated security keys and a previously configured algorithm to all bearers (MCG terminated RBs) except for SRB0 and then apply integrity verification and protection to transmitted and received data (This is to increase reliability and security of data thereafter transmitted and received from SRB1 or DRBs).

11. The UE resumes the encryption and description procedure by applying the updated security keys and a previously configured algorithm to all bearers (MCG terminated RBs) except for SRB0 and then apply encryption and decryption to transmitted and received data (This is to increase reliability and security of data thereafter transmitted and received from SRB1 or DRBs).

12. Upon receiving the SCG-counter value (or sk-counter) in the RRCRelease message, the UE resumes the integrity protection and verification procedure by applying the updated security keys and a previously configured algorithm to all bearers (SCG terminated RBs) corresponding to the secondary cell group and then apply integrity verification and protection to transmitted and received data (This is to increase reliability and security of data thereafter transmitted and received from SRB1 or DRBs).

13. Upon receiving the SCG-counter value (or sk-counter) in the RRCRelease message, the UE resumes the encryption and decryption procedure by applying the updated security keys and a previously configured algorithm to all bearers (SCG terminated RBs) corresponding to the secondary cell group and then apply encryption and decryption to transmitted and received data (This is to increase reliability and security of data thereafter transmitted and received from SRB1 or DRBs).

The UE operation proposed when the UE has a need to configure the connection, performs a random access procedure, transmits an RRCResumeRequest message to the gNB, and receives an RRCResume message in response thereto is described below in step 1635. If the RRCResume message includes an indicator indicating a report on an effective frequency measurement result measured in the RRC-inactive mode to the UE, the UE may configure the frequency measurement result in an RRCResumeComplete message and report the same. Further, the gNB may insert an indicator or configuration information indicating whether to discard, release, maintain and apply, or reconfigure SCell configuration information of the MCG or SCG} (for example, configuration information described or proposed in FIG. 15) stored in the UE into the RRC message (for example, RRCResume) and transmit the same to the UE.

1. Upon receiving the message, the UE restores a PDCP state corresponding to the master cell group, resets a count value, and reestablishes PDCP layer devices of SRB2 corresponding to the master cell group and all DRBs (MCG terminated RBs).

2. Upon receiving the SCG-counter value (or sk-counter) in the message, the UE updates a new SKgNB security key corresponding to the secondary cell group on the basis of the KgNB security key and the SCG-counter value (or sk-counter). Further, the UE induces new security keys (K_RRCenc, K_RRC_int, K_UPint, and K_UPenc) to be used in an integrity protection and verification procedure and an encryption and decryption procedure using the newly updated KgNB security key corresponding to the second cell group.

3. If the message includes master cell group (masterCellGroup) configuration information,
   A. The master cell group configuration information included in the message is executed and applied. The master cell group information may contain configuration information of RLC layer devices belonging to the master cell group, a logical channel identifier, and a bearer identifier.

4. If the message includes bearer configuration information (radioBearerConfig),
   A. The bearer configuration information (radioBearerConfig) included in the message is executed and applied. The bearer configuration information (radioBearerConfig) may contain configuration information of PDCP layer devices for respective bearers, configuration information of SDAP layer devices, a logical channel identifier, and a bearer identifier.

5. If the message includes secondary cell group (secondaryCellGroup) configuration information,
   A. The secondary cell group configuration information included in the message is executed and applied. The secondary cell group information may contain configuration information of RLC layer devices belonging to the second cell group, a logical channel identifier, and a bearer identifier.

6. If the message includes secondary bearer configuration information (radioBearerConfig),
   A. The secondary bearer configuration information (radioBearerConfig) included in the message is executed and applied. The secondary bearer configuration information (radioBearerConfig) may contain configuration information of PDCP layer devices for respective secondary bearers, configuration information of SDAP layer devices, a logical channel identifier, and a bearer identifier.

7. The UE resumes SRB2 corresponding to the master cell group and all DRBs (MCG terminated RBs).

8. If the message includes frequency measurement configuration information (measConfig),
   A. The frequency measurement configuration information included in the message is executed and applied. That is, the frequency measurement may be performed according to the configuration.

9. The UE transitions to the RRC-connected mode.

10. The UE indicates resume of the RRC connection, which has been suspended, to a higher layer device.

11. The UE configures an RRCResumeComplete message and transmits the same to a lower layer device in step 1640.

When the UE has bearer configuration information and UE text information for the suspended secondary cell group, the UE may perform frequency measurement on the basis of frequency configuration information configured in system information, the RRCRelease message, or the RRCResume message and, when there is an effective result, insert an indicator indicating the result into the RRCResumeComplete message, and transmit the same. Upon receiving the indicator, the gNB instructs the UE to report the frequency measurement result in step 1645 when resume of the carrier aggregation or the dual connectivity is needed and may receive a report on the frequency measurement result or receive the report on the frequency measurement result through the RRCResumeComplete message in step 1650. Upon receiving the frequency measurement result, the gNB may ask the secondary cell gNB about whether to resume bearer information for the suspended secondary cell group, receive a response thereto, determine whether to resume, transmit an RRCReconfiguration message to the UE, and indicate whether to resume or release bearers for the second cell group. Further, the gNB may insert an indicator or configuration information indicating whether to discard, release, maintain and apply, or reconfigure SCell configuration information of the MCG or SCG (for example, configuration information described or proposed in FIG. 15) stored in the UE into the RRC message (for example, RRCReconfiguration) and transmit the same to the UE.

In the fifth embodiment proposed in FIG. 16 of the disclosure, the gNB may allow to configure the first active BWP in downlink BWP or uplink BWP configuration information of each cell as the dormant BWP in the SCell configuration information (for example, configuration information described or proposed in FIG. 15) of the RRC message (for example, RRCRelease, RRCResume, or RRCReconfiguration) and thus the UE may operate the downlink BWP or the uplink BWP of each SCell as the dormant BWP when the UE activates each SCell, so that battery consumption of the UE can be reduced. For example, when the SCell state is configured as an activated state in the SCell configuration information of the RRC message (for example, RRCRelease, RRCResume, or RRCReconfiguration) or an indication indicating activation of the SCell is received through the MAC control information proposed in the disclosure, the SCell may be activated and the downlink BWP or the uplink BWP of the SCell may be activated as the dormant BWP when the SCell is activated, thereby saving the battery of the UE. In another method, in the fifth embodiment proposed in the disclosure, the gNB may not allow configuration of the first active BWP of BWP configuration information of the downlink or uplink of each cell as the dormant BWP in SCell configuration information (for example, configuration information described or proposed in FIG. 15) of the RRC message to activate the downlink BWP or the uplink BWP of each SCell as the first active BWP when the UE activates each SCell and switch the same to the dormant BWP or activate the same by the first embodiment, the second embodiment, the third embodiment, or the fourth embodiment proposed in the disclosure, thereby reducing battery consumption of the UE.

When the UE in the RRC-inactive mode transitions to the RRC-connected mode and the SCell configuration information proposed in the disclosure is restored, applied, or reconfigured, BWPs may be switched, activated, or the dormant BWP may be activated or applied for each activated SCell according to the first embodiment, the second embodiment, the third embodiment, or the fourth embodiment proposed in the disclosure. Further, the firth embodiment may be expanded and applied when a handover is performed.

An embodiment of a detailed operation related to a BWP of a MAC layer device and a BWP inactivity timer according to the first embodiment, the second embodiment, or the third embodiment of the disclosure is described below, and the BWP inactivity timer starts or restarts only when a default BWP is configured and a BWP instructed to be BWP-switched is not a dormant BWP or not the default BWP or when the default BWP is not configured and a BWP instructed to be BWP-switched is not the dormant BWP or not an initial BWP.

If the MAC layer device receives an indication of a PDCCH for BWP switching of a serving cell (PCell, PSCell, or SCell), the MAC layer device operates with respect to a serving cell in which a BWP inactivity timer is configured as follows.

1> If the PDCCH for the BWP switching indication is received and the MAC layer device switches the downlink active BWP according to the indication,
2> If a downlink default BWP identifier (defaultDownlinkBWP-Id) is configured and the MAC layer device switches to a BWP which is not instructed by the downlink default BWP identifier or a downlink dormant BWP,
2> If a downlink default BWP identifier (defaultDownlinkBWP-Id) is not configured and the MAC layer device switches to a BWP which is not a downlink initial BWP or a downlink dormant BWP,
3> A BWP inactivity timer (bwp-InactivityTimer) for the downlink active BWP starts or restarts.

Another embodiment of a detailed operation related to a BWP of a MAC layer device and a BWP inactivity timer according to the first embodiment, the second embodiment, or the third embodiment of the disclosure is described below, and the BWP inactivity timer starts or restarts only when the switched and activated BWP is not the dormant BWP.

If the MAC layer device receives an indication of a PDCCH for BWP switching of a serving cell (PCell, PSCell, or SCell), the MAC layer device operates with respect to a serving cell in which a BWP inactivity timer is configured as follows.

1> If the PDCCH for the BWP switching indication is received and the MAC layer device switches the downlink active BWP according to the indication,
2> If a downlink default BWP identifier (defaultDownlinkBWP-Id) is configured and the MAC layer device switches to a BWP which is not instructed by the downlink default identifier,
2> If a downlink default BWP identifier (defaultDownlinkBWP-Id) is not configured and the MAC layer device switches to a BWP which is not a downlink initial BWP,
3> If the switched and activated downlink BWP is not the dormant BWP or not the BWP instructed by the dormant BWP identifier,
4> A BWP inactivity timer (bwp-InactivityTimer) for the downlink active BWP starts or restarts.

Another embodiment of a detailed operation related to a detailed operation related to an uplink BWP when a downlink BWP of a MAC layer device is switched to a dormant BWP according to the first embodiment, the second embodiment, or the third embodiment of the disclosure is described below, and an active uplink BWP is deactivated or hibernated when a downlink BWP is switched to a dormant BWP. This is because the PDCCH is not monitored and data transmission/reception is not performed in the dormant BWP and thus the uplink BWP is not used.

If the MAC layer device receives the indication of the PDCCH for BWP switching of the serving cell (PCell, PSCell, or SCell), 1> If there is no random access procedure which is being performed by the serving cell,
1> Alternatively, if a random access procedure which is being performed by the serving cell is successfully completed when the PDCCH indicated by the C-RNTI is received,
2> The UE switches to a BWP indicated by the PDCCH by switching the current BWP of the serving cell.
2> If the BWP indicated by the PDCCH is a downlink BWP having the same BWP identifier as a downlink dormant BWP identifier or if the switched and activated BWP is a downlink dormant BWP,
   3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.
   3> If a BWP activation timer related to the active downlink BWP is being driven in the current serving cell, the BWP activation timer is stopped. This is to prevent activation of the default BWP through automatic switching of the dormant BWP to the default BWP (battery consumption due to PDCCH monitoring). If the default BWP is configured as the dormant BWP, the above problem may be prevented.
   3> In another method, if a cell deactivation timer is being driven, the cell deactivation timer may be stopped. The operation is applied to prevent cell deactivation of the dormant BWP due to expiration of the cell timer and automatic deactivation of the dormant BWP.

Another embodiment of a detailed operation related to an uplink BWP when a downlink BWP of the MAC device is a dormant BWP but the downlink BWP is switched to a normal BWP instead of the dormant BWP according to the first embodiment, the second embodiment, or the third embodiment is described below, and the uplink BWP is switched to a first active BWP and activated when the downlink BWP is switched from the dormant BWP to the normal BWP.

If the MAC layer device receives the indication of the PDCCH for BWP switching of the serving cell (PCell, PSCell, or SCell),
   1> If there is no random access procedure which is being performed by the serving cell,
   1> Alternatively, if a random access procedure which is being performed by the serving cell is successfully completed when the PDCCH indicated by the C-RNTI is received,
   2> The UE switches to a BWP indicated by the PDCCH by switching the current BWP of the serving cell.
   2> If the BWP indicated by the PDCCH is a downlink BWP having the same BWP identifier as a downlink dormant BWP identifier or if the switched and activated BWP is a downlink dormant BWP,
      3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.
      3> If a BWP activation timer related to the active downlink BWP is being driven in the current serving cell, the BWP activation timer is stopped. This is to prevent activation of the default BWP through automatic switching of the dormant BWP to the default BWP (battery consumption due to PDCCH monitoring). If the default BWP is configured as the dormant BWP, the above problem may be prevented.
      3> In another method, if a cell deactivation timer is being driven, the cell deactivation timer may be stopped. The operation is applied to prevent cell deactivation of the dormant BWP due to expiration of the cell timer and automatic deactivation of the dormant BWP.
   2> If the active downlink BWP (for example, previous downlink BWP) is a dormant BWP or is a BWP indicated by a dormant BWP identifier,
   2> If a BWP indicated by the PDCCH is a BWP having a BWP identifier which is not the same as the dormant BWP identifier or if the switched and activated downlink BWP according to the indication of the PDCCH is not the dormant BWP,
      3> The uplink BWP of the current serving cell is activated to an uplink BWP indicated by a first active BWP identifier or a first active BWP.

Another embodiment of a detailed operation related to an uplink BWP when a downlink BWP of the MAC device is a dormant BWP but the downlink BWP is switched to a normal BWP instead of the dormant BWP according to the first embodiment, the second embodiment, or the third embodiment is described below, and the uplink BWP is switched to an uplink BWP having the same BWP identifier as a BWP identifier indicated by the PDCCH and activated when the downlink BWP is switched from the dormant BWP to the normal BWP.

If the MAC layer device receives the indication of the PDCCH for BWP switching of the serving cell (PCell, PSCell, or SCell), 1> If there is no random access procedure which is being performed by the serving cell,
1> Alternatively, if a random access procedure which is being performed by the serving cell is successfully completed when the PDCCH indicated by the C-RNTI is received,
2> The UE switches to a BWP indicated by the PDCCH by switching the current BWP of the serving cell.
2> If the BWP indicated by the PDCCH is a downlink BWP having the same BWP identifier as a downlink dormant BWP identifier or if the switched and activated BWP is a downlink dormant BWP,
3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.
3> If a BWP activation timer related to the active downlink BWP is being driven in the current serving cell, the BWP activation timer is stopped. This is to prevent activation of the default BWP through automatic switching of the dormant BWP to the default BWP (battery consumption due to PDCCH monitoring). If the default BWP is configured as the dormant BWP, the above problem may be prevented.
3> In another method, if a cell deactivation timer is being driven, the cell deactivation timer may be stopped. The operation is applied to prevent cell deactivation of the dormant BWP due to expiration of the cell timer and automatic deactivation of the dormant BWP.
2> If the active downlink BWP (for example, previous downlink BWP) is a dormant BWP or is a BWP indicated by a dormant BWP identifier,
2> If a BWP indicated by the PDCCH is a BWP having a BWP identifier which is not the same as the dormant BWP identifier or if the switched and activated downlink BWP according to the indication of the PDCCH is not the dormant BWP,
3> The uplink BWP of the current serving cell is activated to an uplink BWP having the same BWP identifier as a BWP identifier indicated by the PDCCH or an uplink BWP having the same BWP identifier as a BWP identifier of the current downlink BWP.

Another embodiment of a detailed operation related to an uplink BWP when a downlink BWP of the MAC device is a dormant BWP but the downlink BWP is switched to a normal BWP instead of the dormant BWP according to the first embodiment, the second embodiment, or the third embodiment is described below, and the uplink BWP is switched and activated to an uplink BWP activated when a previous downlink BWP is switched to the dormant BWP or a last activated uplink BWP if the downlink BWP is switched from the dormant BWP to the normal BWP.

If the MAC layer device receives the indication of the PDCCH for BWP switching of the serving cell (PCell, PSCell, or SCell),
1> If there is no random access procedure which is being performed by the serving cell,
1> Alternatively, if a random access procedure which is being performed by the serving cell is successfully completed when the PDCCH indicated by the C-RNTI is received,
2> the UE switches to a BWP indicated by the PDCCH by switching the current BWP of the serving cell.
2> If the BWP indicated by the PDCCH is a downlink BWP having the same BWP identifier as a downlink dormant BWP identifier or if the switched and activated BWP is a downlink dormant BWP,
3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.
3> If a BWP activation timer related to the active downlink BWP is being driven in the current serving cell, the BWP activation timer is stopped. This is to prevent activation of the default BWP through automatic switching of the dormant BWP to the default BWP (battery consumption due to PDCCH monitoring). If the default BWP is configured as the dormant BWP, the above problem may be prevented.
3> In another method, if a cell deactivation timer is being driven, the cell deactivation timer may be stopped. The operation is applied to prevent cell deactivation of the dormant BWP due to expiration of the cell timer and automatic deactivation of the dormant BWP.
2> If the active downlink BWP (for example, previous downlink BWP) is a dormant BWP or is a BWP indicated by a dormant BWP identifier,
2> If a BWP indicated by the PDCCH is a BWP having a BWP identifier which is not the same as the dormant BWP identifier or if the switched and activated downlink BWP according to the indication of the PDCCH is not the dormant BWP,
3> The uplink BWP of the current serving cell is activated to an uplink BWP activated when a previous downlink BWP is switched to the dormant BWP or a last activated uplink BWP.

Another embodiment of a detailed operation according to a cell state (activated state or deactivated state) of the MAC layer device according to the first embodiment, the second embodiment, or the third embodiment of the disclosure is described below.

If an indication indicating deactivation of a serving cell (PCell or SCell) is received through a MAC CE or an RRC message or if a cell deactivation timer has been configured and has expired, one or a plurality of following operations may be performed.

A downlink or uplink BWP is deactivated or hibernated.

A cell deactivation timer configured or driven for the cell or BWP is stopped.

If a BWP inactivity timer configured for the BWP of the cell is being driven, the BWP inactivity timer is stopped. This is to prevent an unnecessary BWP switching procedure in the cell.

Periodic downlink transmission resources (DL SPS or configured downlink assignment) or periodic uplink transmission resources (UL SPS or configured uplink grant Type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the activated state to the dormant state. This is because there is no information on periodic transmission resources activated or indicated through L1 signaling when the BWP transitions from the deactivated state to the dormant state. In another method, the periodic transmission resources may be released only when the periodic downlink transmission resources or the periodic uplink transmission resources are configured or when the transmission resources are configured and used.

The periodic uplink transmission resources (configured uplink grant Type 1 configured through RRC) configured in the BWP of the cell may be suspended. The term "suspend" means that transmission resource configuration information configured through the RRC message is stored in the UE but is not used anymore. The proposed method, that is, the operation of suspending the periodic uplink transmission resources (configured uplink grant Type 1), may be performed only when the BWP transitions from the activated state to the dormant state. This is because periodic transmission resources are not used when the BWP transitions from the deactivated state to the dormant state. In another method, the periodic transmission resources may be released only when the periodic downlink transmission resources or the periodic uplink transmission resources are configured or when the transmission resources are configured and used.

An HARQ buffer configured in the uplink or downlink BWP is all emptied.

The UE does not transmit an SRS to the uplink BWP of the cell.

The UE does not transmit uplink data through a UL-SCH in the BWP of the cell.

The UE does not perform a random access procedure for the BWP of the cell.

The UE does not monitor a PDCCH in the BWP of the cell.

The UE does not monitor a PDCCH for the BWP of the cell. However, in the case of cross-scheduling, if the dormant BWP is configured in the cell, the scheduled cell (for example, PCell) may receive an indication through monitoring of a PDCCH for the cell (for example, SCell).

No PUCCH or SPUCCH transmission is performed in the BWP of the cell.

If an indication indicating activation of a BWP (for example, a downlink BWP) of the current cell (PCell or SCell) or activation of the cell is received through DCI (L1 control signal) of a PDCCH, a MAC CE, or an RRC message or if an indication indicating switching of a dormant BWP (for example, a downlink BWP) to an active BWP (or a BWP other than the dormant BWP) is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of following operations may be performed.

If the current downlink BWP of the serving cell is not the dormant BWP or if the serving cell was previously in a deactivated state and is activated by the indication of the MAC CE, the uplink or downlink BWP is switched to a predetermined BWP (for example, an uplink or uplink first active BWP) and the BWP is activated.

If the current downlink BWP of the serving cell is not the dormant BWP or if the serving cell was previously in a deactivated state and is activated by the indication of the MAC CE, a sounding reference signal (SRS) is transmitted to enable the gNB to perform channel measurement for the uplink in the activated BWP. For example, the SRS may be periodically transmitted.

If the current downlink BWP of the serving cell is not the dormant BWP or if the serving cell was previously in a deactivated state and is activated by the indication of the MAC CE, a PUCCH is transmitted if the PUCCH is configured in the activated BWP.

If the current downlink BWP of the serving cell is not the dormant BWP or if the serving cell was previously in a deactivated state and is activated by the indication of the MAC CE, a BWP inactivity timer or cell deactivation timer starts or restarts. In another method, the BWP inactivity timer or cell deactivation timer may start or restart only when a BWP or cell hibernation timer is not configured. If the BWP or cell hibernation timer can be configured through the RRC message, the BWP or the cell may be hibernated when the timer expires. For example, the BWP inactivity timer or cell deactivation timer may start or restart only in the hibernated BWP or cell.

If the current downlink BWP of the serving cell is not the dormant BWP or if the serving cell was previously in a deactivated state and is activated by the indication of the MAC CE, stored type 1 transmission resources may be initialized as original and used when there are type 1 configuration transmission resources of which the use is suspended. The type 1 configuration transmission resources are periodic (uplink or downlink) transmission resources pre-allocated through an RRC message, which can be used after being activated through the RRC message.

If the current downlink BWP of the serving cell is not the dormant BWP or if the serving cell was previously in a deactivated state and is activated by the indication of the MAC CE, a PHR for the BWP is triggered.

The UE may report a channel measurement result (CSI, CQI, PMI, RI, PTI, or CRI) for the downlink in the activated BWP according to a configuration of the gNB.

If the current downlink BWP of the serving cell is not the dormant BWP or if the serving cell was previously in a deactivated state and is activated by the indication of the MAC CE, a PDCCH is monitored to read an indication of the gNB in the activated BWP.

If the current downlink BWP of the serving cell is not the dormant BWP or if the serving cell was previously in a deactivated state and is activated by the indication of the MAC CE, a PDCCH is monitored to read cross-scheduling for the activated BWP.

If the current downlink BWP of the serving cell is not the dormant BWP or if the serving cell was previously in a deactivated state and is activated by the indication of the MAC CE, the BWP inactivity timer starts or restarts. In another method, the BWP inactivity timer may start or restart only when a BWP hibernation timer is not configured. If the BWP hibernation timer can be configured through the RRC message, the BWP may be hibernated or switched to a dormant BWP when the timer expires. For example, the BWP inactivity timer may start or restart only in the dormant BWP.

If the current downlink BWP of the serving cell is not the dormant BWP or if the serving cell was previously in a deactivated state and is activated by the indication of the MAC CE, and if a link BWP hibernation timer is configured for the BWP, The BWP hibernation timer starts or restarts for the BWP.

Further, in the embodiment of the disclosure, when the gNB triggers a random access procedure for the SCell, the gNB does not indicate BWP switching of the downlink BWP to the dormant BWP. This is because the uplink BWP is deactivated when switching to the downlink dormant BWP is performed and thus the random access procedure cannot be successfully performed.

The operation related to switching of the normal BWP (for example, a BWP other than the dormant BWP) or the dormant BWP is performed when the cell (for example, SCell) operating the BWP is in an activated state in the embodiment. Accordingly, when MAC control information (MAC control element (MAC CE)) including an indication indicating activation or deactivation of the cell is received, the indication may be ignored if the cell operates a downlink dormant BWP and receives the MAC CE including the indication indicating activation of the cell, and the downlink dormant BWP of the cell is deactivated if the cell operates the downlink dormant BWP and receives the MAC CE including the indication indicating deactivation of the cell. In another method, in the embodiment of the disclosure, a cell deactivation timer is being driven when a downlink BWP is switched to a dormant BWP, the cell deactivation timer is stopped. The operation is applied to prevent cell deactivation of the dormant BWP due to expiration of the cell timer and automatic deactivation of the dormant BWP.

In the disclosure, a fourth embodiment of performing the state transition in units of BWPs and the operation according thereto is described below.

In the fourth embodiment of the disclosure, a dormant BWP is configured by an indicator or a BWP identifier when a plurality of BWPs are configured in the UE for each cell through the RRC message as illustrated in FIG. 6. When the gNB transmits the MAC CE including the indication indicating deactivation of a specific cell to the UE and a dormant BWP is configured in the cell, the UE deactivates the specific cell and perform switching to the dormant BWP according to the indication of the MAC CE. The UE monitors no PDCCH and perform no data transmission/reception in the dormant BWP of the specific cell, but may reduce UE battery consumption and enable rapid BWP activation by reporting channel measurement. When there is a need to transmit and receive data for the inactive cell switched to the dormant BWP, the gNB may transmit the MAC CE including an indication indicating activation of a specific cell to the UE. When the UE receive the MAC CE, the UE may activate the specific cell, and switch the specific cell to a first active BWP and activate the same. The UE may monitor the PDCCH and start data transmission/reception again in the switched BWP. However, in the fourth embodiment of the disclosure, when deactivation of a specific cell is indicated through the RRC message, all BWPs are deactivated even though the dormant BWP is configured in the specific cell. When the UE receives the MAC including the indication indicating deactivation of the deactivated cell through the RRC message and the dormant BWP is configured in the cell, the UE may activate the dormant BWP, perform an operation in the dormant BWP, and start a channel measurement report.

In the fourth embodiment of the disclosure, the dormant BWP is operated or used by the cell in the deactivated state. Further, in the fourth embodiment of the disclosure, switching of the BWP to the dormant BWP indicates switching of the downlink BWP. This is because the operation of not monitoring the PDCCH and the operation of reporting the channel measurement are operations for the downlink BWP of the cell by the UE.

In the fourth embodiment of the disclosure, for the state of the cell (for example, SCell), the activated state or the deactivated state is maintained and operated and the state transition between states is supported. For the state of the BWP, the activated state, the dormant state, or the deactivated state is maintained and operated and the state transition between BWPs or switching between BWPs is performed according to the cell state.

An embodiment of the detailed operation according to the cell state (activated state or deactivated state) of the MAC layer device according to the fourth embodiment of the disclosure is described below.

If the UE receives an indication of the operation as the dormant BWP for the serving cell (PCell or SCell), if the UE receives an indication indicating deactivation of the cell through a MAC CE or an RRC message, if the UE receives an indication indicating switching of a BWP (for example, a downlink BWP) to a dormant BWP through DCI of a PDCCH (L1 control signal), a MAC CE, or an RRC message, or if a cell deactivation timer was configured and has expired, one or a plurality of following operations may be performed.

If the dormant BWP is configured in the serving cell, the downlink BWP is switched to a BWP indicated by a dormant BWP identifier. Alternatively, the BWP is hibernated.

An uplink BWP is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

A cell deactivation timer configured or driven for the cell or BWP is stopped.

If a BWP inactivity timer configured for the BWP of the cell is being driven, the BWP inactivity timer is stopped. This is to prevent an unnecessary BWP switching procedure in the cell.

Periodic downlink transmission resources (DL SPS or configured downlink assignment) or periodic uplink transmission resources (UL SPS or configured uplink grant Type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the activated state to the dormant state. This is because there is no information on periodic transmission resources activated or indicated through L1 signaling when the BWP transitions from the deactivated state to the dormant state. In another method, the periodic transmission resources may be released only when the periodic downlink transmission resources or the periodic uplink transmission resources are configured or when the transmission resources are configured and used.

The periodic uplink transmission resources (configured uplink grant Type 1 configured through RRC) configured in the BWP of the cell may be suspended. The term "suspend" means that transmission resource configuration information configured through the RRC message is stored in the UE but is not used anymore. The proposed method, that is, the operation of suspending the periodic uplink transmission resources (configured uplink grant Type 1), may be performed only when the BWP transitions from the activated state to the dormant state. This is because periodic transmission resources are not used when the BWP transitions from the deactivated state to the dormant state. In another method, the periodic transmission resources may be released only when the periodic downlink transmission resources or the periodic uplink transmission resources are configured or when the transmission resources are configured and used.

An HARQ buffer configured in the uplink or downlink BWP is all emptied.

The UE does not transmit an SRS to the uplink BWP of the cell.

If the dormant BWP is configured in the cell, the UE measures a channel (CSI, CQI, PMI, RI, PTI, or CRI) for the downlink in the BWP according to the configuration of the gNB and reports the measurement. For example, the UE may periodically report the channel or frequency measurement.

The UE does not transmit uplink data through a UL-SCH in the BWP of the cell.

The UE does not perform a random access procedure for the BWP of the cell.

The UE does not monitor a PDCCH in the BWP of the cell.

The UE does not monitor a PDCCH for the BWP of the cell. However, in the case of cross-scheduling, if the dormant BWP is configured in the cell, the scheduled cell (for example, PCell) may receive an indication through monitoring of a PDCCH for the cell (for example, SCell).

No PUCCH or SPUCCH transmission is performed in the BWP of the cell.

If the dormant BWP is configured in the cell, the downlink BWP may be hibernated, and a channel measurement may be performed and reported. Further, an uplink BWP of the cell may be deactivated and not used. This is because the channel is measured only for the downlink BWP in the dormant-state Scell and the measurement result is reported to the uplink BWP of the Spcell (Pcell or Pscell) or the Scell in which there is a PUCCH.

The UE operation for the active BWP (active BWP or active Band Width Part) according to the disclosure is described below.

If an indication indicating activation of a BWP (for example, a downlink BWP) of the current cell (PCell or SCell) or activation of the cell is received through DCI (L1 control signal) of a PDCCH, a MAC CE, or an RRC message or if an indication indicating switching of a BWP (for example, a downlink BWP) to an active BWP (or a BWP other than the dormant BWP) is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed.

The BWP is switched to the indicated uplink or downlink BWP or activated. Alternatively, the uplink or downlink BWP is switched to a predetermined BWP (for example, an uplink or uplink first active BWP), and the BWP is activated.

A sounding reference signal (SRS) is transmitted to allow the gNB to measure a channel for the uplink in the activated BWP. For example, the SRS may be periodically transmitted.

If a PUCCH is configured in the activated BWP, the PUCCH is transmitted.

A BWP inactivity timer or cell deactivation timer therefor starts or restarts. In another method, the BWP inactivity timer or cell deactivation timer may start or restart only when a BWP or cell hibernation timer is not configured. If the BWP or cell hibernation timer can be configured through the RRC message, the BWP or the cell may be hibernated when the timer expires. For example, the BWP inactivity timer or cell deactivation timer may start or restart only in the hibernated BWP or cell.

If there are type 1 configuration transmission resources of which the use is suspended, the stored type 1 transmission resources may be initialized and used. The type 1 configuration transmission resources are periodic (uplink or downlink) transmission resources pre-allocated through an RRC message, which can be used after being activated through the RRC message.

A PHR is triggered for the BWP.

The UE may report a channel measurement result (CSI, CQI, PMI, RI, PTI, or CRI) for the downlink in the activated BWP according to a configuration of the gNB.

A PDCCH is monitored to read an indication of the gNB in the activated BWP.

A PDCCH is monitored to read cross-scheduling for the activated BWP.

The BWP inactivity timer starts or restarts. In another method, the BWP inactivity timer may start or restart only when a BWP hibernation timer is not configured. If the BWP hibernation timer can be configured through the RRC message, the BWP may be switched to a dormant state or a dormant BWP when the timer expires. For example, the BWP inactivity timer may start or restart only in the dormant BWP.

If a link BWP hibernation timer is configured for the BWP,

The BWP hibernation timer starts or restarts for the BWP.

Various embodiments may be configured and used by combining or expanding the first embodiment, the second embodiment, the third embodiment, or the fourth embodiment of performing the state transition in units of BWPs and the operation according thereto in the disclosure. For example, a fifth embodiment of performing the state transition in units of BWPs and the operation according thereto is described below.

In the fifth embodiment, a dormant BWP is configured by an indicator or a BWP identifier when a plurality of BWPs are configured in the UE for each cell through the RRC message as illustrated in FIG. 6. The gNB may indicate switching of the BWP for the cell in an activated state to the dormant BWP through DCI of the PDCCH which is L1 signaling and perform no PDCCH monitoring and no data transmission/reception in the dormant BWP but transmits a channel measurement report therein, thereby reducing UE battery consumption and enabling rapid BWP activation. The gNB may transmit DCI of the PDCCH which is L1 signaling in the cell (self-scheduling) or transmit the same in the PCell (cross-carrier scheduling) so as to indicate BWP switching.

When data transmission/reception for the activated cell switched to the dormant BWP is needed, the gNB may transmit a MAC CE including an indicator indicating activation of the cell to the UE, indicate switching of the dormant BWP for the cell in the activated state to a BWP (or an active BWP) which is not the dormant BWP among a plurality of BWPs configured through the RRC message, monitor a PDCCH again in the switched BWP, and start data transmission/reception.

If the gNB transmits a MAC CE including an indicator indicating deactivation of the cell to the UE, the UE may deactivate an uplink or downlink BWP of the specific cell and perform the deactivation operations proposed in the disclosure. In the fifth embodiment of the disclosure, the BWP is not operated or used by the cell in the deactivated state. Further, in the fifth embodiment of the disclosure, if switching the BWP to the dormant BWP is an indication of switching a downlink BWP, switching the dormant BWP to the active BWP may act as a cell activation indicator of the MAC CE. Detailed operations related to the cell state and BWP switching operation may be performed on the basis of the operation proposed by the first embodiment, the second embodiment, or the third embodiment of the disclosure.

As described above, various embodiments may be configured and used by combining or expanding the first embodiment, the second embodiment, the third embodiment, the fourth embodiment, or the fifth embodiment of the disclosure.

Figure 17:
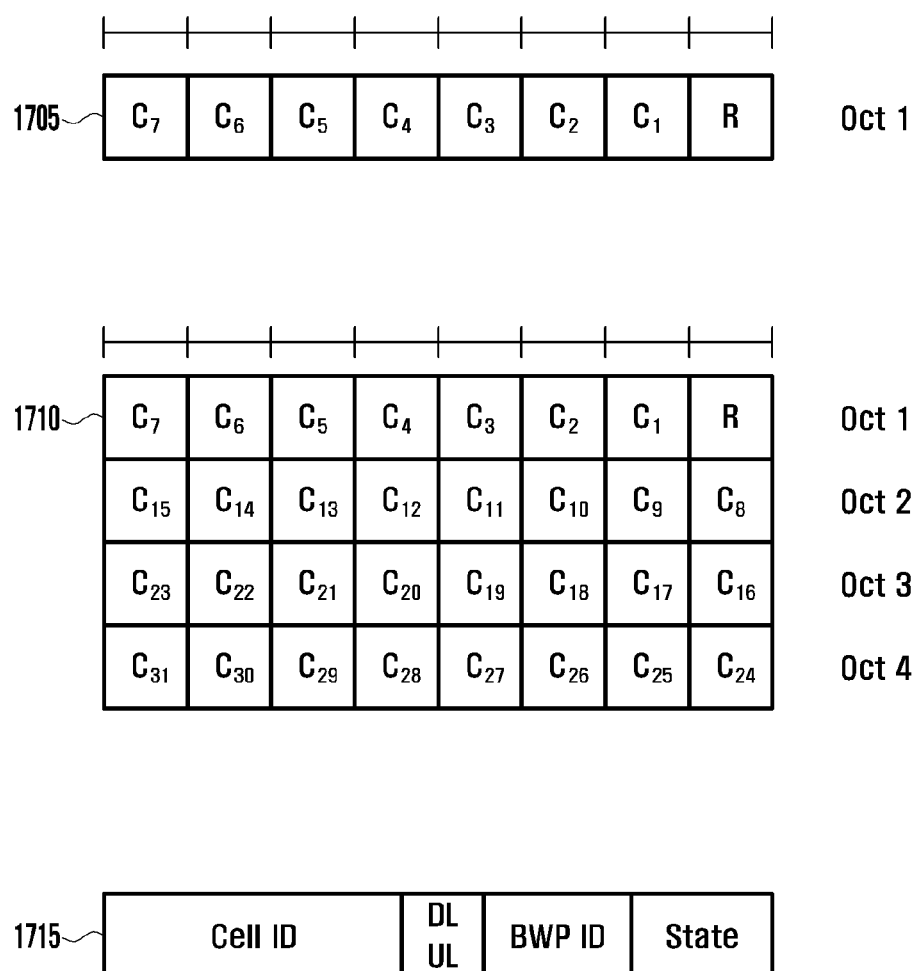
FIG. 17 illustrates MAC control information indicating the state transition to an activated state, a dormant state, or a deactivated state proposed in the disclosure.

FIG. 17 illustrates MAC control information indicating the state transition to an activated state, a dormant state, or a deactivated state proposed in the disclosure.

Active and inactive MAC CEs proposed in the disclosure are merely an embodiment, may have the format illustrated in FIG. 17, and may be divided into a MAC CE format 1705 having the size of 1 byte supporting 7 Scells and a MAC CE format 1710 having the size of 4 bytes supporting 31 Scells. Further, the MAC CEs may have the following characteristics.

In the case in which a dormant MAC CE is not received and only active and inactive MAC CEs are received, the UE operates as described below.

If each field of the active and inactive MAC CEs indicates each Scell identifier, a value corresponding to each field indicates whether the Scell is activated or deactivated. If a value of the indicator for the Scell indicated by the Scell identifier is 1, the Scell is activated only when the state of the Scell is the deactivated state. However, if the state of the Scell is a state other than the deactivated state, the indicator value may be ignored. If a value of an indicator for the Scell indicated by the Scell identifier is 0, the Scell may be deactivated. That is, if the value of the indicator for the Scell is 0, the Scell is deactivated regardless of the state of the Scell.

The dormant MAC CE proposed in the disclosure is merely an embodiment and may have a format illustrated in FIG. 17, and may be divided into a MAC CE format 1705 having the size of 1 byte supporting 7 Scells and a MAC CE format 1710 having the size of 4 bytes supporting 31 Scells. Further, the MAC CEs may have the following characteristics.

In the case in which the active and inactive MAC CEs are not received and only the dormant MAC CE is received, the UE operates as described below.

if each field of the dormant MAC CE indicates each Scell identifier, a value corresponding to each field may indicate whether the Scell is activated or deactivated. If a value of an indicator for the Scell indicated by the Scell identifier is 1, the Scell may be made to hibernate. That is, the Scell may be made to hibernate if the value of the indicator for the Scell is 1 regardless of the state of the Scell. If a value of the indicator for the Scell indicated by the Scell identifier is 0, the Scell may be activated only when the state of the Scell is the dormant state. However, if the state of the Scell is a state other than the dormant state, the indicator value is ignored.

In the case in which the active and inactive MAC CEs and the dormant MAC CE are simultaneously received by one MAC layer device, the UE operation is as described below.

if each field of the active and inactive MAC CEs and the dormant MAC CE indicates each Scell identifier, a combination of values corresponding to the respective fields may indicate state transition of the Scell to the activated, dormant, or deactivated state. The active and inactive MAC CEs and the dormant MAC CE may be received by one MAC layer device along with MAC CEs having the size of 1 byte or MAC CEs having the size of 4 bytes. If two types of MAC CEs are received together, the state transition of each Scell indicated by the MAC CEs may be determined according to a combination of indication values of the MAC CEs as shown in the following table.

| Hibernation MAC control element $C_i$ | Activation/Deactivation MAC control element $C_i$ | SCell shall be |
|---|---|---|
| 0 | 0 | Deactivated |
| 0 | 1 | Activated |
| 1 | 0 | Reserved MAC control element combination |
| 1 | 1 | Dormant |

The active, inactive, and dormant states for each link may be indicated using an R file included in the format of the active and inactive MAC CEs of the cell or the dormant MAC CE of the cell proposed above. For example, when the R field is 0, it may indicate transition of the downlink of the cell to the active, inactive, or dormant state. When the R field is 1, it may indicate transmission of the uplink of the cell to the active, inactive, or dormant state. In another method, the R field may be defined and used to indicate only the state transition of the downlink (or uplink). Further, the MAC CE including each cell identifier and each link indicator or state indicator may be defined as indicated by reference numeral 1715 and the state transition may be indicated for each link of each cell.

A new MAC CE for supporting embodiments of the disclosure and expanding them to various embodiments may be designed or the conventional MAC CE function may be expanded.

For example, the MAC CEs proposed and described in FIG. 17 of the disclosure may be applied, or a reserved bit (R bit) may be expanded in reference numerals 1705 or 1710 of FIG. 17 and the function described in FIG. 17 of the disclosure may be expanded and applied.

For example, when the reserved bit is configured as 0, a 1-bit indicator indicating an identifier of each cell (SCell) may be defined and used as follows.

If the 1-bit indicator is configured as 0, the state transition for the cell or the BWP may be performed as follows.
The cell or the BWP in the deactivated state is transitioned to the deactivated state or is maintained.
The cell or the BWP in the activated state is transitioned to the deactivated state
The cell or the BWP in the dormant state is transitioned to the deactivated state If the 1-bit indicator is configured as 1, the state transition for the cell or the BWP may be performed as follows.
The cell or the BWP in the activated state is transitioned to the activated state or is maintained.
The cell or the BWP in the deactivated state is transitioned to the activated state
The cell or the BWP in the dormant state is transitioned to the dormant state or is maintained.

When the reserved bit is configured as 1, the 1-bit indicator indicating the identifier of each cell (SCell) may be defined and used as follows. In another method, a logical identifier may be newly defined and anew MAC CE may be defined and used as follows.

If the 1-bit indicator is configured as 0, the state transition for the cell or the BWP may be performed as follows.
The cell or the BWP in the activated state is transitioned to the activated state or is maintained.
The cell or the BWP in the dormant state is transitioned to the activated state
The cell or the BWP in the deactivated state is transitioned to the deactivated state or is maintained.

If the 1-bit indicator is configured as 1, the state transition for the cell or the BWP may be performed as follows.
The cell or the BWP in the activated state is transitioned to the dormant state
The cell or the BWP in the deactivated state is transitioned to the dormant state
The cell or the BWP in the dormant state is transitioned to the dormant state or is maintained.

The function of the MAC CE described above by way of example may be variously expanded and designed to indicate state transition or switching of the cell or the BWP and may be applied to the embodiments of the disclosure.

Figure 18:
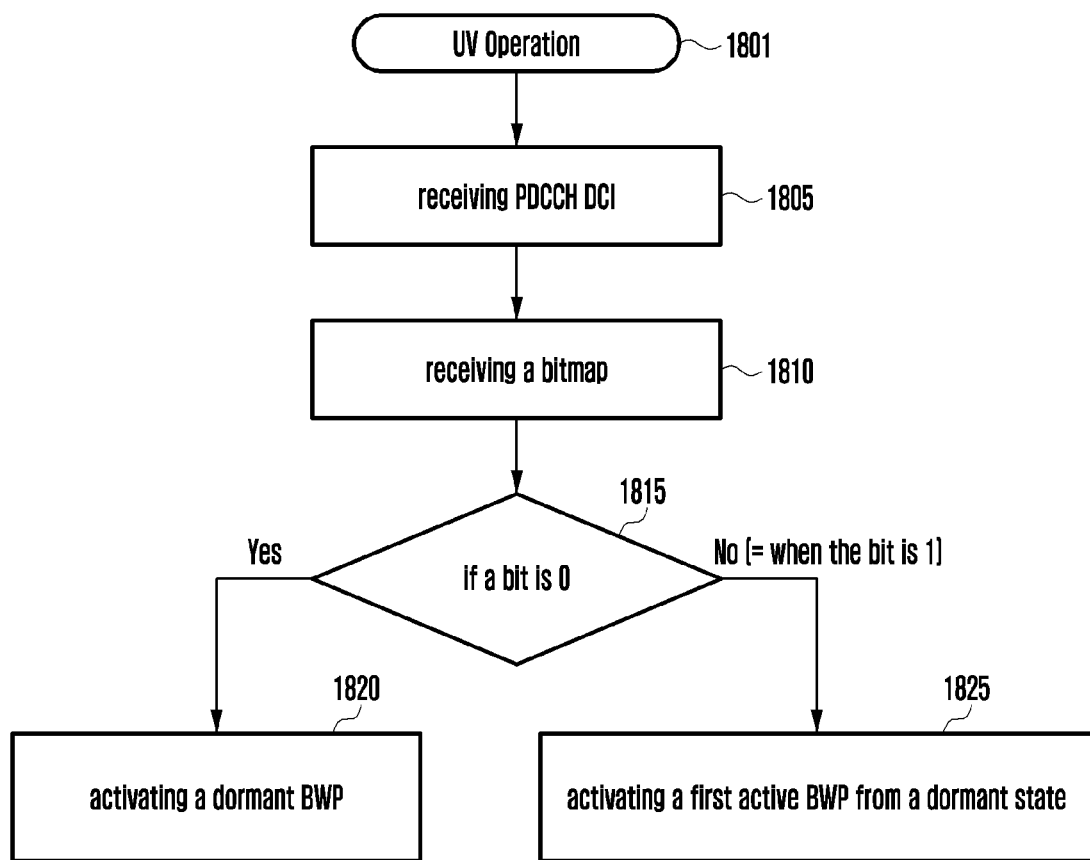
FIG. 18 illustrates an operation of the UE according to the first embodiment, the second embodiment, or the third embodiment proposed in the disclosure.

FIG. 18 illustrates an operation of the UE according to the first embodiment, the second embodiment, or the third embodiment proposed in the disclosure.

In the embodiments proposed in the disclosure, the UE may search for DCI of a PDCCH in a PCell or an SpCell in step 1805 and identify a bitmap including an indication indicating switching or activation from a dormant BWP or a dormant state to a first active BWP proposed in the disclosure in the detected DCI format in step 1810.

The UE may identify each bit value in the bitmap in step 1810. If the bit value of the bitmap is 0 in step 1820, the bit value of 0 may indicate switching of each activated SCell, an SCell identifier, an activated SCell included in a first SCell group, or an activated SCell included in a second SCell group corresponding to the bit to a dormant BWP or activation of the dormant BWP (if the dormant BWP is configured or is included in the first SCell group or the second SCell group). In another method, when the bit value of the bitmap is 0, the bit value of 0 may indicate switching to the dormant BWP or activation of the dormant BWP if the dormant BWP is configured for each activated SCell, the activated SCell included in the first SCell group, or the activated SCell included in the second SCell group corresponding to the bit, if the dormant BWP is included in the first SCell group or the second SCell group, or if the activated BWP is not the dormant BWP (or if the activated BWP is a normal BWP). In another method, when the bit value of the bitmap is 0, the bit value of 0 may indicate switching of each activated SCell (having the dormant BWP configured therein or included in the first SCell group or the second SCell group), an SCell identifier, the activated SCell included in the first SCell group, or the activated SCell included in the second SCell group corresponding to the bit to the dormant BWP or activation of the dormant BWP. In another method, when the bit value of the bitmap is 0, the bit value of 0 may indicate switching of each activated SCell, the SCell identifier, the activated SCell included in the first SCell group, or the activated SCell included in the second SCell group corresponding to the bit to the dormant BWP or activation of the dormant BWP. If the bit of the bitmap indicates the SCell or the SCell identifier in which no dormant BWP is configured, the UE may ignore the bit, or not read or apply the bit.

The UE may identify each bit value in the bitmap in step 1810. If the bit value of the bitmap is 1 in step 1825, the bit value of 1 may indicate switching of each activated SCell, an activated SCell included in a first SCell group, or an activated SCell included in a second SCell group corresponding to the bit to a normal BWP (for example, a first active BWP activated from a dormant state) or activation of the normal BWP (for example, a first active BWP activated from a dormant state). In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell, the activated SCell included in the first SCell group, or the activated SCell included in the second SCell group corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated. In another method, when the bit value of the bitmap is 1, the bit value of 1 may indicate, for each activated SCell, the activated SCell included in the first SCell group, or the activated SCell included in the second SCell group corresponding to the bit, switching from the dormant BWP to the normal BWP (for example, the first active BWP activated from the dormant state), activation to the normal BWP (for example, the first active BWP activated from the dormant state), or maintenance, continuous use, application, or activation of the current active BWP. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell, the activated SCell included in the first SCell group, or the activated SCell included in the second SCell group corresponding to the bit is the dormant BWP (or is not the normal BWP). Otherwise (if the current or activated BWP for each activated SCell corresponding to the bit is not the dormant BWP (or is the normal BWP)) or if the dormant BWP is not configured, the current active BWP may be maintained, continuously used, applied, or activated.

Figure 19:
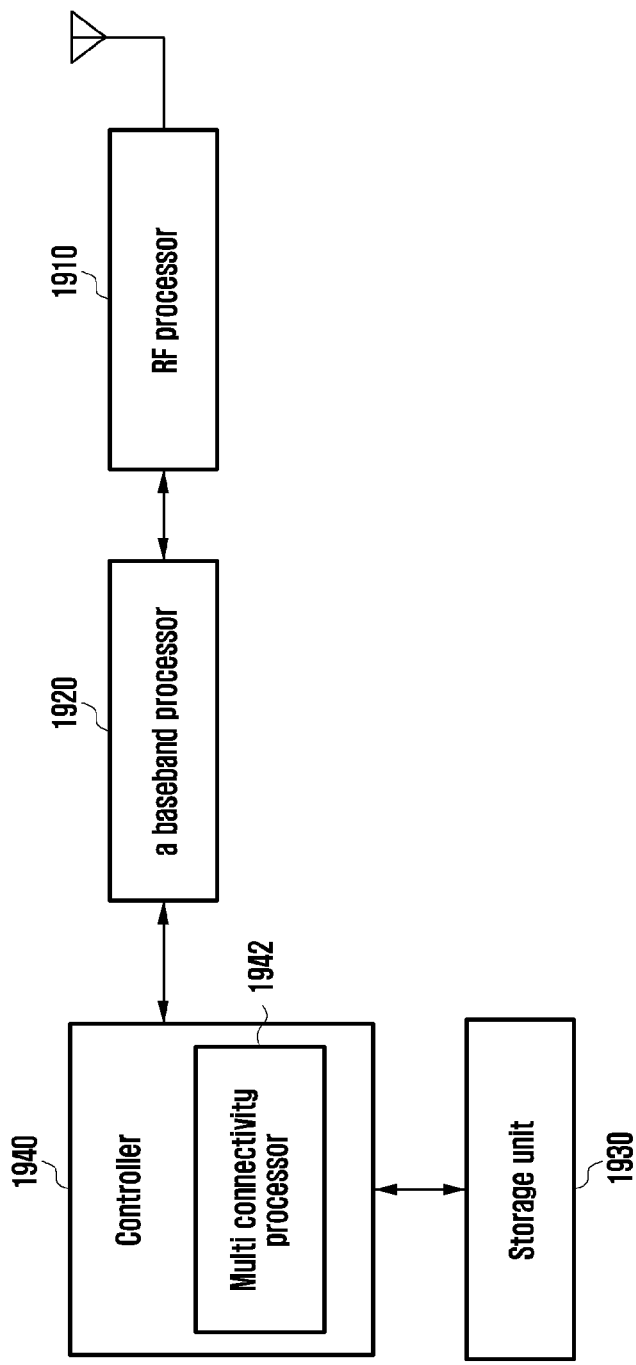
FIG. 19 illustrates the structure of the UE to which embodiments of the disclosure can be applied.

The structure of the UE to which embodiments of the disclosure can be applied is illustrated in FIG. 19.

Referring to FIG. 19, the UE includes a radio frequency (RF) processor 1910, a baseband processor 1920, a storage unit 1930, and a controller 1940.

The RF processor 1910 performs a function for transmitting and receiving a signal through a wireless channel, such as band conversion and amplification of a signal. That is, the RF processor 1910 up-converts a baseband signal provided from the baseband processor 1920 into an RF band signal, transmits the RF band signal through an antenna, and then down-converts the RF band signal received through the antenna into a baseband signal. For example, the RF processor 1910 may include a transmission filter, a reception filter, an amplifier, a mixer, an oscillator, a digital-to-analog converter (DAC), an analog-to-digital converter (ADC), and the like. Although FIG. 19 illustrates only one antenna, the UE may include a plurality of antennas. In addition, the RF processor 1910 may include a plurality of RF chains. Moreover, the RF processor 1910 may perform beamforming. For the beamforming, the RF processor 1910 may control a phase and a size of each signal transmitted/received through a plurality of antennas or antenna elements. The RF processor may perform MIMO and receive a plurality of layers when performing the MIMO operation. The RF processor 1910 may appropriately configure a plurality of antennas or antenna elements according to the control of the controller to perform reception beam sweeping or control a direction of a reception beam and a beam width so that the reception beam corresponds to a transmission beam.

The baseband processor 1920 performs a function for a conversion between a baseband signal and a bitstream according to a physical layer standard of the system. For example, when data is transmitted, the baseband processor 1920 generates complex symbols by encoding and modulating a transmission bitstream. Further, when data is received, the baseband processor 1920 reconstructs a reception bitstream by demodulating and decoding a baseband signal provided from the RF processor 1910. For example, in an orthogonal frequency division multiplexing (OFDM) scheme, when data is transmitted, the baseband processor 1920 generates complex symbols by encoding and modulating a transmission bitstream, mapping the complex symbols to subcarriers, and then configures OFDM symbols through an inverse fast Fourier transform (IFFT) operation and a cyclic prefix (CP) insertion. Further, when data is received, the baseband processor 1920 divides the baseband signal provided from the RF processor 1910 in the unit of OFDM symbols, reconstructs the signals mapped to the subcarriers through a fast Fourier transform (FFT) operation, and then reconstructs a reception bitstream through demodulation and decoding.

The baseband processor 1920 and the RF processor 1910 transmit and receive signals as described above. Accordingly, the baseband processor 1920 and the RF processor 1910 may be referred to as a transmitter, a receiver, a transceiver, or a communication unit. Further, at least one of the baseband processor 1920 and the RF processor 1910 may include a plurality of communication modules to support a plurality of different radio access technologies. In addition, at least one of the baseband processor 1920 and the RF processor 1910 may include different communication modules to process signals of different frequency bands. For example, the different radio-access technologies may include an LTE network and an NR network. Further, the different frequency bands may include a super high frequency (SHF) (for example, 2.5 GHz and 5 Ghz) band and a millimeter (mm) wave (for example, 60 GHz) band.

The storage unit 1930 stores data such as basic program, an application, and setting information for the operation of the UE. The storage unit 1930 provides the stored data according to a request from the controller 1940.

The controller 1940 controls the overall operation of the UE. For example, the controller 1940 transmits/receives a signal through the baseband processor 1920 and the RF processor 1910. In addition, the controller 1940 may record data in the storage unit 1930 and read the data. To this end, the controller 1940 may include at least one processor. For example, the controller 1940 may include a communication processor (CP) that performs a control for communication, and an application processor (AP) that controls a higher layer such as an application program.

Figure 20:
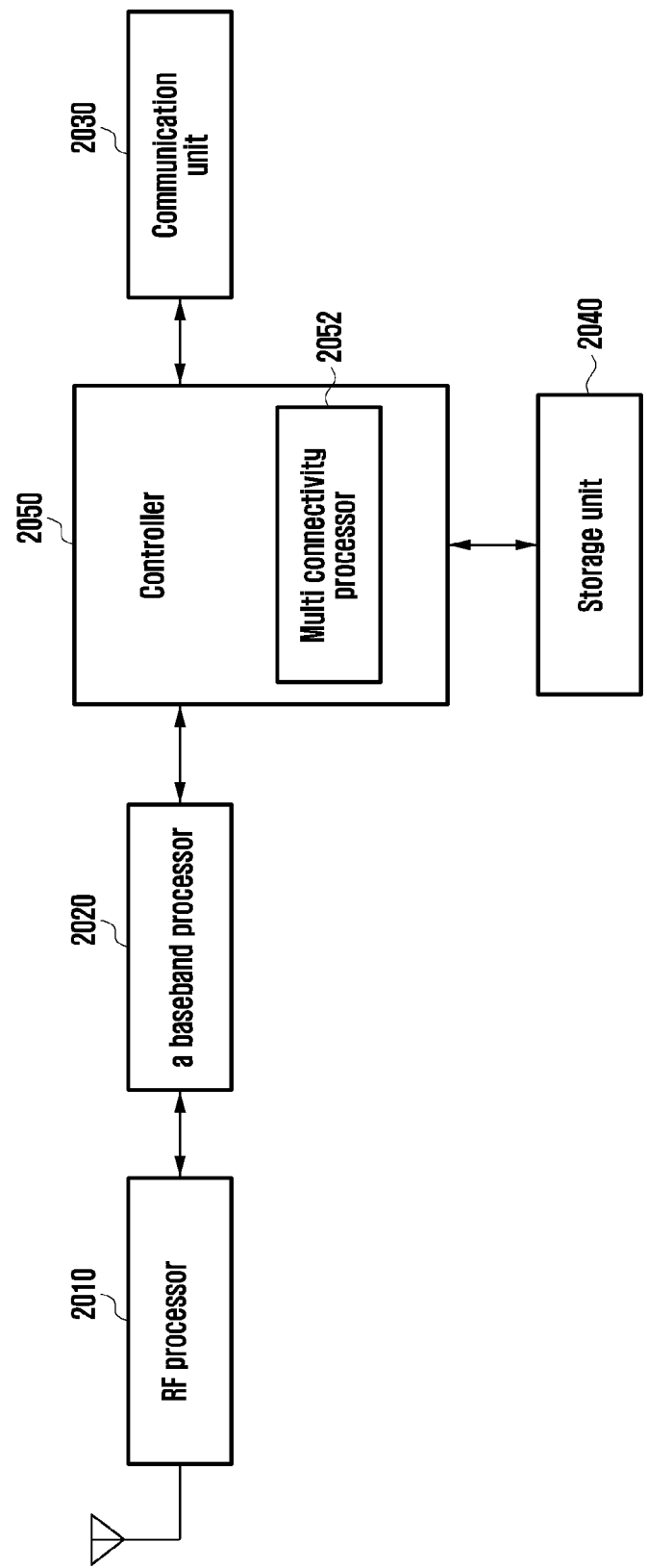
FIG. 20 illustrates a block diagram of a TRP in a wireless communication system to which embodiments of the disclosure can be applied.

FIG. 20 illustrates a block diagram of a TRP in a wireless communication system to which embodiments of the disclosure can be applied.

As illustrated in FIG. 20, the base station includes an RF processor 2010, a baseband processor 2020, a backhaul communication unit 2030, a storage unit 2040, and a controller 2050.

The RF processor 2010 performs a function for transmitting and receiving a signal through a wireless channel, such as band conversion and amplification of a signal. That is, the RF processor 2010 up-converts a baseband signal provided from the baseband processing unit 2020 into an RF band signal and then transmits the converted signal through an antenna, and down-converts an RF band signal received through the antenna into a baseband signal. For example, the RF processor 2010 may include a transmission filter, a reception filter, an amplifier, a mixer, an oscillator, a DAC, and an ADC. Although FIG. 20 illustrates only one antenna, the first access node may include a plurality of antennas. In addition, the RF processor 2010 may include a plurality of RF chains. Moreover, the RF processor 2010 may perform beamforming. For the beamforming, the RF processor 2010 may control a phase and a size of each of the signals transmitted and received through a plurality of antennas or antenna elements. The RF processor may perform a downlink MIMO operation by transmitting one or more layers.

The baseband processor 2020 performs a function of performing conversion between a baseband signal and a bitstream according to a physical layer standard of the first radio access technology. For example, when data is transmitted, the baseband processor 2020 generates complex symbols by encoding and modulating a transmission bitstream. Further, when data is received, the baseband processor 2020 reconstructs a reception bitstream by demodulating and decoding a baseband signal provided from the RF processor 2010. For example, in an OFDM scheme, when data is transmitted, the baseband processor 2020 may generate complex symbols by encoding and modulating the transmission bitstream, map the complex symbols to subcarriers, and then configure OFDM symbols through an IFFT operation and CP insertion. In addition, when data is received, the baseband processor 2020 divides a baseband signal provided from the RF processor 2010 in units of OFDM symbols, recovers signals mapped with sub-carriers through an FFT operation, and then recovers a reception bitstream through demodulation and decoding. The baseband processor 2020 and the RF processor 2010 transmit and receive signals as described above. Accordingly, the baseband processor 2020 and the RF processor 2010 may be referred to as a transmitter, a receiver, a transceiver, or a communication unit.

The communication unit 2030 provides an interface for communicating with other nodes within the network.

The storage unit 2040 stores data such as a basic program, an application, and setting information for the operation of the MeNB. Particularly, the storage unit 2040 may store information on bearers allocated to the accessed UE and the measurement result reported from the accessed UE. Further, the storage unit 2040 may store information on a reference for determining whether to provide multiple connections to the UE or stop the multiple connections. In addition, the storage unit 2040 provides data stored therein according to a request from the controller 2050.

The controller 2050 controls the overall operation of the MeNB. For example, the controller 2050 transmits and receives a signal through the baseband processor 2020 and the RF processor 2010 or through the backhaul communication unit 2030. In addition, the controller 2050 may record data in the storage unit 2040 and read the data. To this end, the controller 2050 may include at least one processor.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a radio resource control (RRC) message configuring a secondary cell (SCell) of a cell group, the RRC message being associated with first information indicating a state of the SCell, second information on a bandwidth part (BWP) identifier (ID) of a dormant BWP for the SCell, and third information on a first active downlink BWP ID for the SCell;
   identifying whether the state of the SCell is set to activated based on the first information;
   in case that the state of the SCell is set to activated, identifying whether the first active downlink BWP ID is set to dormant BWP based on the second information and the third information; and
   in case that the first active downlink BWP is set to the dormant BWP, stopping a BWP inactivity timer.

2. The method of claim 1, the method further comprising:
   in case that the first active downlink BWP ID is not set to the dormant BWP, monitoring a physical downlink control channel (PDCCH) on the SCell.

3. The method of claim 1, wherein the RRC message further includes a first ID of a SCell group for dormancy outside active time where the SCell belongs, a second ID of a SCell group for dormancy within active time where the SCell belongs, a third ID of the downlink (DL) BWP to be activated when receiving a downlink control information (DCI) indication for SCell dormancy outside active time, and a fourth ID of the DL BWP to be activated when receiving a DCI indication for SCell dormancy within active time.

4. The method of claim 3, in case that the terminal is configured with DRX mode operation, the method further comprising:
   detecting first DCI used for power saving information outside DRX Active Time, wherein the first DCI includes a first bitmap corresponding to a SCell dormancy indication field;
   obtaining the first bitmap based on the first ID, wherein each bit of the first bitmap corresponds to a group of configured SCells;
   in case that a bit of the first bitmap indicates a first value, activating a DL BWP associated with the second information for at each activated SCell in the corresponding group of configured SCells; and
   in case that the bit of the first bitmap indicates a second value, activating a DL BWP associated with the third ID for each activated SCell in the corresponding group of configured SCells.

5. The method of claim 3, the method further comprising:
   detecting second DCI, wherein the second DCI includes a second bitmap corresponding to a SCell dormancy indication field;
   obtaining the second bitmap based on the second ID, wherein each bit of the second bitmap corresponds to a group of configured SCells;
   in case that a bit of the second bitmap indicates a third value, activating a DL BWP associated with the second information for each activated SCell in the corresponding group of configured SCells; and in case that the bit of the second bitmap indicates a fourth value, activating a DL BWP associated with the fourth ID for each activated SCell in the corresponding group of configured SCells.

6. A method performed by a base station in a wireless communication system, the method comprising:

generating a radio resource control (RRC) message configuring a secondary cell (SCell) of a cell group, the RRC message being associated with first information indicating a state of the SCell, second information on a bandwidth part (BWP) identifier (ID) of a dormant BWP for the SCell, and third information on a first active downlink BWP ID for the SCell; and transmitting, to a terminal, the RRC message configuring the SCell of the cell group, wherein whether the state of the SCell is set to activated is based on the first information, wherein whether the first active downlink BWP ID is set to dormant BWP is based on the second information and the third information, and wherein in case that the first active downlink BWP is set to the dormant BWP, a BWP inactivity timer is stopped.

7. The method of claim 6, wherein in case that the first active downlink BWP ID is not set to the dormant BWP, a physical downlink control channel (PDCCH) on the SCell is monitored.

8. The method of claim 6, wherein the RRC message further includes a first ID of a SCell group for Dormancy outside active time where the SCell belongs, a second ID of a SCell group for Dormancy within active time where the SCell belongs, a third ID of the downlink (DL) BWP to be activated when receiving a downlink control information (DCI) indication for SCell dormancy outside active time, and a fourth ID of the DL BWP to be activated when receiving a DCI indication for SCell dormancy within active time.

9. The method of claim 8, the method further comprising:

transmitting, to the terminal, a first downlink control information (DCI) used for power saving information outside DRX Active Time, wherein the first DCI includes a first bitmap corresponding to a SCell dormancy indication field, wherein each bit of the first bitmap corresponds to a group of configured SCells, wherein in case that a bit of the first bitmap indicates a first value, a DL BWP associated with the second information is activated for at each activated SCell in the corresponding group of configured SCells, and wherein in case that the bit of the first bitmap indicates a second value, a DL BWP associated with the third ID is activated for each activated SCell in the corresponding group of configured SCells.

10. The method of claim 8, the method further comprising:

transmitting, to the terminal, a second DCI, wherein the second DCI includes a second bitmap corresponding to a SCell dormancy indication field, wherein each bit of the second bitmap corresponds to a group of configured SCells, wherein in case that a bit of the second bitmap indicates a third value, a DL BWP associated with the second information is activated for each activated SCell in the corresponding group of configured SCells, and in case that the bit of the second bitmap indicates a fourth value, a DL BWP associated with the fourth ID is activated for each activated SCell in the corresponding group of configured SCells.

11. A terminal in a wireless communication system, the terminal comprising:

a transceiver; and a controller configured to:

receive, from a base station, a radio resource control (RRC) message configuring a secondary cell (SCell) of a cell group, the RRC message being associated with first information indicating a state of the SCell, second information on a bandwidth part (BWP) identifier (ID) of a dormant BWP for the SCell, and third information on a first active downlink BWP ID for the SCell, identify whether the state of the SCell is set to activated based on the first information, in case that the state of the SCell is set to activated, identify whether the first active downlink BWP ID is set to dormant BWP based on the second information and the third information, and in case that the first active downlink BWP is set to the dormant BWP, stop a BWP inactivity timer.

12. The terminal of claim 11, wherein the controller is further configured to:

in case that the first active downlink BWP ID is not set to the dormant BWP, monitor a physical downlink control channel (PDCCH) on the SCell.

13. The terminal of claim 11, wherein the RRC message further includes a first ID of a SCell group for dormancy outside active time where the SCell belongs, a second ID of a SCell group for dormancy within active time where the SCell belongs, a third ID of the downlink (DL) BWP to be activated when receiving a downlink control information (DCI) indication for SCell dormancy outside active time, and a fourth ID of the DL BWP to be activated when receiving a DCI indication for SCell dormancy within active time.

14. The terminal of claim 13, the controller is further configured to:

detect first DCI used for power saving information outside DRX Active Time, wherein the first DCI includes a first bitmap corresponding to a SCell dormancy indication field, and obtain a first bitmap based on the first ID, wherein each bit of the first bitmap corresponds to a group of configured SCells, in case that a bit of the first bitmap indicates a first value, activate a DL BWP associated with the second information for at each activated SCell in the corresponding group of configured SCells, and in case that the bit of the first bitmap indicates a second value, activate a DL BWP associated with the third ID for each activated SCell in the corresponding group of configured SCells.

15. The terminal of claim 13, the controller is further configured to:

detect, second DCI, wherein the second DCI includes a second bitmap corresponding to a SCell dormancy indication field, and obtain the second bitmap based on the second ID, wherein each bit of the second bitmap corresponds to a group of configured SCells, in case that a bit of the second bitmap indicates a third value, activate a DL BWP associated with the second information for each activated SCell in the corresponding group of configured SCells, and in case that the bit of the second bitmap indicates a fourth value, activate a DL BWP associated with the fourth ID for each activated SCell in the corresponding group of configured SCells.

16. A base station in a wireless communication system, the base station comprising:
   a transceiver; and
   a controller configured to:
      generate a radio resource control (RRC) message configuring a secondary cell (SCell) of a cell group, the RRC message being associated with first information indicating a state of the SCell, second information on a bandwidth part (BWP) identifier (ID) of a dormant BWP for the SCell, and third information on a first active downlink BWP ID for the SCell, and
      transmit, to a terminal, the RRC message configuring the SCell of the cell group,
   wherein whether the state of the SCell is set to activated is based on the first information,
   wherein whether the first active downlink BWP ID is set to dormant BWP is based on the second information and the third information, and
   wherein in case that the first active downlink BWP is set to the dormant BWP, a BWP inactivity timer is stopped.

17. The base station of claim 16, wherein in case that the first active downlink BWP ID is not set to the dormant BWP, a physical downlink control channel (PDCCH) on the SCell is monitored.

18. The base station of claim 16, wherein the RRC message further includes a first ID of a SCell group for Dormancy outside active time where the SCell belongs, a second ID of a SCell group for Dormancy within active time where the SCell belongs, a third ID of the downlink (DL) BWP to be activated when receiving a downlink control information (DCI) indication for SCell dormancy outside active time, and a fourth ID of the DL BWP to be activated when receiving a DCI indication for SCell dormancy within active time.

19. The base station of claim 18, the controller is further configured to:
   transmit, to the terminal, a first downlink control information (DCI) used for power saving information outside DRX Active Time, wherein the first DCI includes a first bitmap corresponding to a SCell dormancy indication field,
   wherein each bit of the first bitmap corresponds to a group of configured SCells,
   wherein in case that a bit of the first bitmap indicates a first value, a DL BWP associated with the second information is activated for at each activated SCell in the corresponding group of configured SCells, and
   wherein in case that the bit of the first bitmap indicates a second value, a DL BWP associated with the third ID is activated for each activated SCell in the corresponding group of configured SCells.

20. The base station of claim 18, the controller is further configured to:
   transmit, to the terminal, a second DCI, wherein the second DCI includes a second bitmap corresponding to a SCell dormancy indication field,
   wherein each bit of the second bitmap corresponds to a group of configured SCells,
   wherein in case that a bit of the second bitmap indicates a third value, a DL BWP associated with the second information is activated for each activated SCell in the corresponding group of configured SCells, and
   in case that the bit of the second bitmap indicates a fourth value, a DL BWP associated with the fourth ID is activated for each activated SCell in the corresponding group of configured SCells.

* * * * *